US009164610B2

(12) United States Patent
Ahn et al.

(10) Patent No.: US 9,164,610 B2
(45) Date of Patent: Oct. 20, 2015

(54) TOUCH DISPLAY DEVICE HAVING A DRIVER TO PROVIDE A SCAN SYNCHRONIZATION SIGNAL AND A DATA SYNCHRONIZATION SIGNAL

(71) Applicant: LG ELECTRONICS INC., Seoul (KR)

(72) Inventors: Byeongkil Ahn, Seoul (KR); Seonghak Moon, Seoul (KR); Taehyung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 287 days.

(21) Appl. No.: 13/828,147

(22) Filed: Mar. 14, 2013

(65) Prior Publication Data
US 2014/0009412 A1 Jan. 9, 2014

(30) Foreign Application Priority Data
Jul. 9, 2012 (KR) ........................ 10-2012-0074622

(51) Int. Cl.
*G06F 3/041* (2006.01)
*G09G 3/32* (2006.01)
*G06F 3/03* (2006.01)
*G06F 3/038* (2013.01)
*G09G 3/20* (2006.01)

(52) U.S. Cl.
CPC .............. *G06F 3/041* (2013.01); *G06F 3/0304* (2013.01); *G06F 3/0386* (2013.01); *G09G 3/2022* (2013.01); *G09G 3/3208* (2013.01); *G09G 3/3225* (2013.01); *G09G 2310/0205* (2013.01); *G09G 2310/0218* (2013.01); *G09G 2310/0221* (2013.01); *G09G 2310/0243* (2013.01); *G09G 2310/0245* (2013.01); *G09G 2310/0283* (2013.01); *G09G 2360/145* (2013.01)

(58) Field of Classification Search
CPC ..... G06F 3/041; G06F 3/0304; G06F 3/0386; G09G 3/3225; G09G 3/2022; G09G 3/3208; G09G 2310/0218; G09G 2310/0243; G09G 2310/0221; G09G 2310/0283; G09G 2310/0245; G09G 2360/145; G09G 2310/0205
USPC ......... 345/76–84, 173–178; 178/18.01–18.11
See application file for complete search history.

(56) References Cited

U.S. PATENT DOCUMENTS

| 5,448,024 | A | * | 9/1995 | Kawaguchi et al. | ........ 178/18.07 |
|---|---|---|---|---|---|
| 6,091,030 | A | * | 7/2000 | Tagawa et al. | ............. 178/18.01 |
| 2002/0044782 | A1 | | 4/2002 | Kota et al. | ..................... 396/661 |
| 2009/0256810 | A1 | * | 10/2009 | Pasquariello | ................. 345/173 |

(Continued)

FOREIGN PATENT DOCUMENTS

EP 2 348 386 A2 7/2011

OTHER PUBLICATIONS

European Search Report issued in Application No. 13003330.1 dated Jun. 12, 2014.

*Primary Examiner* — Rodney Amadiz
(74) *Attorney, Agent, or Firm* — KED & Associates, LLP

(57) ABSTRACT

A touch display device may include an organic light emitting diode (OLED) display panel that includes scan lines, data lines, and OLED cells, and a driver to display a touch position on a screen (of the OLED display panel) in a frame that includes a touch subfield. The driver may supply at least one scan sync signal to the scan lines and supply at least one data sync signal to the data lines during one frame. The touch subfield may include a vertical touch subfield to detect a vertical position of the touch position and a horizontal touch subfield to detect a horizontal position of the touch position.

16 Claims, 48 Drawing Sheets

(56) References Cited

U.S. PATENT DOCUMENTS

| | | | |
|---|---|---|---|
| 2010/0194714 A1 | 8/2010 | Hsieh | 345/179 |
| 2010/0315378 A1* | 12/2010 | Song et al. | 345/175 |
| 2010/0315409 A1 | 12/2010 | Song et al. | 345/214 |
| 2011/0175851 A1* | 7/2011 | Do et al. | 345/175 |
| 2011/0273367 A1* | 11/2011 | Cheng et al. | 345/102 |
| 2012/0019462 A1 | 1/2012 | Kim et al. | 345/173 |
| 2012/0075240 A1* | 3/2012 | Kida et al. | 345/174 |
| 2013/0314360 A1* | 11/2013 | Saitoh et al. | 345/173 |

* cited by examiner (A)  (B)

(A)  (B)

(A)

(B)

(A)            (B)

TOUCH DISPLAY DEVICE HAVING A DRIVER TO PROVIDE A SCAN SYNCHRONIZATION SIGNAL AND A DATA SYNCHRONIZATION SIGNAL

CROSS-REFERENCE TO RELATED APPLICATION

This application claims priority under 35 U.S.C. §119 from Korean Application No. 10-2012-0074622, filed Jul. 9, 2012, the subject matter of which is hereby incorporated by reference.

BACKGROUND

1. Field

Embodiments may relate to a touch display device that includes an organic light emitting diode display panel.

2. Discussion of Related Art

A touch device may be provided in a front of a display panel so a user may touch objects displayed on a screen of the display panel.

FIGS. 1 and 2 illustrate a touch device according to an example arrangement, other arrangements may also be provided A touch device may be attached to a surface of a display panel. The touch device is an input device that executes a previously appointed command when a user presses (or touches) an icon (or a portion corresponding to a selection button) displayed on a screen of the display panel. The user may press or touch the icon a finger, or a pen and/or a stylist, for example.

As shown in FIG. 1, the touch device may include a substrate 100, a light emitting element 120, and a light receiving element 130.

The substrate 100 may be formed of a transparent material with light transmission. The substrate 100 may be a film substrate or a glass substrate. Alternatively, the substrate 100 may be a plastic substrate.

A protective layer 110 may be formed on the substrate 100. The protective layer 110 may prevent the substrate 100 from being damaged by a pressure, etc. applied from the outside. The protective layer 110 may be formed of a glass material or a resin material, for example.

The light emitting element 120 may emit a predetermined light such as infrared light, visible light, microwave beam, acoustic wave beam, and/or vibration wave beam, for example.

The light receiving element 130 may receive the light emitted from the light emitting element 120.

An operation of the touch device may be described with reference to FIG. 2.

When an input unit 140 (for example, a pen, a finger, etc.) is positioned at a predetermined position of the substrate 100, the input unit 140 may shield the light emitted by the light emitting element 120 at a corresponding position.

The light emitted by the light emitting element 120 may not reach the light receiving element 130. A controller may confirm the light receiving element 130 disposed at a position corresponding to a shielding portion of the light, thereby calculating a position (i.e., a touched position) of the input unit 140.

When the touch device is disposed in a front of the display panel, manufacturing cost of a display device may increase because of the touch device.

As size of the display panel increases, the size of the touch device may increase. The manufacturing cost of the display device may further increase.

Further, thickness and weight of the display device may increase because of the touch device.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
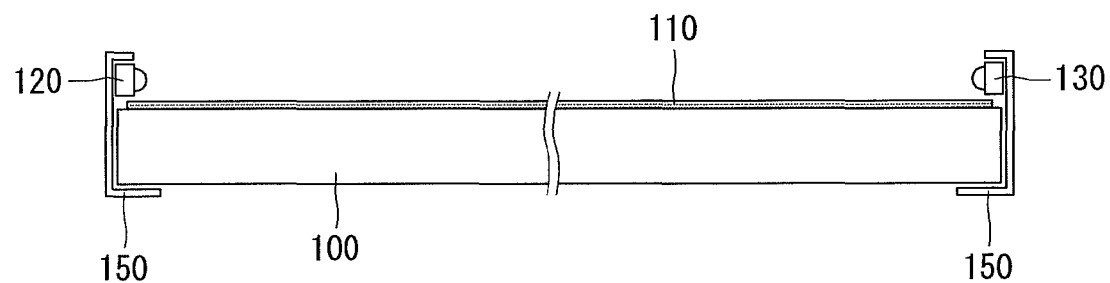
FIGS. 1 and 2 illustrate a touch device according to an example arrangement.
Figure 2:
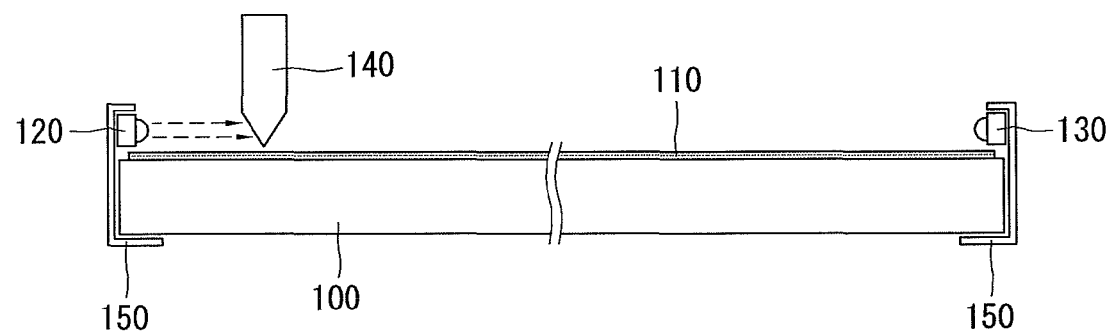

Reference may now be made to arrangements and/or embodiments, examples of which may be illustrated in the accompanying drawings. Since embodiments may be modified in various ways and may have various forms, specific embodiments may be illustrated in the drawings and are described in detail in the present specification. However, embodiments are not limited to specific disclosed embodiments, but include all modifications, equivalents and substitutes included within the spirit and technical scope of the present invention.

The terms 'first', 'second', etc. may be used to describe various components, but components are not limited by such terms. The terms may be used only for the purpose of distinguishing one component from other components. For example, a first component may be designated as a second component without departing from the scope of the present invention. In the same manner, the second component may be designated as the first component.

The term "and/or" may encompass both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present disclosure may be used to describe only specific embodiments or examples, and are not intended to limit the present invention. A singular expression may include a plural expression as long as it does not have an apparently different meaning in context.

The terms "include" and "have" should be understood to be intended to designate that illustrated features, numbers, steps, operations, components, parts or combinations thereof exist and not to preclude the existence of one or more different features, numbers, steps, operations, components, parts or combinations thereof, and/or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary may be understood to have meanings identical to those used in the context of a related art, and are not to be construed to have ideal or excessively formal meanings unless they are obviously specified in the present application.

The following exemplary embodiments are provided to those skilled in the art in order to describe the present invention more completely. Accordingly, shapes and sizes of elements shown in the drawings may be exaggerated for clarity.

FIGS. 3 to 8 illustrate a configuration and operation of a broadcasting signal receiver according to an example embodiment. Other embodiments and configurations may also be provided.

The broadcasting signal receiver may be a broadcasting signal receiver having a computer assisted function in addition to a broadcast receiving function. Thus, the broadcasting signal receiver may perform the broadcast receiving function and may also perform an internet function. The broadcasting signal receiver may be equipped with a user-friendly interface, such as an input device driven by a manual operation and a spatial remote controller. The broadcasting signal receiver may be accessed to the internet and the computer by the support of wired or wireless internet function(s) and thus may perform e-mail, web browsing, banking, games, etc. A standard universal operating system (OS) may be used for various functions disclosed herein.

Accordingly, because the broadcasting signal receiver may freely add or omit various applications to or in universal OS kernel, the broadcasting signal receiver may perform various user-friendly functions. The broadcasting signal receiver may be a network TV, a HBBTV, and a smart TV, for example. The broadcasting signal receiver may be applied to smart phones.

Figure 3:
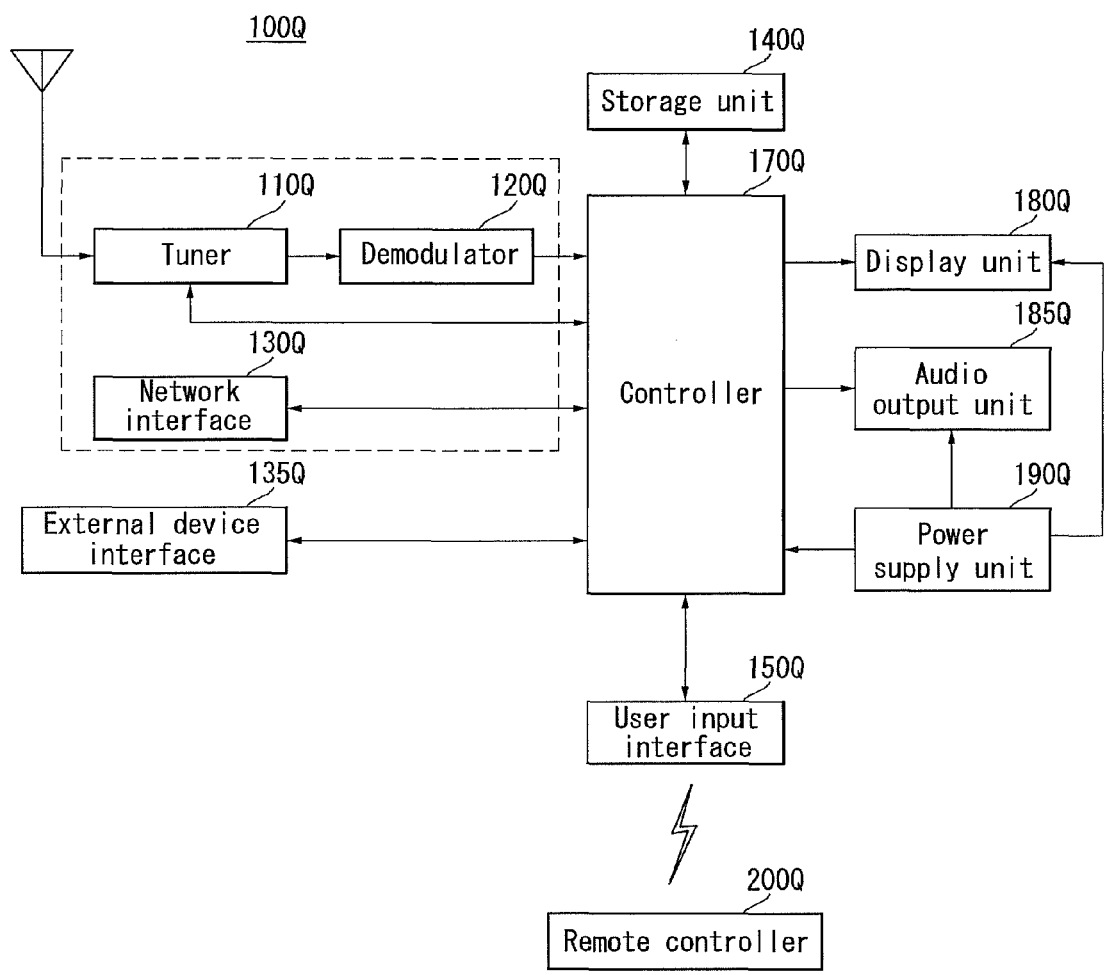
FIGS. 3 to 8 illustrate a configuration and an operation of a broadcasting signal receiver according to an example embodiment.

As shown in FIG. 3, a broadcasting signal receiver 100Q may include a broadcasting receiving unit 105Q, an external device interface 135Q, a storage unit 140Q, a user input interface 150Q, a controller 170Q, a display unit 180Q, an audio output unit 185Q, a power supply unit 190Q, and a photographing unit. The broadcasting receiving unit 105Q may include a tuner 110Q, a demodulator 120Q, and a network interface 130Q.

The broadcasting signal receiver 100Q may be designed such that it includes the tuner 110Q and the demodulator 120Q, and/or does not include the network interface 130Q. On the other hand, the broadcasting signal receiver 100Q may be designed such that it includes the network interface 130Q, and/or does not include the tuner 110Q and the demodulator 120Q.

The tuner 110Q may tune a radio frequency (RF) broadcasting signal that corresponds to a channel selected by the user or all of the previously stored channels, from among RF broadcasting signals received through an antenna. The tuner 110Q may convert the tuned RF broadcasting signal into a middle frequency signal, a base band image signal, and/or a voice signal.

The demodulator 120Q may receive a digital IF signal converted by the tuner 110Q and perform a demodulating operation.

For example, when the digital IF signal output from the tuner 110Q is an ATSC type signal, the demodulator 120Q may perform 8-level vestigal sideband (8-VSB) demodulation. Further, the demodulator 120Q may perform the channel decoding. The demodulator 120Q may include a trellis decoder, a De-interleaver, and a Reed-Solomon decoder, and may thus perform trellis decoding, De-interleaving decoding, and Reed-Solomon decoding.

The demodulator 120Q may perform the demodulation and the channel decoding, and may then output a stream signal. The stream signal may be a signal obtained by multiplexing an image signal, a voice signal, and/or a data signal.

The stream signal output by the demodulator 120Q may be input to the controller 170Q. The controller 170Q may perform demultiplexing, image/voice signal processing, etc. The controller 170Q may output an image to the display unit 180Q and may output a voice to the audio output unit 185Q.

The external device interface 135Q may connect an external device to the broadcasting signal receiver 100Q. The external device interface 135Q may include an audio-visual (AV) input/output unit or a wireless communication unit.

The external device interface 135Q may receive an application or an application list of the external device and may transmit the application or the application list to the controller 170Q or the storage unit 140Q.

The network interface 130Q may provide an interface for connecting the broadcasting signal receiver 100Q to a wired/wireless network that includes an internet network.

The network interface 130Q may transmit or receive the data to or from another user or another electronic device through a network connected to the network interface 130Q or another network linked to the connected network.

The storage unit 140Q may store a program for signal processing of the controller 170Q and the control operation of the controller 170Q, and the storage unit 140Q may store the processed image signal, the processed voice signal, or a data signal.

The storage unit 140Q may temporarily store the image signal, the voice signal, or the data signal received from the external device interface 135Q or the network interface 130Q. The storage unit 140Q may store information regarding a predetermined broadcasting channel through its channel memory function.

FIG. 3 illustrates the broadcasting signal receiver 100Q separately including the storage unit 140Q and the controller 170Q. Other configurations may be provided for the broadcasting signal receiver 100Q. For example, the controller 170Q may include the storage unit 140Q.

The user input interface 150Q may transmit the signal the user inputs to the controller 170Q, or the user interface 150Q may transmit the signal from the controller 170Q to the user.

For example, the user input interface 150Q may receive and process the control signal indicating a turn-on or turn-off operation, a channel selection, a screen setting, etc. from the remote controller 200Q based on various communication manners such as a RF communication manner and an infrared (IR) communication manner. Alternatively, the user input interface 150Q may operate such that the control signal from the controller 170Q is transmitted to the remote controller 200Q.

The user input interface 150Q may transmit a control signal, input from a power key, a channel key, a volume key, a local key, etc., to the controller 170Q.

The user input interface 150Q may transmit a control signal, received from a sensing unit for sensing the user's gesture, to the controller 170Q or may transmit the signal received from the controller 170Q to the sensing unit. The sensing unit may include a touch sensor, an audio sensor, a position sensor, a motion sensor, and/or etc.

The remote controller 200Q may be a touch device for selecting and displaying a touch position in the display unit 180Q. The remote controller 2000 may sense light generated at a predetermined position of the display unit 180Q and may touch the predetermined position on the screen of the display unit 180Q or may touch a predetermined object displayed on the screen of the display unit 180Q. The remote controller 200Q may be described in detail below.

The controller 170Q may perform demultiplexing processing on the stream input through the tuner 110Q, the demodulator 120Q, or the external device interface 135Q or may perform processing of demultiplexed signals, thereby generating or outputting the signals for outputting the image or the voice.

The image signal processed by the controller 170Q may be input to the display unit 180Q and may display an image corresponding to the image signal. The image signal processed by the controller 170Q may be input to an external output device through the external device interface 135Q.

The voice signal processed by the controller 170Q may be output to the audio output unit 185Q. The voice signal processed by the controller 170Q may be input to the external output device through the external device interface 135Q.

The controller 170Q may control the broadcasting signal receiver 100Q using a user command or an internal program input through the user input interface 150Q.

For example, the controller 170Q may control the tuner 110Q such that a signal of a channel selected based on a predetermined channel selection command received through the user input interface 150Q is input. The controller 170Q may process the image signal, the voice signal, or the data signal of the selected channel. The controller 170Q may be driven such that channel information the user selects, along with the processed image signal or the processed voice signal, may be output through the display unit 180Q or the audio output unit 185Q.

As another example, the controller 170Q may be driven such that the image signal or the voice signal from the external device (for example, the camera or the camcorder) input through the external device interface 135Q based on an image display command of the external device received through the user input interface 150Q may be output through the display unit 180Q or the audio output unit 185Q.

The controller 170Q may control the display unit 180Q such that the display unit 180Q displays the image. For example, the controller 170Q may control the display unit 180Q such that the display unit 180Q displays a broadcasting image input through the tuner 110Q, an external input image input through the external device interface 135Q, an image input through the network interface, and/or an image stored in the storage unit 140Q.

When the remote controller 200Q senses light generated at a predetermined position of the display unit 180Q to select or display a touch position on the screen of the display unit 180Q, the controller 170Q may display the touch position on the screen of the display unit 180Q or may select a touched object using information regarding the light sensed by the remote controller 200Q.

The display unit 180Q may convert the image signal, the data signal, and an OSD signal, which are processed by the controller 170Q, or the image signal and the data signal, which are received from the external device interface 135Q, into red, green, and blue signals, and may provide (or generate) a driving signal.

The display unit 180Q may be a plasma display panel (PDP), a liquid crystal display (LCD) panel, an organic light emitting diode (OLED) display panel, a flexible display panel, a three-dimensional display panel, and/or etc. The display unit 180Q may be the OLED display panel using a pen touch manner.

The audio output unit 185Q may receive the voice signal processed by the controller 170Q and may output the voice. The audio output unit 185Q may be implemented as various types of speakers.

The broadcasting signal receiver 100Q may further include the sensing unit that includes at least one of the touch sensor, the audio sensor, the position sensor, and/or the motion sensor, so as to sense the user's gesture. The signal sensed by the sensing unit may be transmitted to the controller 170Q through the user input interface 150Q.

The broadcasting signal receiver 100Q may further include a photographing unit for photographing the user. Image information photographed by the photographing unit may be input to the controller 170Q.

The controller 170Q may sense the user's gesture using the image photographed by the photographing unit, the signal sensed by the sensing unit, and/or a combination thereof.

The power supply unit 190Q may supply electric power required in all of the components of the broadcasting signal receiver 100Q.

The remote controller 200Q may transmit the user command the user inputs to the user input interface 150Q. The remote controller 200Q may use Bluetooth, RF communication, infrared communication, Ultra-wideband (UWB), Zigbee, etc.

The remote controller 200Q may receive the image signal, the voice signal, and/or the data signal output from the user input interface 150Q and may display the image signal, the voice signal, or the data signal and/or may output the voice or the vibration.

Figure 4:
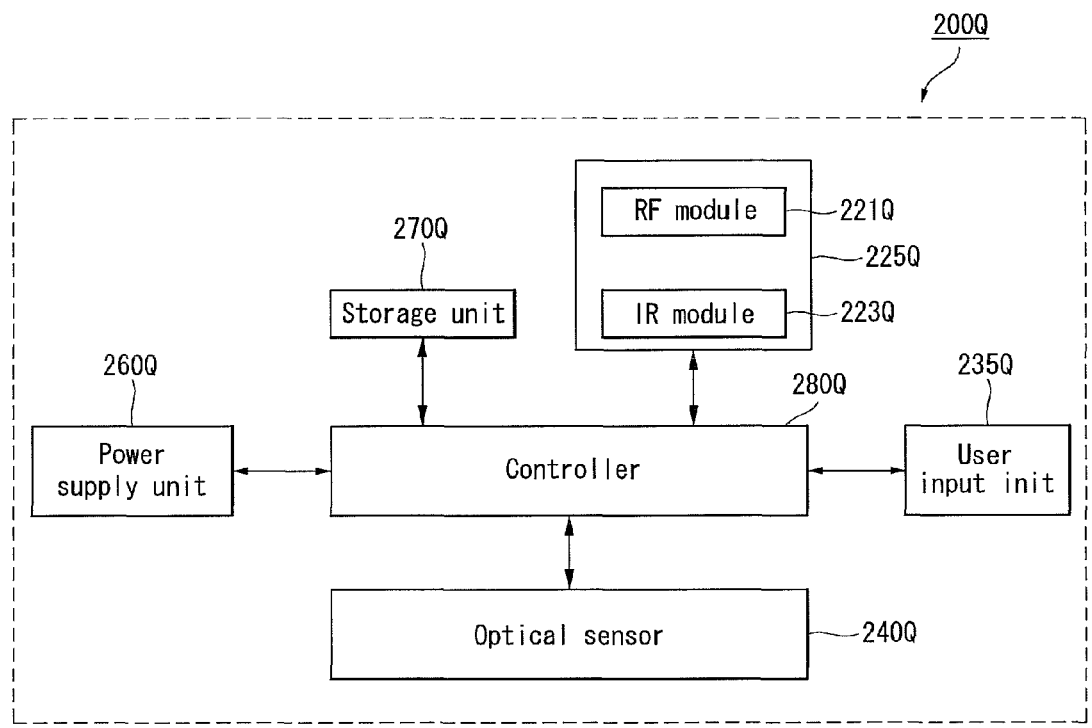

FIG. 4 illustrates a configuration of the remote controller applicable to the broadcasting signal receiver according to an example embodiment. Other embodiments and configurations may also be provided.

As shown in FIG. 4, the remote controller 200Q may include a wireless communication unit 225Q, a user input unit 235Q, a sensor unit 240Q (such as an optical sensor), a power supply unit 260Q, a storage unit 270Q, and a controller 280Q.

The wireless communication unit 225Q may transmit and receive a signal to and from the user input interface 150Q of the broadcasting signal receiver 100Q.

The remote controller 200Q may include an RF module 221Q for transmitting and receiving a signal to and from the broadcasting signal receiver 100Q based on an RF communication standard. The remote controller 200Q may also include an IR module 223Q for transmitting and receiving a signal to and from the broadcasting signal receiver 100Q based on an IR communication standard.

The remote controller 200Q may transmit a signal including information regarding a movement, a light sensing time, etc. of the remote controller 200Q to the broadcasting signal receiver 100Q through the RF module 221Q.

The remote controller 200Q may receive the signal transmitted from the broadcasting signal receiver 100Q through the RF module 221Q. The remote controller 200Q may transmit a command for the power on/off, the channel change, the volume up/down, etc. to the broadcasting signal receiver 100Q through the IR module 223Q.

The user input unit 235Q may include keypads, buttons, a touch pad, etc. The user may operate the user input unit 235Q and may input the command related to the broadcasting signal receiver 100Q to the remote controller 200Q. If the user input unit 235Q includes hard key buttons, the user may input the command related to the broadcasting signal receiver 100Q to the remote controller 200Q through a push operation of the hard key buttons. If the user input unit 235Q includes a touch screen, the user may touch soft keys of the touch screen to thereby input the command related to the broadcasting signal receiver 100Q to the remote controller 200Q. The user input unit 235Q may include various kinds of input means that the user may operate, such as a scroll key and a jog key, for example.

The sensor unit 240Q may include an optical sensor for sensing light generated at a predetermined position of the display unit 180O.

The wireless communication unit 225Q may transmit information of light sensed by the sensor unit 240Q to the user input interface 150Q of the broadcasting signal receiver 100Q under control of the controller 280Q. For example, the wireless communication unit 225Q may transmit information regarding a sensing time of the light sensed by the sensor unit 240Q to the user input interface 150Q.

The sensor unit 240Q may include a gyro sensor and/or an acceleration sensor.

The gyro sensor may sense information regarding a movement of the remote controller 200Q. For example, the gyro sensor may sense information regarding an operation of the remote controller 200Q based on x, y, and z axes. The acceleration sensor may sense information regarding a moving speed of the remote controller 200Q. The sensor unit 240Q may include a distance measuring sensor, and may thus sense a distance between the display unit 180Q and the sensor unit 240Q.

The power supply unit 260Q may supply electric power to the remote controller 200Q. When the remote controller 200Q stops working for a predetermined period of time, the power supply unit 260Q may stop the supply of electric power, thereby reducing use of electric power. When a key included in the remote controller 200Q works, the power supply unit 260Q may again supply the electric power to the remote controller 200Q.

The storage unit 270Q may store several kinds of programs, application data, etc. required in control or operation of the remote controller 200Q. If the remote controller 200Q wirelessly transmits and receives the signal through the broadcasting signal receiver 100Q and the RF module 221Q, the remote controller 200Q and the broadcasting signal receiver 100Q may transmit and receive the signal through a predetermined frequency band. The controller 280Q of the remote controller 200Q may store information regarding the broadcasting signal receiver 100Q paired with the remote controller 200Q and a frequency band capable of wirelessly transmitting and receiving the signal in the storage unit 270Q.

The controller 280Q may control various conditions regarding control of the remote controller 200Q. The controller 280Q may transmit a signal corresponding to a predetermined key operation of the user input unit 235Q or a signal corresponding to movement of the remote controller 200Q sensed by the sensor unit 240Q to the broadcasting signal receiver 100Q through the wireless communication unit 225Q.

An operation of the remote controller 200Q in a touch mode may be described with reference to FIG. 5.

Figure 5:
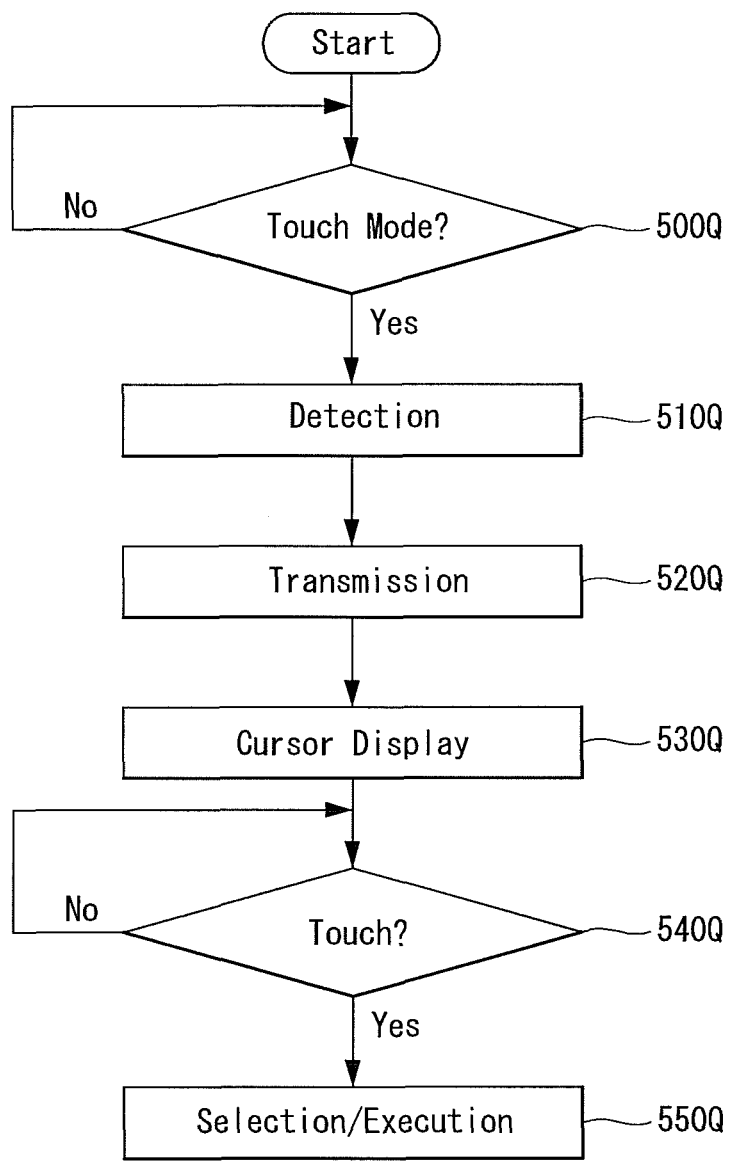

As shown in FIG. 5, a determination may be made regarding whether or not the touch mode is set in operation 500Q. More specifically, a determination may be made regarding whether or not the broadcasting signal receiver 100Q is set to the touch mode based on the user input. Alternatively, it may be determined whether or not the broadcasting signal receiver 100Q has conditions capable of being currently set to the touch mode based on a factor including a distance between a touch device (i.e., the remote controller 200Q) and the display unit 180Q, a direction of the remote controller 200Q, etc.

When the broadcasting signal receiver 100Q is determined to be set to the touch mode, the remote controller 200Q may sense light generated in the display unit 180Q in operation 510Q. For example, the sensor unit 240Q of the remote controller 200Q may sense the light.

The remote controller 200Q may transmit information regarding the light sensed by the sensor unit 240Q in operation 520Q. For example, the wireless communication unit 225Q of the remote controller 200Q may transmit information regarding the light sensed by the sensor unit 240Q to the user input interface 150Q. The information may include information about a sensing time of the light sensed by the sensor unit 240Q.

The controller 170Q of the broadcasting signal receiver 100Q may calculate and obtain information of a touch position based on information received from the user input interface 150Q. For example, the controller 170Q of the broadcasting signal receiver 100Q may compare the information about the sensing time of the light received from the user input interface 150Q with drive information of the display unit 180Q. The controller 170Q may detect pixels of the display unit 180Q emitting light at a time when the sensor unit 240Q senses the light of the display unit 180Q.

The remote controller 200Q may be the touch device that senses the light generated in the display unit 180Q and transmits timing information based on the light sensing to a driver (for example, the controller 170Q) of the broadcasting signal receiver 100Q.

A cursor may be displayed at the touch position (i.e., the touch position that the sensor unit 240 indicates) on the screen of the display unit 180Q under control of the controller 170Q in operation 530Q. The OSC signal may be used to display the cursor.

Figure 6:
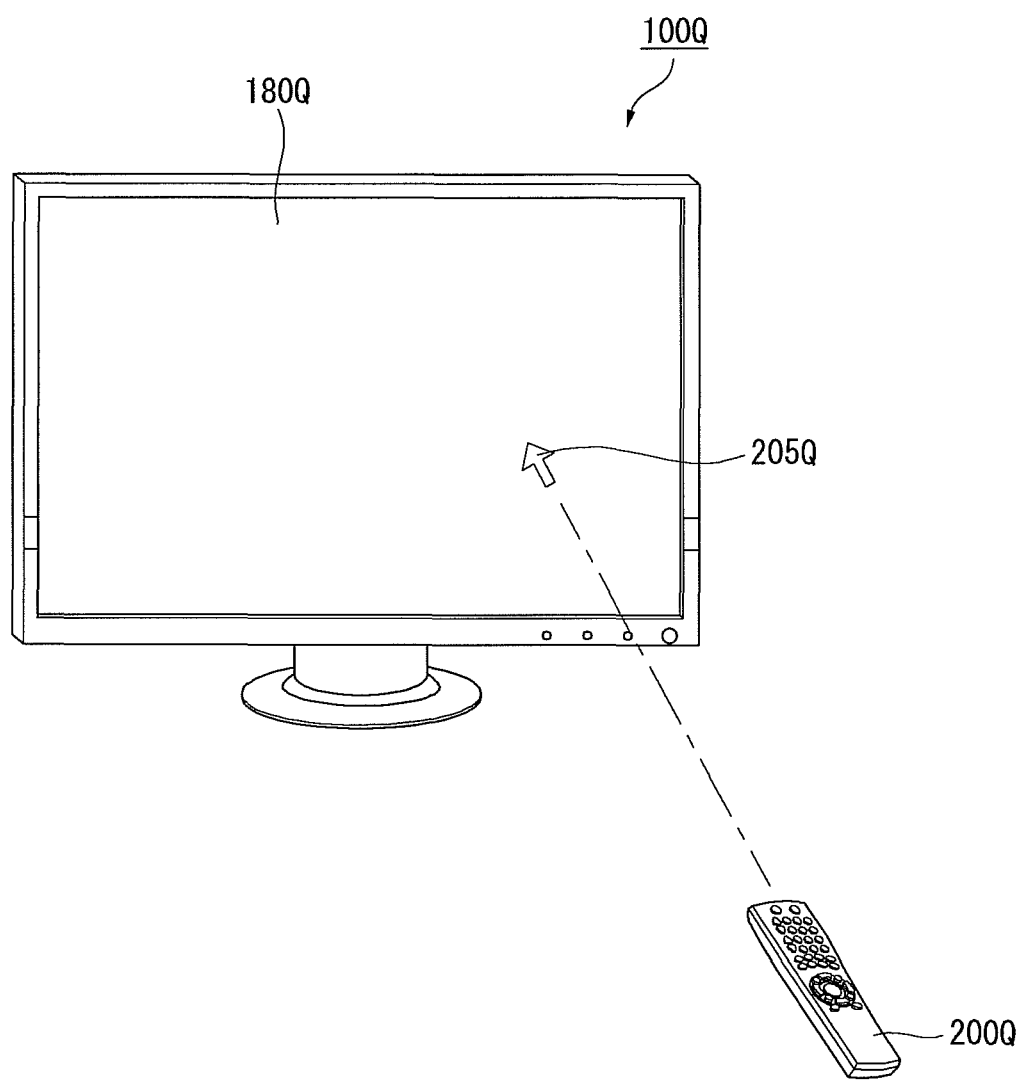
Figure 7:
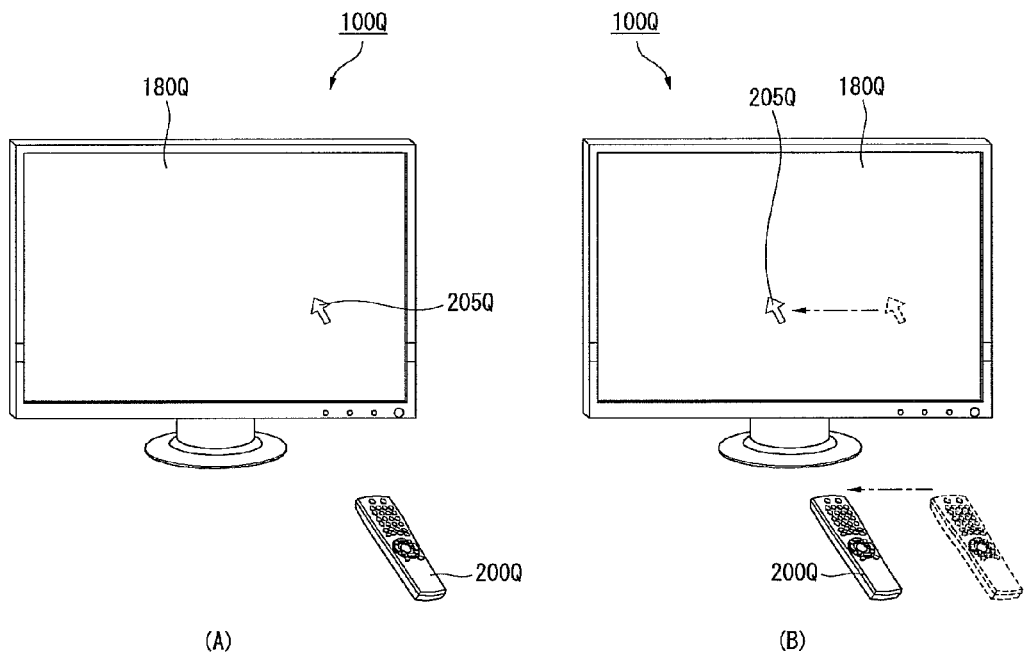
Figure 8:
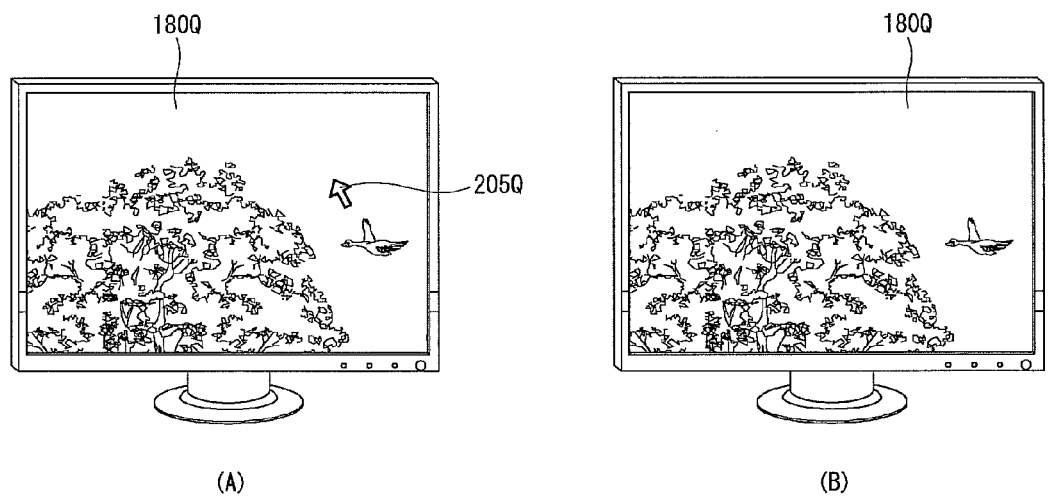

For example, as shown in FIG. 6, a cursor 205Q may be displayed at a predetermined position of the display unit 180Q of the broadcasting signal receiver 100Q. A position of the cursor 205Q may be a position indicated by the remote controller 200Q.

A determination may be made in operation 540Q regarding whether or not a predetermined object is touched at the position of the cursor. Alternatively, it may be determined whether or not a predetermined command is executed.

When the object is touched as a result of a decision, the corresponding object may be selected or the corresponding command may be executed in operation 550Q.

For example, as shown in FIG. 7(A) and FIG. 7(B), when the remote controller 200Q moves in a state where the cursor 205Q is displayed at a predetermined position of the display unit 180Q of the broadcasting signal receiver 100Q, the position of the cursor 205Q on the screen of the display unit 180Q may change.

Alternatively, as shown in FIG. 7(B), when the remote controller 200Q horizontally moves in a state where the cursor 205Q is displayed at a predetermined position of the display unit 180Q, the cursor 205Q on the screen of the display unit 180Q may horizontally move.

The cursor 205Q indicating the touch position may be displayed on the display unit 180Q in the touch mode. The remote controller 200Q may move the cursor 205Q and may select the object that the cursor 205Q indicates, and/or may execute the predetermined command.

As shown in FIG. 8(A), in the touch mode, the cursor 205Q may be displayed on the display unit 180Q.

As shown in FIG. 8(B), in a normal mode, the cursor 205Q is not displayed on the display unit 180Q.

The display unit 180Q of the broadcasting signal receiver 100Q may preferably be the OLED display panel. The plasma display panel may include scan lines and data lines crossing the scan lines. The plasma display panel may sequentially supply a predetermined driving signal to the scan lines, and supply a predetermined driving signal to the data lines. Therefore, the plasma display panel may easily detect horizontal and vertical positions of a touched position.

A touch display device and a multi-touch display device applied to the broadcasting signal receiver may be described in detail below. In the following description, the touch display device and the multi-touch display device may each include the OLED display panel as an example of the display panel.

FIGS. 9 to 13 illustrate an example of an OLED display.

Figure 9:
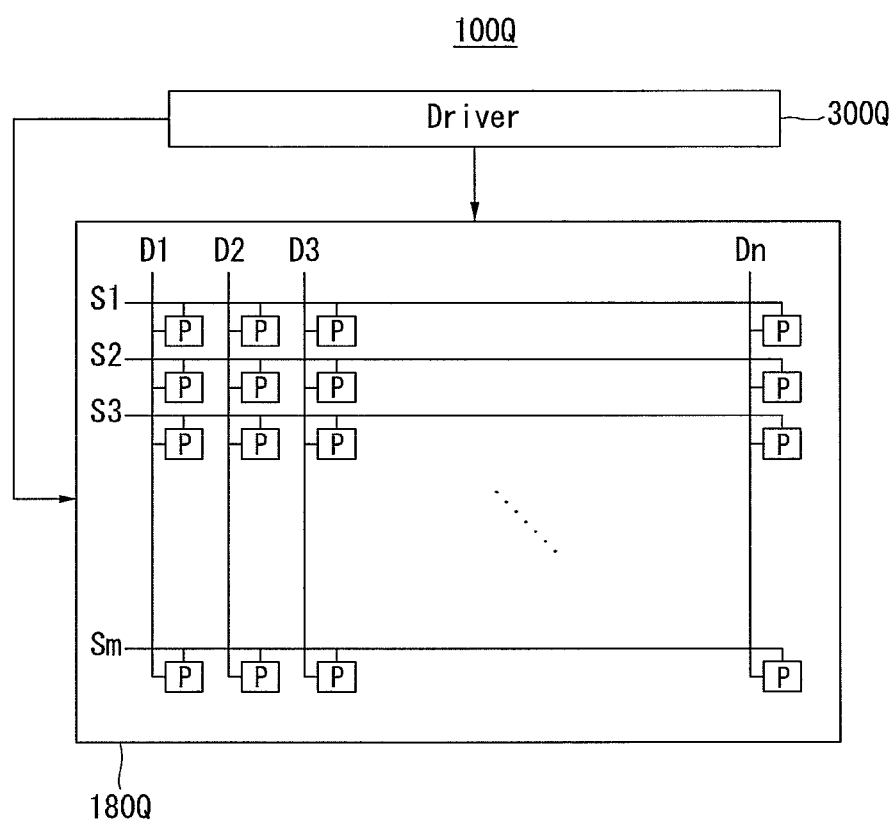
FIGS. 9 to 13 illustrate an example of an organic light emitting diode (OLED) display.

As shown in FIG. 9, an OLED display 100Q may include an OLED display panel 180Q and a driver 300Q.

The OLED display panel 180Q may display an image on the screen. The driver 300Q may represent a gray scale of the image in a frame including at least one subfield.

FIG. 9 shows that the driver 300Q may be configured as one module. However, the driver 300Q may be configured as at least two modules. For example, the driver 300Q may include a data driver for generating and controlling the driving signal supplied to the data lines and a scan driver for generating and controlling the driving signal supplied to the scan lines.

The OLED display panel 180Q may include scan lines S1 to Sm and data lines D1 to Dn crossing the scan lines S1 to Sm. Subpixels P may be disposed at crossings of the scan lines S1 to Sm and the data lines D1 to Dn.

The scan lines S1 to Sm may supply a scan signal to the subpixels P. The scan lines S1 to Sm may provide a supply path of the scan signal generated by the driver 300Q.

The data lines D1 to Dn may supply a data signal to the subpixels P. The data lines D1 to Dn may provide a supply path of the data signal generated by the driver 300Q.

Although not shown in FIG. 9, erase lines, to which an erase signal is supplied, may be provided on the OLED display panel 180Q.

A structure of the subpixel may be described below with reference to FIG. 10.

The subpixel may include an OLED cell. The subpixel may further include a first transistor Tr1, a second transistor Tr2, a third transistor Tr3, and a capacitor C.

When the scan signal is supplied to the scan line Scan, the first transistor Tr1 may be turned on. In this example, when the data signal is supplied to the data line Data, a difference between a power voltage VDD and a voltage Vd of the data signal may be formed between both terminals of the capacitor C. A voltage (VDD-Vd) may be stored in the capacitor C.

The voltage (VDD-Vd) may be supplied to a gate terminal of the third transistor Tr3, and thus the third transistor Tr3 may be turned on. A current resulting from the voltage (VDD-Vd) stored in the capacitor C may be supplied to the OLED cell, and the OLED cell may emit light.

When the erase signal is supplied to the erase line Erase, the second transistor Tr2 may be turned on. Accordingly, both terminals of the capacitor C are short-circuited. As a result, an entire charge voltage of the capacitor C may be discharged, and the third transistor Tr3 may be turned off. Further, the OLED cell may stop emitting light.

Figure 11:
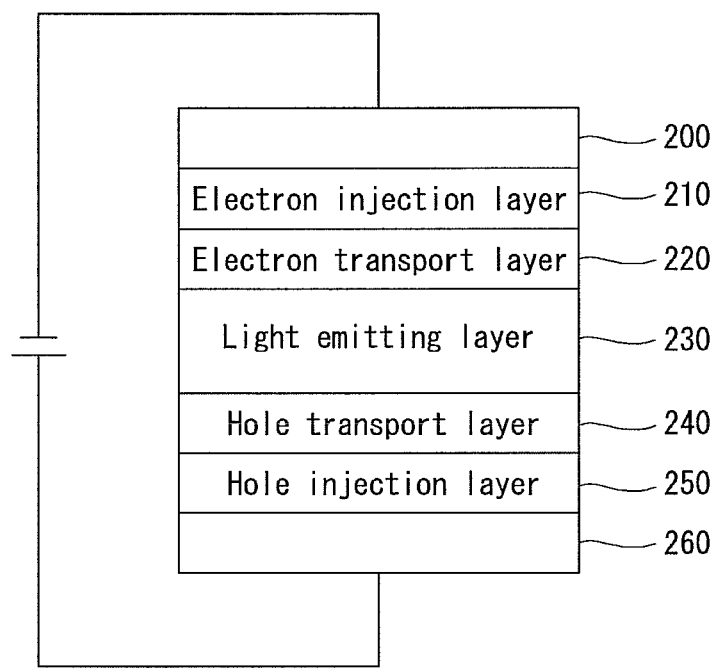

FIG. 11 illustrates a light emitting principle of the OLED cell.

As shown in FIG. 11, the OLED cell may include an electron injection layer 210, an electron transport layer 220, a light emitting layer 230, a hole transport layer 240, and a hole injection layer 250 between a cathode electrode 200 and an anode electrode 260 of the OLED cell.

When the voltage is supplied to the cathode electrode 200 and the anode electrode 260, a gray scale current flows in the OLED cell. Electrons generated in the cathode electrode 200 may move to the light emitting layer 230 through the electron injection layer 210 and the electron transport layer 220.

Holes generated in the anode electrode 260 may move to the light emitting layer 230 through the hole injection layer 250 and the hole transport layer 240.

The electrons supplied from the electron injection layer 210 and the electron transport layer 220 and the holes supplied from the hole injection layer 250 and the hole transport layer 240 may collide with each other and may be recombined with each other in the light emitting layer 230. Light may be generated in the light emitting layer 230 due to collision between the electrons and the holes.

A luminance of the light generated in the light emitting layer 230 may be proportional to a magnitude of gray scale current supplied from the anode electrode 260.

FIG. 11 illustrates an example of the structure and the light emitting principle of the OLED cell. Other embodiments and arrangement may also be provided. For example, at least one of the electron injection layer 210, the electron transport layer 220, the hole transport layer 240, and the hole injection layer 250 may be omitted from the OLED cell.

Figure 12:
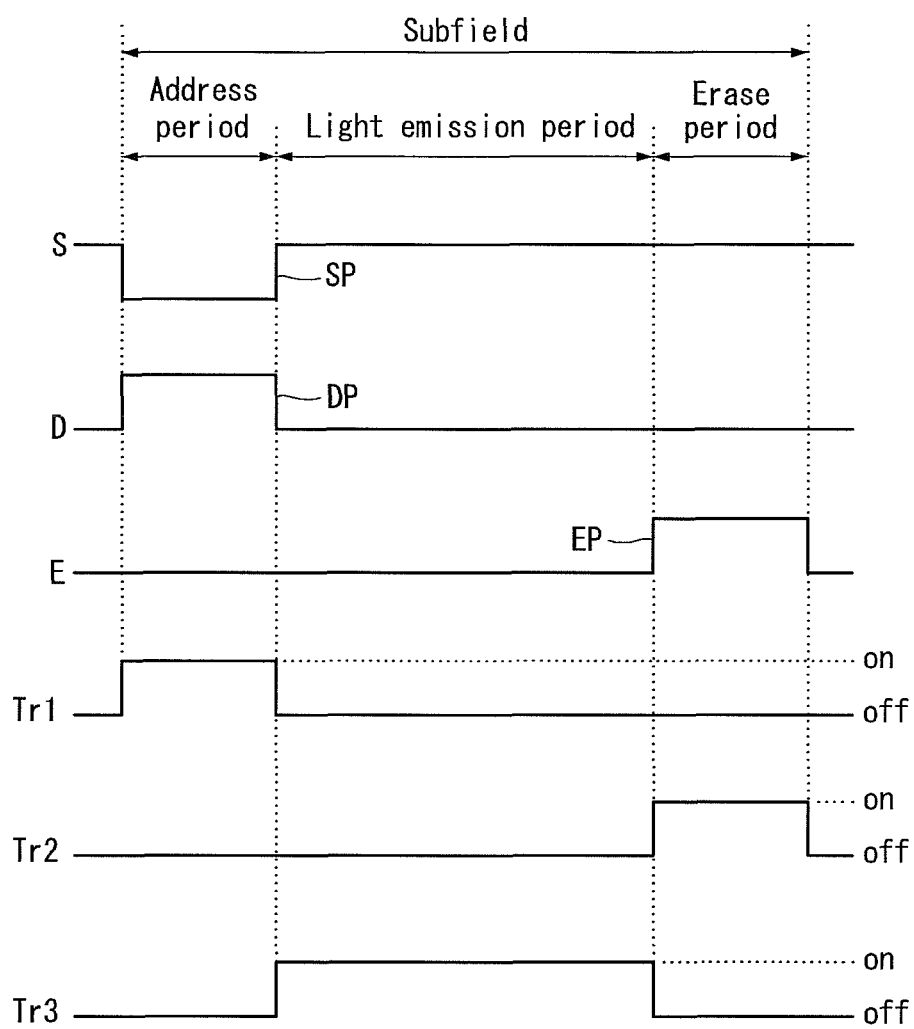
Figure 13:
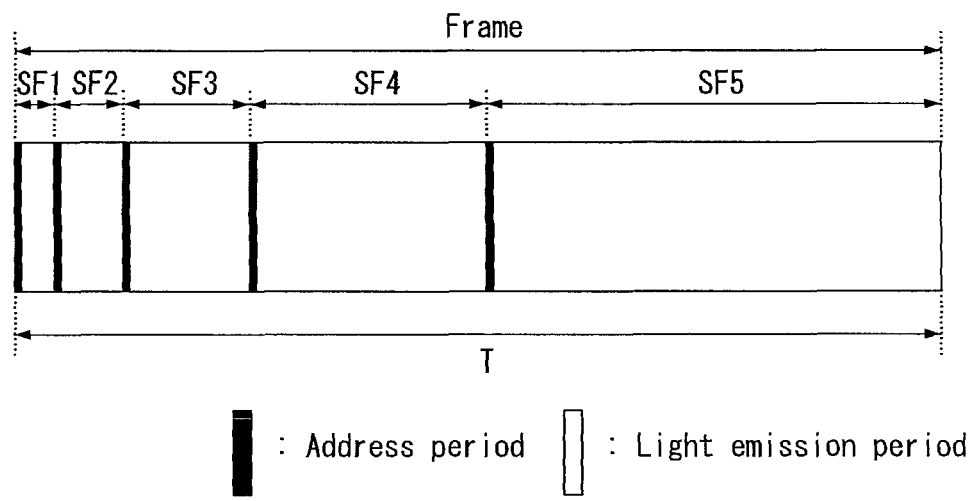

FIGS. 12 and 13 illustrate an example of an operation of the OLED display. The structure of the subpixel shown in FIG. 10 may be provided in FIGS. 12 and 13 as an example.

In the following description, a digital driving method may be applied to the OLED display as an example. However, an analog driving method may be applied to the OLED display.

As shown in FIG. 12, the driver may supply (or provide) a scan signal SP to a scan line S and the driver may supply (or provide) a data signal DP to a data line D in an address period of a subfield.

Accordingly, the first transistor Tr1 may be turned on. As described above, the voltage (VDD-Vd) may be stored in the capacitor C.

In a light emission period that follows the address period, the driver does not supply the scan signal SP to the scan line S. Accordingly, the voltage (VDD-Vd) stored in the capacitor C may be supplied to the gate terminal of the third transistor Tr3, and thus the third transistor Tr3 may be turned on. As a result, a current resulting from the voltage (VDD-Vd) stored in the capacitor C may be supplied to the OLED cell, and the OLED cell may emit light.

In an erase period that follows the light emission period of FIG. 12, the driver may supply an erase signal Ep to an erase line E. Accordingly, the second transistor Tr2 may be turned on. As a result, the capacitor C may be discharged, and the OLED cell may stop emitting light.

FIG. 12 shows that one subfield may include the address period, the light emission period, and the erase period. However, the erase period may be omitted.

A plurality of subfields each having the above-described structure may be configured as one frame. FIG. 13 shows an example of a structure of the frame.

As shown in FIG. 13, a frame for representing a gray scale of the image may include a plurality of subfields each having a different weight value.

For example, as shown in FIG. 13, if an image with 32-gray level is to be displayed, a frame may be separated (or divided) into 5 subfields SF1 to SF5. Each of the 5 subfields SF1 to SF5 may include an address period, a light emission period, and an erase period.

A weight value of a subfield may be set by adjusting a length of a light emission period of the subfield. For example, in a method of setting a weight value of a first subfield to $2^0$ and a weight value of a second subfield to $2^1$, the subfields may be controlled such that a weight value of each subfield may increase in a ratio of $2^n$ (where n=0, 1, 2, 3, 4).

A number of representable gray levels in one frame having the above-described structure may be 34 (=$2^0+2^1+2^2+2^3+2^4$). For example, if an image with 32-gray level is to be displayed, all of the first to fifth subfields SF1 to SF5 may be turned on. The data signal may be supplied to the data line in the address periods of the first to fifth subfields SF1 to SF5, and thus the OLED cell may emit light in the light emission periods that follow the address periods. On the other hand, if an image with 10-gray level is to be displayed, the second subfield SF2 having the weight value of 2 (=$2^1$) and the fourth subfield SF having the weight value of 8 (=$2^3$) may be turned on.

The plurality of frames may be used for one second. When 60 frames are used for one second, a length T of one frame may be ⅟60 second (i.e., approximately 16.67 ms). When 50 frames are used for one second, a length T of one frame may be approximately 20 ms.

Although FIG. 13 shows that one frame includes 5 subfields, the number of subfields constituting a frame may vary. For example, a frame may include 10 or 12 subfields.

Although FIG. 13 shows that the subfields of the frame are arranged in an increasing order of weight values, the subfields may be arranged in a decreasing order of weight values or may be arranged regardless of weight values.

FIGS. 14 to 49 illustrate an operation of a touch display device in a touch mode according to an example embodiment. In the following description, descriptions of the configuration and the structure described above may be omitted.

Figure 14:
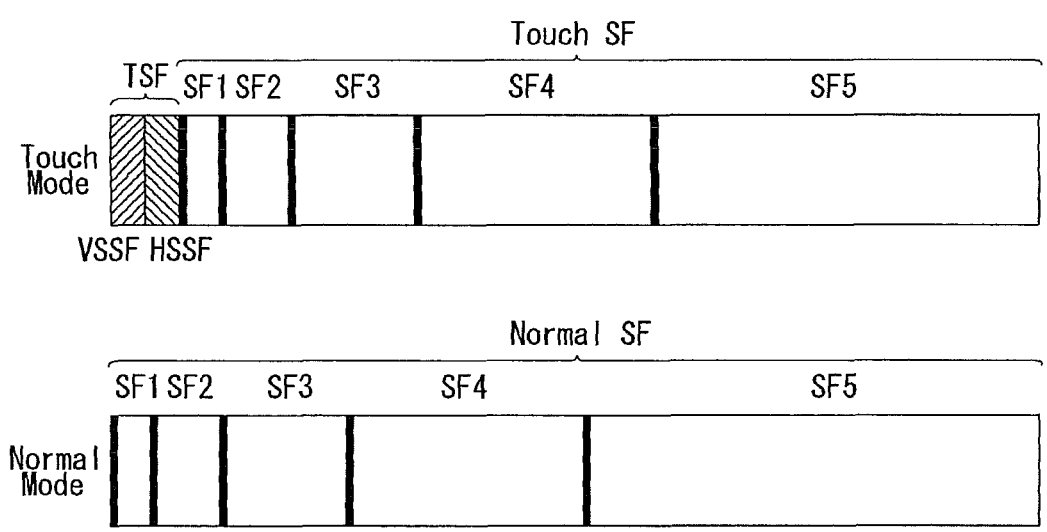
FIGS. 14 to 49 illustrate an operation of a touch display device in a touch mode according to an example embodiment.
Figure 15:
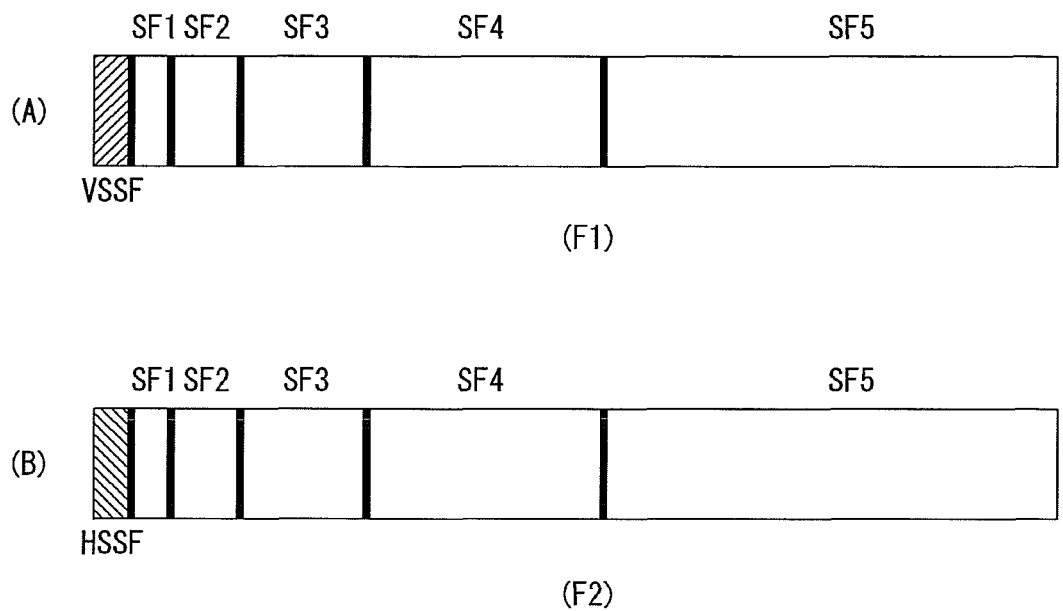

As shown in FIG. 14, one frame may include at least one touch subfield in a touch mode. For example, at least one touch subfield may be provided in a first half of the frame or the second half of the frame, so as to detect a touch position.

In a normal mode, the touch subfield may be omitted in the frame.

In other words, as described above with reference to FIG. 6, when the cursor 205Q is displayed on the display unit 180Q, at least one touch subfield may be included in the frame.

As shown in FIG. 14, the touch subfield may include a vertical touch subfield VSSF to detect a vertical position of the touch position and a horizontal touch subfield HSSF to detect a horizontal position of the touch position.

For example, in the touch mode, a first subfield of a plurality of subfields of a frame may be a vertical touch subfield, and a second subfield may be a horizontal touch subfield.

The vertical touch subfield and the horizontal touch subfield may be successively arranged in one frame.

FIG. 14 shows that the vertical touch subfield may be arranged prior to the horizontal touch subfield in one frame. However, the horizontal touch subfield may be arranged prior to the vertical touch subfield in one frame. For ease of description, the following may relate to the vertical touch subfield being arranged prior to the horizontal touch subfield.

FIG. 14 shows that one frame includes both the vertical touch subfield VSSF and the horizontal touch subfield HSSF. However, the vertical touch subfield VSSF and the horizontal touch subfield HSSF may be included in different frames. For example, a first frame F1 may include the vertical touch subfield VSSF (as shown in FIG. 15(A)), and a second frame F2 may include the horizontal touch subfield HSSF (as shown in FIG. 15(B)).

Figure 16:
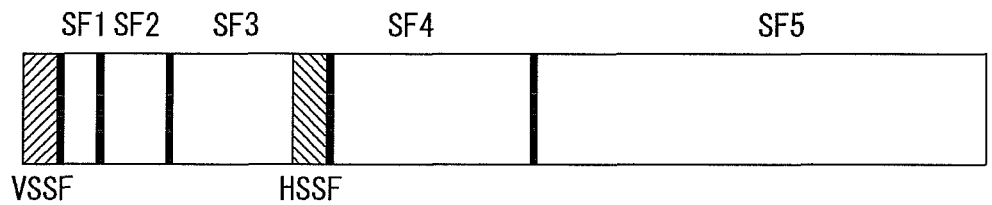

Alternatively, as shown in FIG. 16, one frame may include both the vertical touch subfield VSSF and the horizontal touch subfield HSSF, and at least one normal subfield may be arranged between the vertical touch subfield VSSF and the horizontal touch subfield HSSF.

Unlike FIGS. 13 to 16, even when an analog driving method is applied to the OLED display, one frame may include at least one touch subfield, such as the vertical touch subfield VSSF and the horizontal touch subfield HSSF, for example.

In the example embodiment, in the vertical touch subfield VSSF, a touch scan signal TSP may be supplied (or provided) to a plurality of scan line groups each including at least one scan line in a predetermined order, and a touch data signal TDP corresponding to the touch scan signal TSP may be supplied (or provided) to the data lines.

Figure 17:
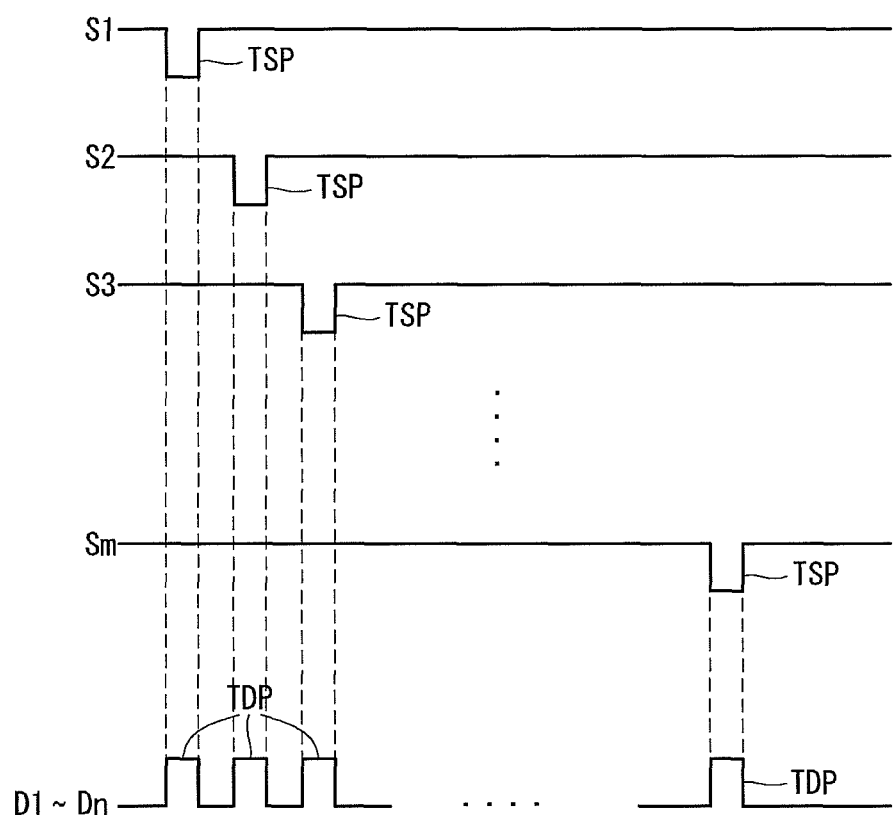

For example, as shown in FIG. 17, the touch scan signal TSP may be sequentially supplied to the plurality of scan lines in the vertical touch subfield VSSF.

The touch data signal TDP corresponding to the touch scan signal TSP may be supplied to the data lines in the vertical touch subfield.

Light may be sequentially generated in a vertical direction of the panel in the vertical touch subfield VSSF.

The remote controller may sense light that is sequentially generated in the vertical direction of the panel in the vertical touch subfield VSSF, to calculate and obtain a vertical position of the touch position.

The supply order of the touch scan signal TSP is not limited to the order shown in FIG. 17.

In the example embodiment, in the horizontal touch subfield HSSF, the touch data signal TDP may be supplied to a plurality of data line groups each including at least one data line in a predetermined order, and the touch scan signal TSP corresponding to the touch data signal TDP may be supplied to the scan lines.

Figure 18:
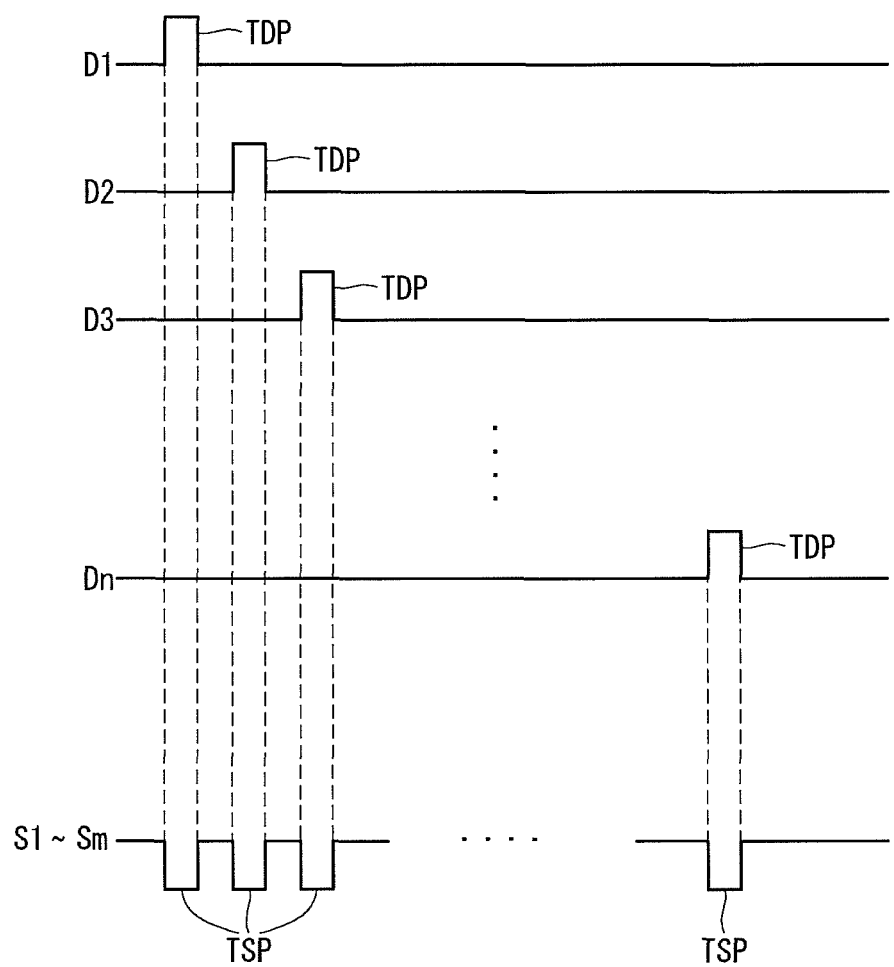

For example, as shown in FIG. 18, the touch data signal TDP may be sequentially supplied to the plurality of data lines in the horizontal touch subfield.

The touch scan signal TSP corresponding to the touch data signal TDP may be supplied to the scan lines in the horizontal touch subfield.

Light may be sequentially generated in a horizontal direction of the panel in the horizontal touch subfield.

The remote controller may sense light that is sequentially generated in the horizontal direction of the panel in the horizontal touch subfield HSSF, to calculate and obtain a horizontal position of the touch position.

The supply order of the touch data signal TDP is not limited to the order shown in FIG. 18.

The remote controller 200Q may sense light generated in a predetermined OLED cell (or a pixel) at a time when the OLED cell (or the pixel) emits light at a predetermined position of the panel. In this example, the remote controller 200Q may compare information regarding a sensing time of the light with information regarding a supply time of the touch scan signal shown in FIG. 17 to confirm (or determine) a vertical position of a touch position corresponding to the sensed light.

The remote controller 200Q may compare the information regarding the sensing time of the light with information regarding a supply time of the touch data signal shown in FIG. 18 to confirm (or determine) a horizontal position of the touch position corresponding to the sensed light.

Figure 19:
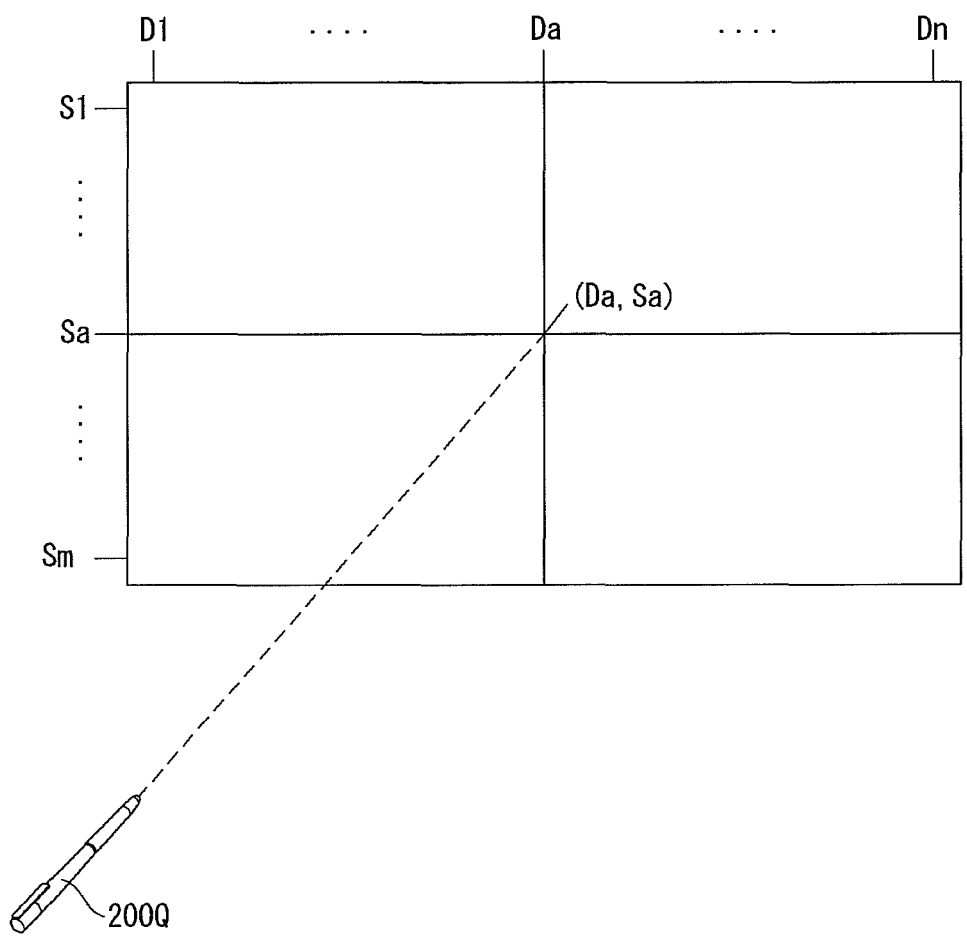

For example, as shown in FIG. 19, it is assumed that the remote controller 200Q points at a crossing (Da, Sa) of a data line Da and a scan line Sa on the panel.

In this example, the remote controller 200Q may sense light generated in a plurality of cells corresponding to the data line Da to confirm (or determine) information regarding a horizontal coordinate of a touch position. The remote controller 200Q may sense light generated in a plurality of cells corresponding to the scan line Sa to confirm (or determine) information regarding a vertical coordinate of the touch position.

In the example embodiment, the vertical coordinate of the touch position may be obtained using light generated in the vertical touch subfield VSSF, and the horizontal coordinate of the touch position may be obtained using light generated in the horizontal touch subfield HSSF.

Figure 20:
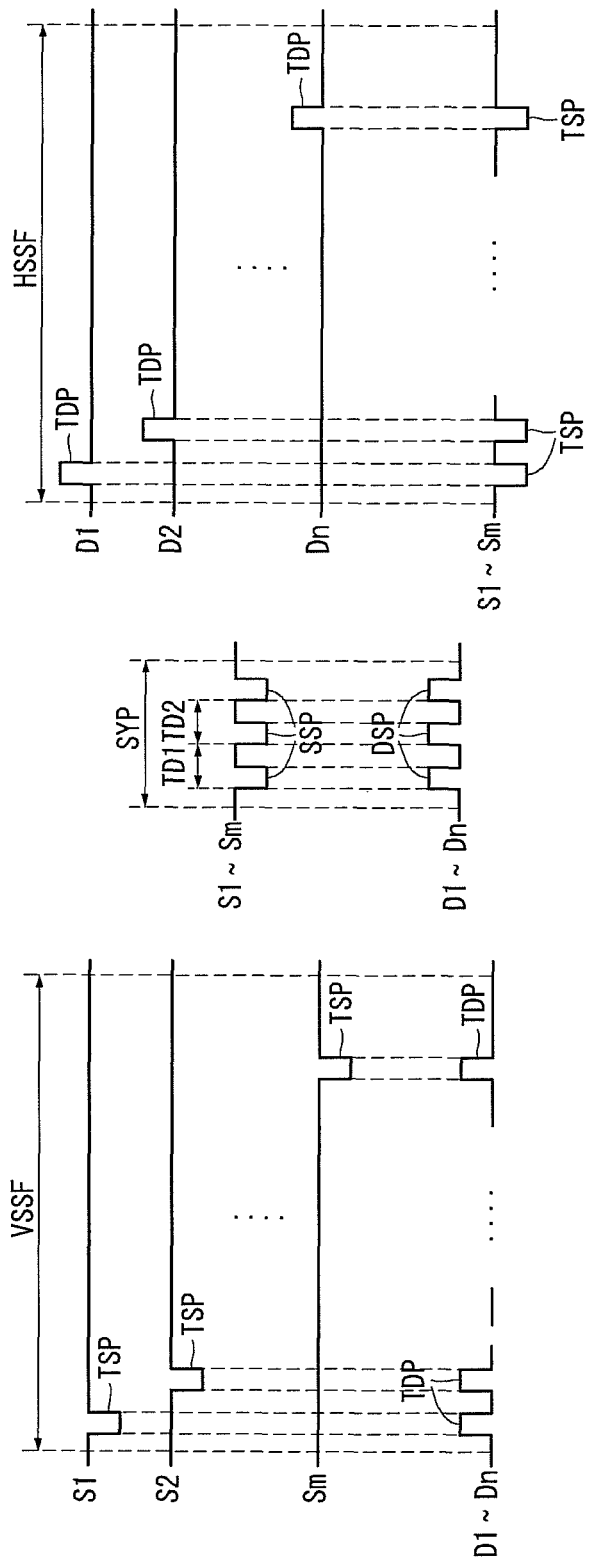

In the example embodiment, as shown in FIG. 20, in at least one subfield of a frame, at least one scan sync signal SSP may be supplied to the scan line, and at least one data sync signal DSP may be supplied to the data line.

In this example, the scan sync signal SSP may be supplied to all the scan lines, and the data sync signal DSP may be supplied to all the data lines.

The scan sync signal SSP and the touch scan signal TSP may have a same form and a same voltage magnitude.

The data sync signal DSP and the touch data signal TDP may have a same form and a same voltage magnitude.

When the vertical touch subfield VSSF and the horizontal touch subfield HSSF are successively arranged, the scan sync signal SSP and the data sync signal DSP may be supplied between the vertical touch subfield VSSF and the horizontal touch subfield HSSF.

For example, as shown in FIG. 20, during a period SYP ranging from after a last touch scan signal TSP is supplied in the vertical touch subfield VSSF to before a first touch data signal TDP is supplied in the horizontal touch subfield HSSF, the scan sync signal SSP may be supplied (or provided) to the scan lines S1 to Sm, and the data sync signal DSP may be supplied (or provided) to the data lines D1 to Dn. The period SYP, during which the sync signals are supplied, may be referred to as a sync period. The sync period SYP may be included in the vertical touch subfield VSSF or the horizontal touch subfield HSSF. Alternatively, the sync period SYP may be included in a normal subfield other than the vertical touch subfield VSSF and the horizontal touch subfield HSSF.

The data sync signal DSP may correspond to the scan sync signal SSP. In other words, the data sync signal DSP may overlap the scan sync signal SSP.

The scan sync signal SSP and the data sync signal DSP may be referred to as sync signals for ease of description and understanding.

Figure 21:
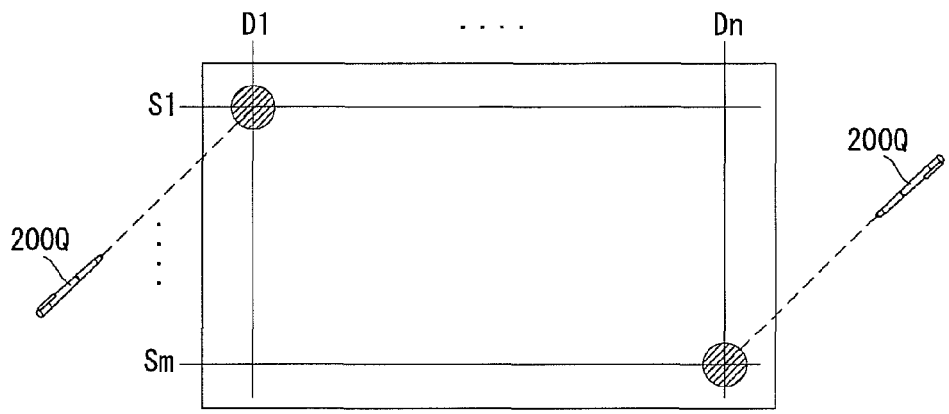
Figure 21:
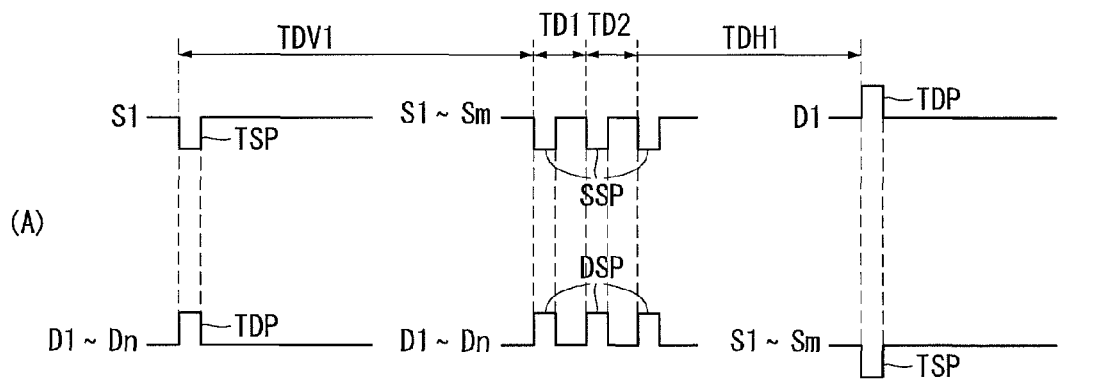
Figure 21:
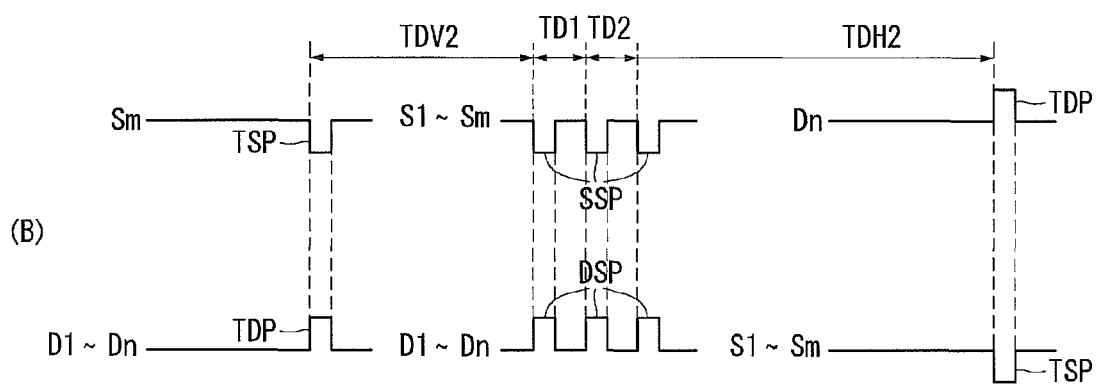
Figure 22:
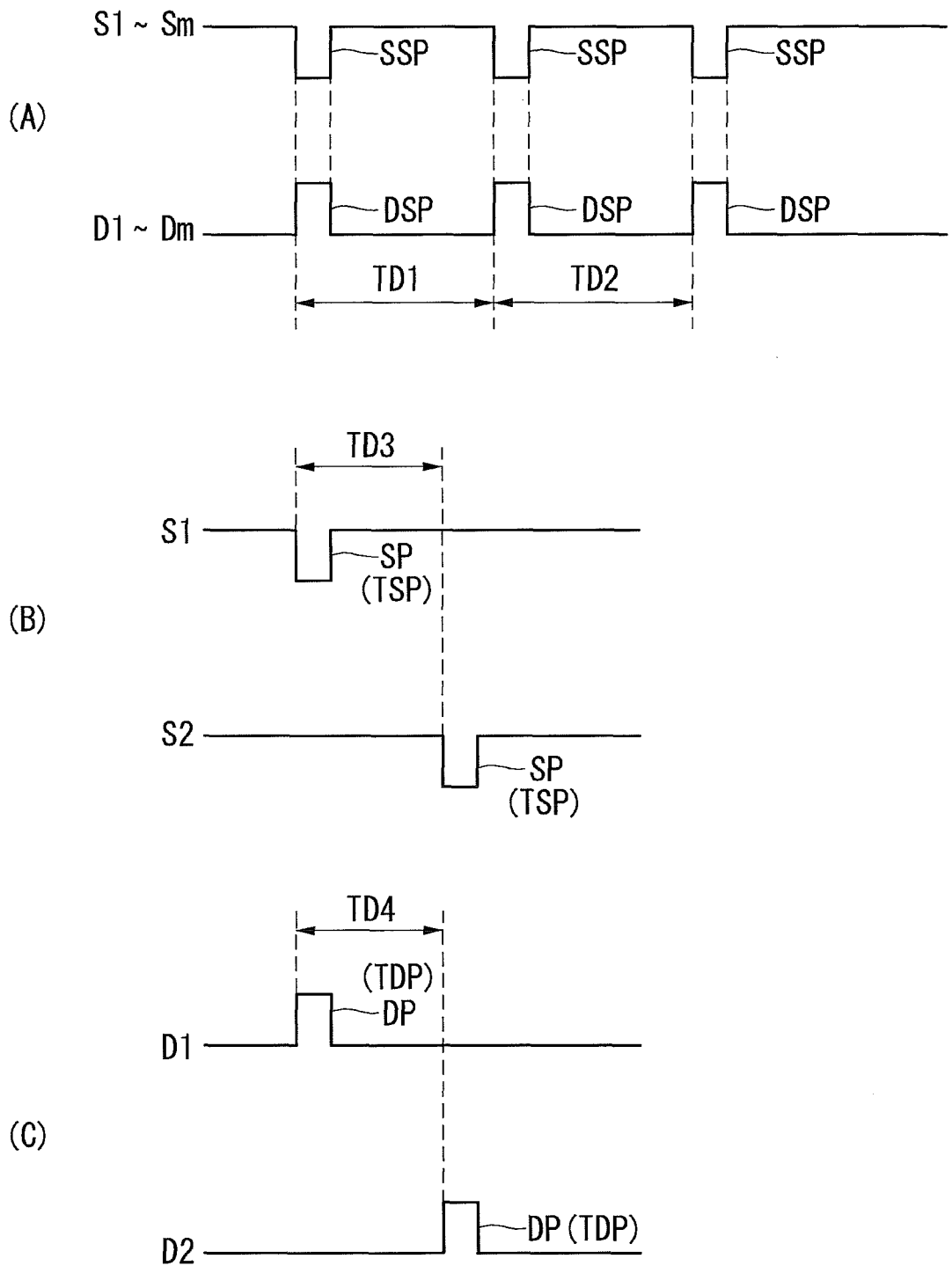

FIG. 21 illustrates a comparison between a first example where the user touches a crossing of a first scan line S1 and a first data line D1 using the remote controller 200Q, and a second example where the user touches a crossing of a mth scan line Sm and a nth data line Dn using the remote controller 200Q. In FIG. 21, it is assumed that the touch scan signal is sequentially supplied to the plurality of scan lines and the touch data signal is sequentially supplied to the plurality of data lines in the same manner as shown in FIGS. 17 and 18.

As shown in FIG. 21(A), in the first example, the touch scan signal TSP is supplied to the first scan line S1 in the vertical touch subfield VSSF. After a period TDV1 with a relatively long duration passes, the sync signals SSP and DSP may be supplied to the scan lines S1 to Sm and the data lines D1 to Dn in the sync period SYP.

After a period TDH1 with a relatively short duration passes, the touch data signal TDP may be supplied to the first data line D1 in the horizontal touch subfield HSSF.

On the other hand, as shown in FIG. 21(B), in the second example, the touch scan signal TSP is supplied to the mth scan line Sm in the vertical touch subfield VSSF. After a period TDV2 with a relatively short duration passes, the sync signals SSP and DSP may be supplied to the scan lines S1 to Sm and the data lines D1 to Dn in the sync period SYP.

After a period TDH2 with a relatively long duration passes, the touch data signal TDP may be supplied to the nth data line Dn in the horizontal touch subfield HSSF.

In the first example, the remote controller 200Q may sense light generated in a formation area of the first scan line S1 and may then sense light generated by the sync signals SSP and DSP after the period TDV1 has passed. The remote controller 200Q may sense light generated in a formation area of the first data line D1 after the period TDH1 has passed.

In the second example, the remote controller 200Q may sense light generated in a formation area of the mth scan line Sm and may then sense light generated by the sync signals SSP and DSP after the period TDV2 has passed. The remote controller 200Q may sense light generated in a formation area of the nth data line Dn after the period TDH2 has passed.

A difference between a generation time of light resulting from the touch scan signal TSP and a generation time of light resulting from the sync signals SSP and DSP may be different from a difference between a generation time of light resulting from the sync signals SSP and DSP and a generation time of light resulting from the touch data signal TDP depending on the area of the panel.

A position (i.e., vertical and horizontal coordinates of the touch position) at which the remote controller 200Q points may be calculated and obtained by analyzing a difference between a generation time of light resulting from the touch scan signal TSP and a generation time of light resulting from the sync signals SSP and DSP and a difference between a generation time of light resulting from the sync signals SSP and DSP and a generation time of light resulting from the touch data signal TDP.

A difference between supply time points of the two adjacent scan sync signals SSP may be different from a difference between supply time points of other signals.

For example, a difference TD1 (or TD2) between supply time points of the two successively supplied scan sync signals SSP in the sync period SYP as shown in FIG. 22(A) may be different from a difference TD3 between supply time points of scan signals SP supplied to the scan lines in other periods excluding a touch subfield and the sync period SYP from a frame shown in FIG. 22(B). For example, in the digital driving method, a waveform shown in FIG. 22(B) may be a driving waveform in a normal subfield.

Further, the difference TD1 (or TD2) between the supply time points of the two successively supplied scan sync signals SSP in the sync period SYP may be different from a difference between supply time points of the touch scan signals TSP supplied to the scan line in the touch subfield.

The difference TD1 (or TD2) between the supply time points of the two successively supplied scan sync signals SSP in the sync period SYP may be different from a difference TD4 between supply time points of data signals DP supplied to the data lines in other periods excluding a touch subfield and the sync period SYP from a frame shown in FIG. 22(C). For example, in the digital driving method, a waveform shown in FIG. 22(C) may be a driving waveform in a normal subfield.

The difference TD1 (or TD2) between the supply time points of the two successively supplied scan sync signals SSP in the sync period SYP may be different from a difference between supply time points of the touch data signals TDP supplied to the data line in the touch subfield.

The difference TD1 (or TD2) between the supply time points of the two successively supplied scan sync signals SSP in the sync period SYP may be the same as or different from a difference between supply time points of the two successively supplied data sync signals DSP.

In the sync period SYP, an erase sync signal TEP may be supplied along with the sync signal. For example, when the OLED display panel includes erase lines in addition to the scan lines and the data lines, the erase sync signal TEP may be supplied to the erase lines in the sync period SYP.

Figure 23:
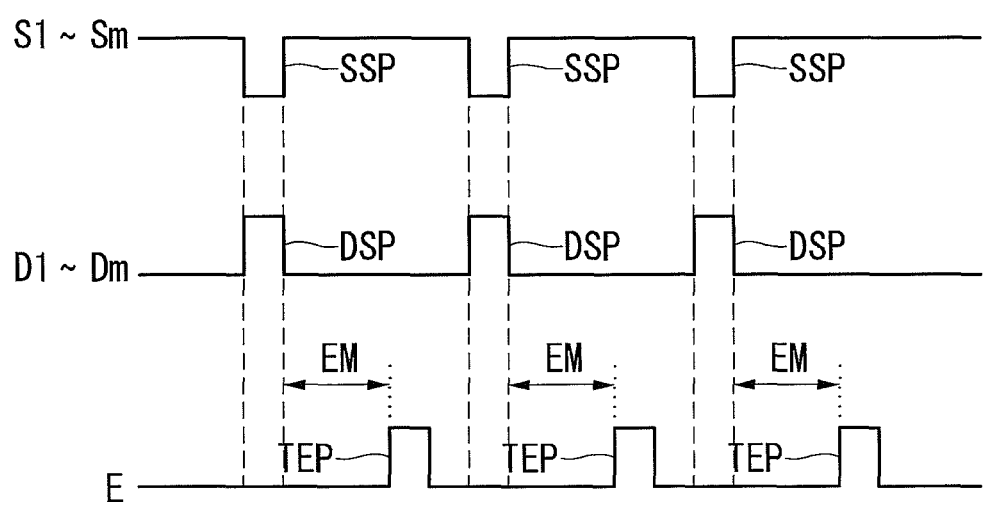

For example, as shown in FIG. 23, the scan sync signal SSP may be supplied to the scan lines S1 to Sm, and the data sync signal DSP may be supplied to the data lines D1 to Dn. After a predetermined time EM has passed, the erase sync signal TEP may be supplied to an erase line E.

Light may be generated by the scan sync signal SSP and the data sync signal DSP in the OLED cell for the predetermined time EM. The light emission may end by the erase sync signal TEP.

In other words, the erase sync signal TEP may control a hold time of light generated by the sync signals SSP and DSP. It may be easy to set a difference between supply time points of the two adjacent sync signals (for example, the difference between the supply time points of the two successively supplied scan sync signals SSP) to be different from a difference between supply time points of other signals.

Differences between supply time points of the two adjacent sync signals in the sync period SYP may be set to be different from each other. More specifically, when the number of data sync signals DSP is three or more, differences between supply time points of the two adjacent data sync signals DSP may be different from each other. Further, when the number of scan sync signals SSP is three or more, differences between supply time points of the two adjacent scan sync signals SSP may be different from each other. Hereinafter, differences between the supply time points of the data sync signals DSP may be described for ease of description and understanding.

Figure 24:
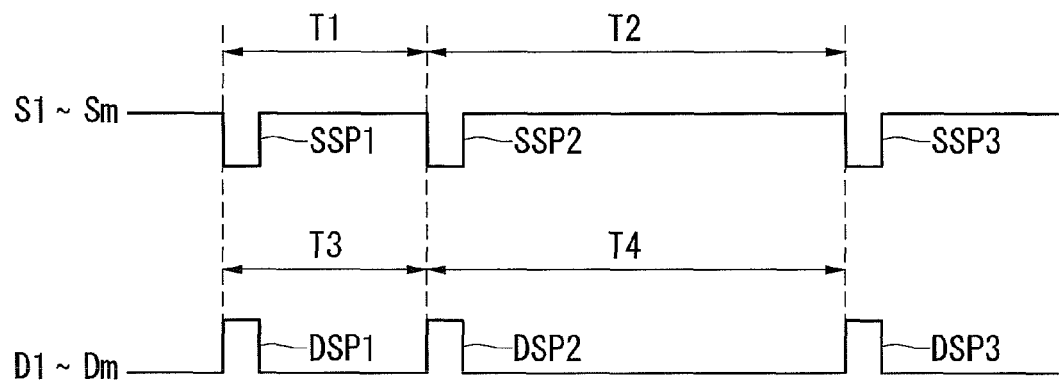

For example, as shown in FIG. 24, supposing that first, second, and third data sync signals DSP1, DSP2, and DSP3 are supplied (or provided) to the data lines D1 to Dn in the sync period SYP, a difference T3 between supply time points of the first and second data sync signals DSP1 and DSP2 may be different from a difference T4 between supply time points of the second and third data sync signals DSP2 and DSP3.

In this example, a difference between application time points of the first and second data sync signals DSP1 and DSP2 may be different from a difference between application time points of the second and third data sync signals DSP2 and DSP3. Further, a difference between application time points of first and second scan sync signals SSP1 and SSP2 may be different from a difference between application time points of second and third scan sync signals SSP2 and SSP3.

On the other hand, the difference T3 between the supply time points of the first and second data sync signals DSP1 and DSP2 may be almost the same as the difference T4 between the supply time points of the second and third data sync signals DSP2 and DSP3.

Figure 25:
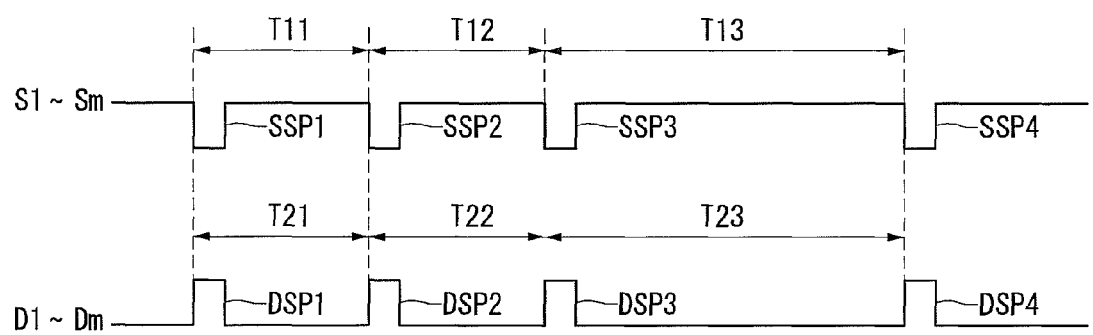

Alternatively, as shown in FIG. 25, supposing that first, second, third, and fourth data sync signals DSP1, DSP2, DSP3, and DSP3 are supplied to the data lines D1 to Dn in the sync period SYP, a difference T21 between supply time points of the first and second data sync signals DSP1 and DSP2 may be substantially the same as a difference T22 between supply time points of the second and third data sync signals DSP2 and DSP3. Further, the difference T22 between the supply time points of the second and third data sync signals DSP2 and DSP3 may be different from a difference T23 between supply time points of the third and fourth data sync signals DSP3 and DSP4.

The plurality of sync signals may be supplied in conformity with a predetermined pattern.

The erase signal may be supplied in the vertical touch subfield and/or the horizontal touch subfield, so as to precisely calculate and obtain the vertical and horizontal coordinates of the touch position.

Figure 26:
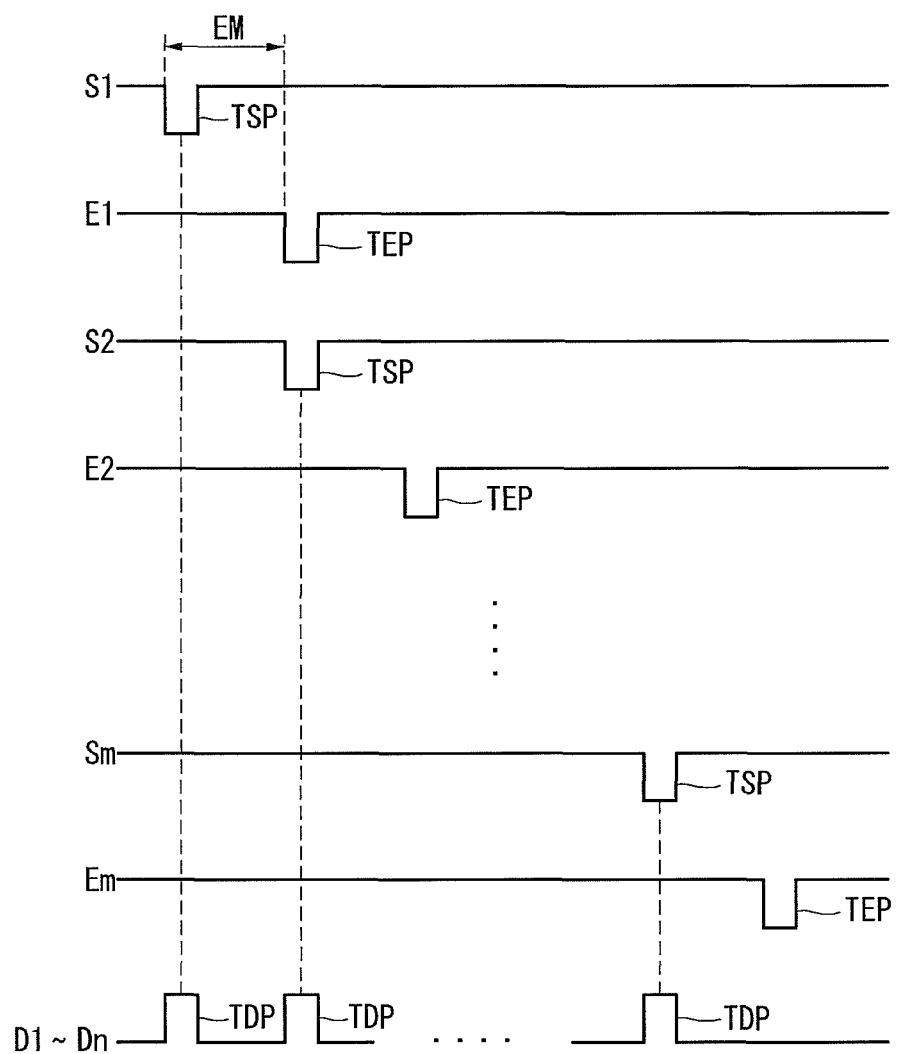

For example, as shown in FIG. 26, it is assumed that the touch scan signal TSP is supplied to the first scan line S1 in the vertical touch subfield VSSF, and then the touch scan signal TSP is supplied to the second scan line S2.

In this example, after a predetermined time EM has passed from the supply of the touch scan signal TSP to the first scan line S1, a touch erase signal TEP may be supplied to a first erase line E1.

Light may be generated by the touch scan signal TSP and the touch data signal TDP in the plurality of OLED cells corresponding to the first scan line S1 for the predetermined time EM, and then the light emission may end by the touch erase signal TEP.

Afterwards, the touch scan signal TSP may be supplied to the second scan line S2.

In this example, before light is generated by the touch scan signal TSP and the touch data signal TDP in the plurality of OLED cells corresponding to the second scan line S2, the light emission in the plurality of OLED cells corresponding to the first scan line S1 may end. Light generated in the plurality of OLED cells corresponding to the first scan line S1 may be prevented from being mixed with light generated in the plurality of OLED cells corresponding to the second scan line S2.

The touch erase signal TEP supplied to the first erase line E1 may overlap the touch scan signal TSP supplied to the second scan line S2.

FIG. 26 shows that while the touch scan signal TSP is supplied to the scan line in the vertical touch subfield VSSF, the touch erase signal TEP may be supplied to the erase line. However, while the touch data signal TDP is supplied to the data line in the horizontal touch subfield HSSF, the touch erase signal TEP may be supplied to the erase line. Since this can be sufficiently understood from the description of FIG. 26, a description thereof may be omitted.

The touch scan signals TSP supplied to at least two scan lines may overlap each other in a vertical touch address period VSAP of the vertical touch subfield VSSF.

Figure 27:
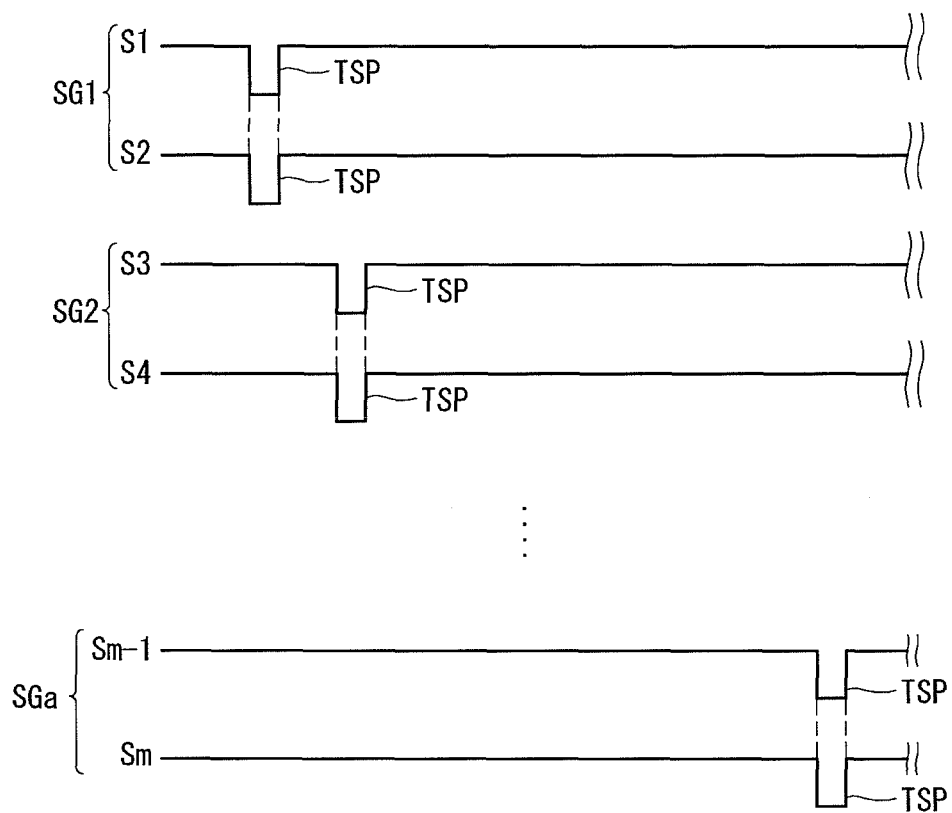

For example, as shown in FIG. 27, the touch scan signals TSP supplied to at least two scan lines, which are positioned adjacent to each other, may overlap each other. FIG. 27 shows that the touch scan signals TSP supplied to the two adjacent data lines (for example, the first and second data lines) overlap each other. However, the touch scan signals TSP supplied to the three or four adjacent scan lines may overlap one another. Hereinafter, the touch scan signals TSP supplied to the two adjacent scan lines overlap each other for ease of description and understanding.

The touch scan signals TSP may be simultaneously supplied to the first scan line S1 and the second scan line S2. In other words, the touch scan signal TSP supplied to the first scan line S1 may be synchronized with the touch scan signal TSP supplied to the second scan line S2.

As described above, when the touch scan signals TSP supplied to at least two scan lines overlap each other, a length of the vertical touch address period VSAP may be reduced. Accordingly, a length of a normal subfield may increase. As a result, the gray scale of the image may be advantageously represented.

In FIG. 27, the first and second scan lines S1 and S2 belong to a first scan line group SG1, and the third and fourth scan lines S3 and S4 belong to a second scan line group SG2. The number of scan lines included in one scan line group may be variously changed.

The touch scan signals TSP may be supplied to the plurality of scan lines included in the same scan line group at almost a same time point.

Figure 28:
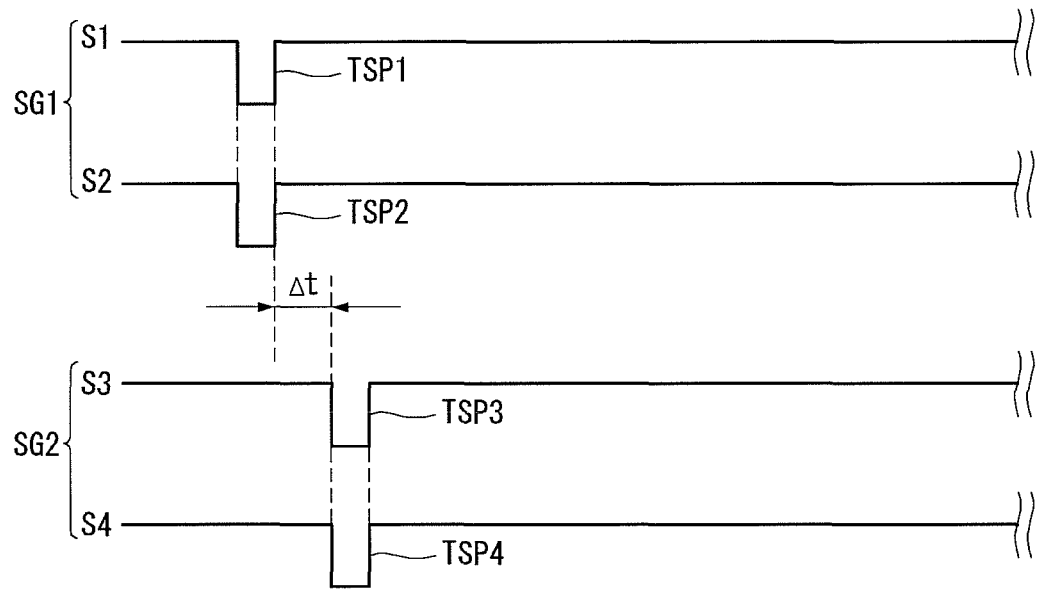

As shown in FIG. 28, the touch scan signals TSP supplied to the different scan line groups may be separated from each other in terms of time. For example, the touch scan signal TSP supplied to the first scan line group SG1 and the touch scan signal TSP supplied to the second scan line group SG2 may be separated from each other in terms of time. More specifically, a second touch scan signal TSP2 supplied to the second scan line S2 included in the first scan line group SG1 may be separated from a third touch scan signal TSP3 supplied to the third scan line S3 included in the second scan line group SG2 by a time Δt.

Figure 29:
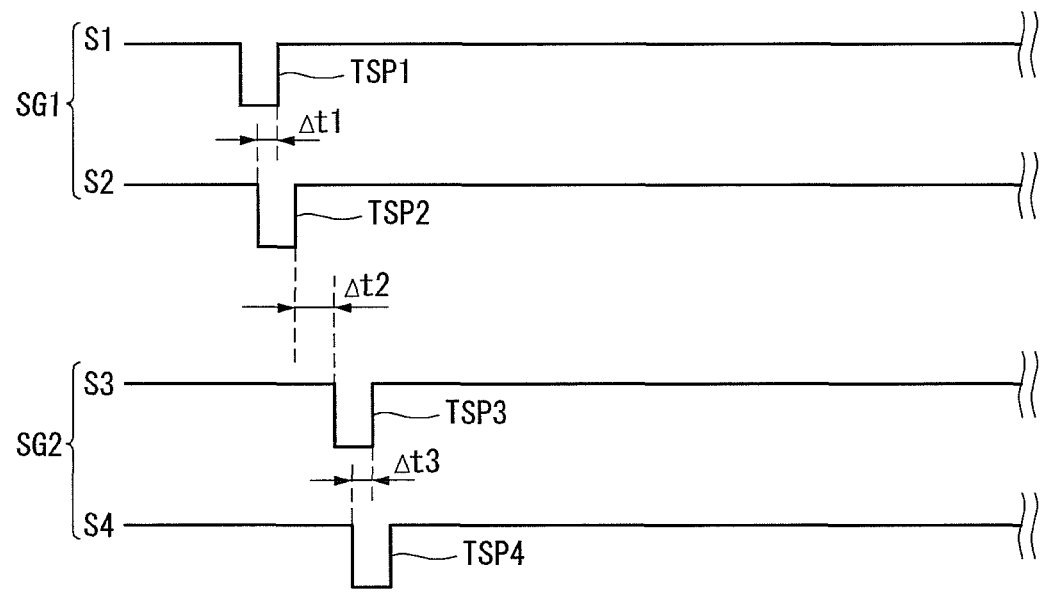

Alternatively, as shown in FIG. 29, a first touch scan signal TSP1 supplied to the first scan line S1 and a second touch scan signal TSP2 supplied to the second scan line S2 may partially overlap each other.

For example, the first touch scan signal TSP1 supplied to the first scan line S1 may partially overlap the second touch scan signal TSP2 supplied to the second scan line S2 by a time Δt1. The second touch scan signal TSP2 supplied to the second scan line S2 may be separated from a third touch scan signal TSP3 supplied to the third scan line S3 by a time Δt2. The time Δt1 may be greater than the time Δt2. Further, the third touch scan signal TSP3 supplied to the third scan line S3 may partially overlap the fourth touch scan signal TSP4 supplied to the fourth scan line S4 by a time Δt3.

Figure 30:
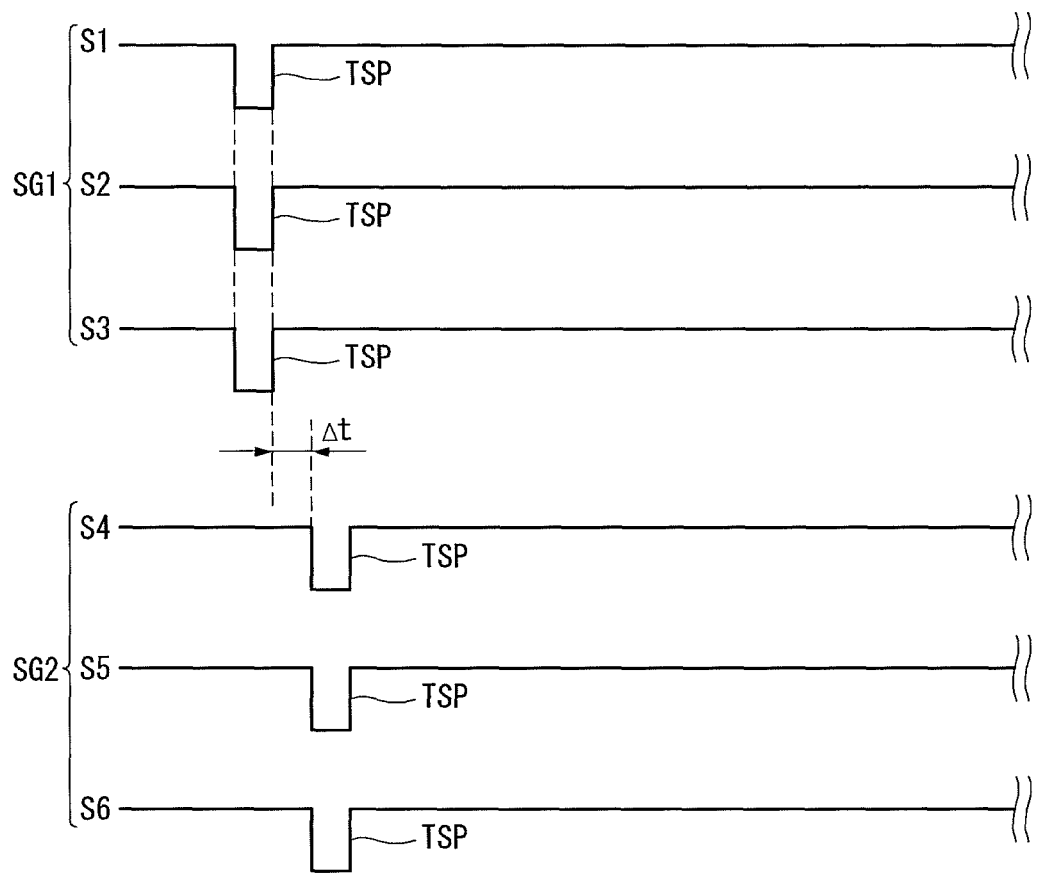

Alternatively, as shown in FIG. 30, the touch scan signals TSP supplied to the first, second, and third scan lines S1, S2, and S3 may overlap one another.

Alternatively, the touch scan signals TSP sequentially supplied to the adjacent scan lines may partially overlap one another.

Figure 31:
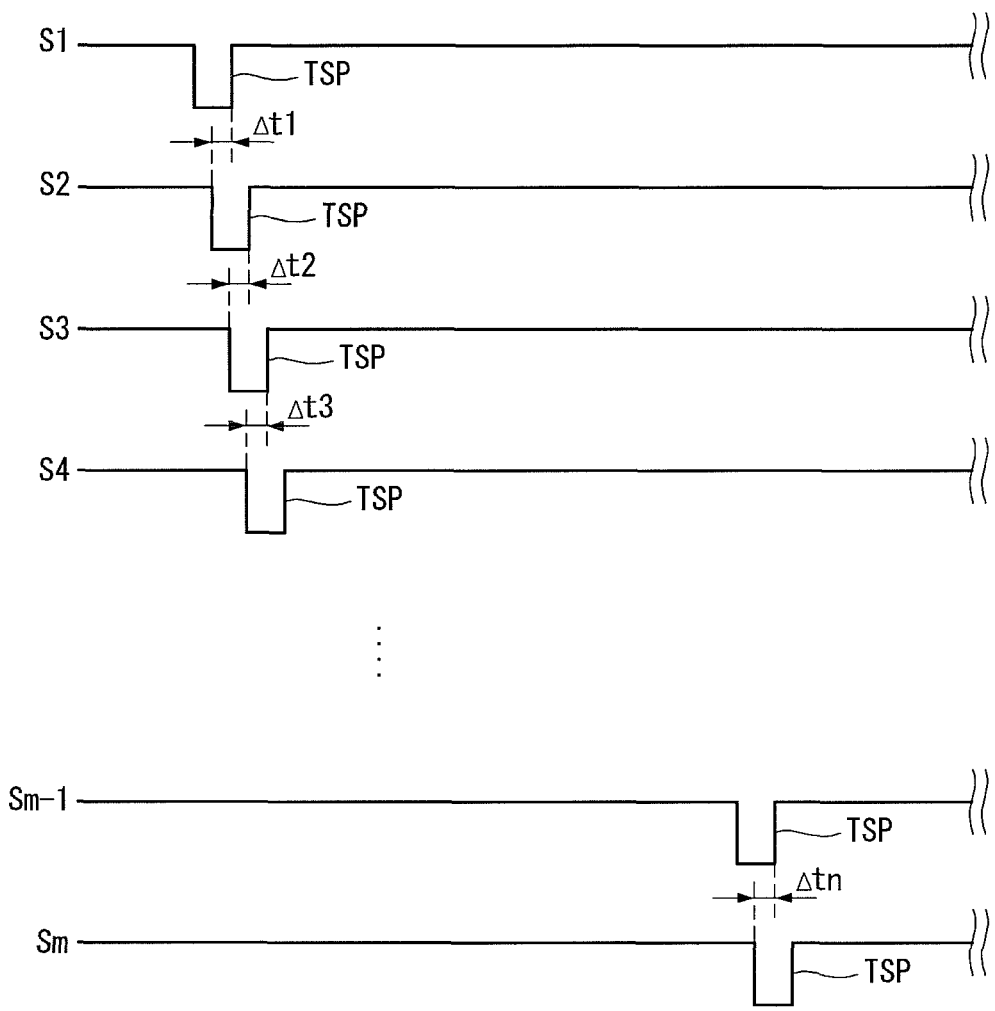

For example, as shown in FIG. 31, the touch scan signal TSP supplied to the first scan line S1 may partially overlap the touch scan signal TSP supplied to the second scan line S2, and the touch scan signal TSP supplied to the second scan line S2 may partially overlap the touch scan signal TSP supplied to the third scan line S3. Further, the touch scan signal TSP supplied to the third scan line S3 may partially overlap the touch scan signal TSP supplied to the fourth scan line S4.

Alternatively, an overlap width of the two touch scan signals TSP may be different from an overlap width of other two touch scan signals TSP.

Figure 32:
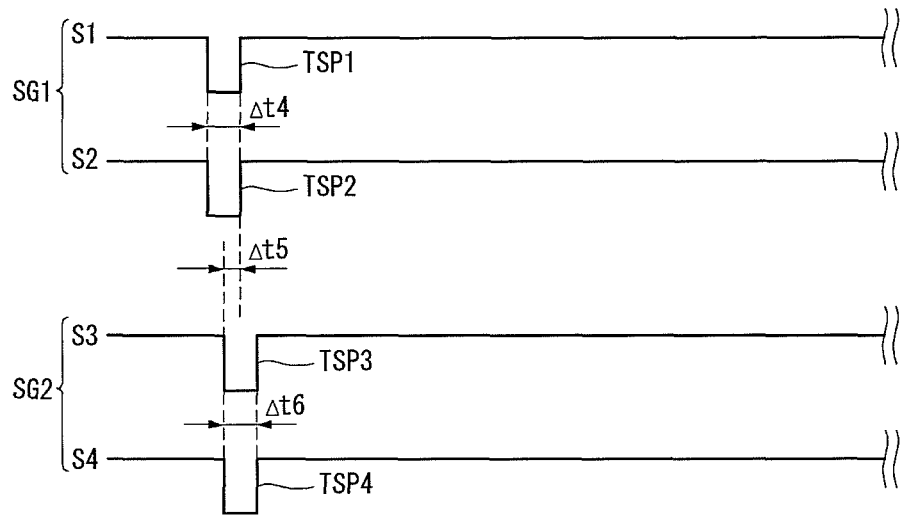

For example, as shown in FIG. 32, the first touch scan signal TSP1 supplied to the first scan line S1 may entirely overlap the second touch scan signal TSP2 supplied to the second scan line S2, and the second touch scan signal TSP2 supplied to the second scan line S2 may partially overlap the third touch scan signal TSP3 supplied to the third scan line S3.

In other words, the first touch scan signal TSP1 supplied to the first scan line S1 may overlap the second touch scan signal TSP2 supplied to the second scan line S2 by a time Δt4. The second touch scan signal TSP2 supplied to the second scan line S2 may overlap the third touch scan signal TSP3 supplied to the third scan line S3 by a time Δt5. The time Δt4 may be greater than the time Δt5.

The touch data signals TDP supplied to at least two data lines may overlap each other in a horizontal touch address period HSAP of the horizontal touch subfield HSSF. In the following description, descriptions of configuration and structure described above may be omitted.

Figure 33:
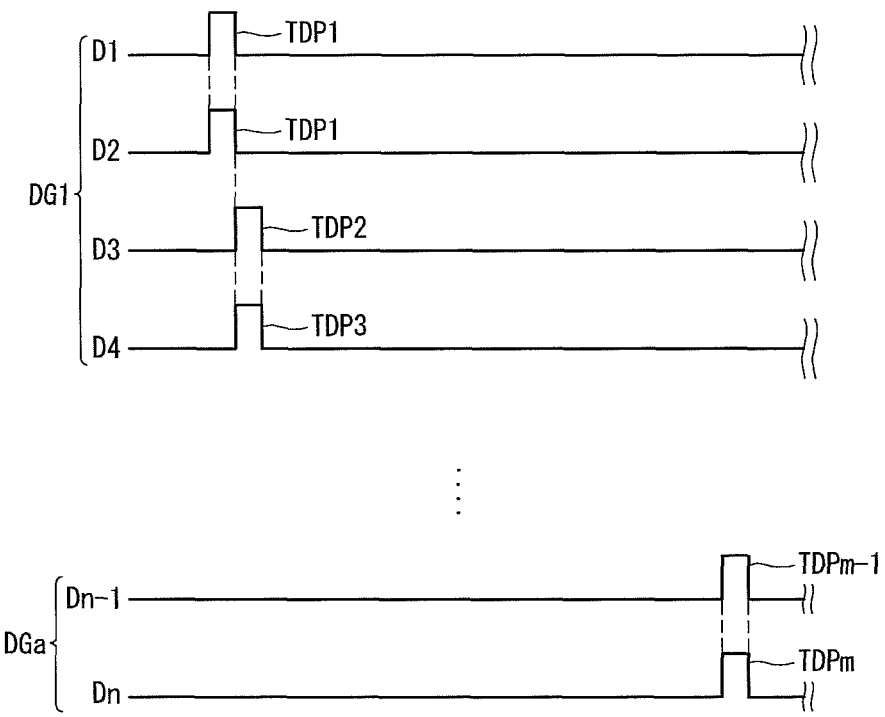

For example, as shown in FIG. 33, the touch data signals TDP supplied to at least two data lines, which are positioned adjacent to each other, may overlap each other. FIG. 33 shows that the touch data signals TDP supplied to the two adjacent data lines (for example, the first and second data lines) overlap each other. However, the touch data signals TDP supplied to the three or four adjacent data lines may overlap one another.

The touch data signals TDP may be simultaneously supplied to the first data line D1 and the second data line D2. In other words, the touch data signal TDP supplied to the first data line D1 may be synchronized with the touch data signal TDP supplied to the second data line D2.

As described above, when the touch data signals TDP supplied to at least two data lines overlap each other, a length of the horizontal touch address period HSAP may be reduced. A length of a normal subfield may increase. As a result, the gray scale of the image may be advantageously represented.

In FIG. 33, the first and second data lines D1 and D2 belong to a first data line group DG1, and the third and fourth data lines D3 and D4 belong to a second data line group DG2. The number of data lines included in one data line group may be variously changed.

The touch data signals TDP may be supplied to the plurality of data lines included in the same data line group at the almost same time point.

Figure 34:
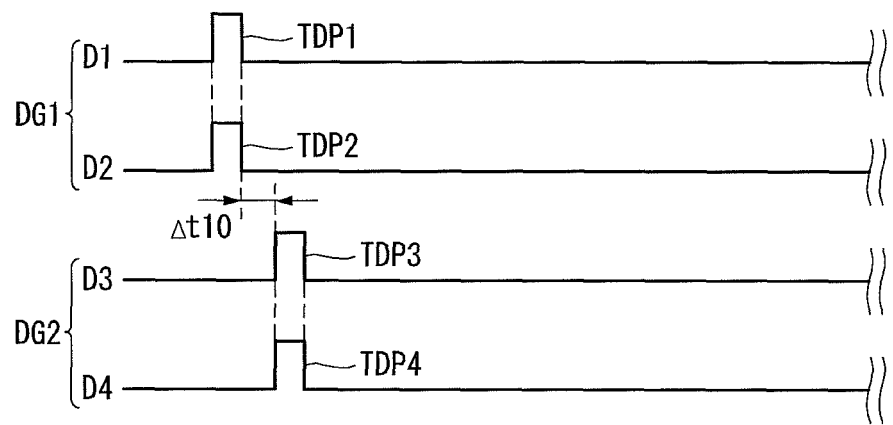

As shown in FIG. 34, the touch data signals TDP supplied to the different data line groups may be separated from each other in terms of time. For example, the touch data signal TDP supplied to the first data line group DG1 and the touch data signal TDP supplied to the second data line group DG2 may be separated from each other in terms of time. More specifically, a second touch data signal TDP2 supplied to the second data line D2 included in the first data line group DG1 may be separated from a third touch data signal TDP3 supplied to the third data line D3 included in the second data line group DG2 by a time Δt10.

Figure 35:
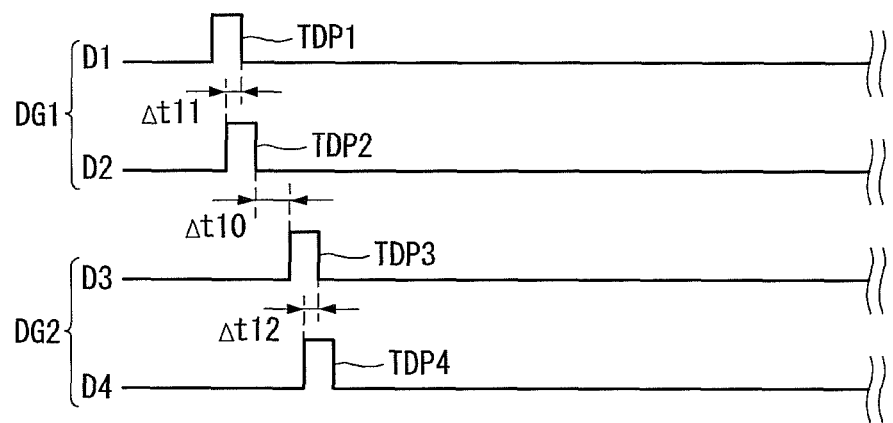

Alternatively, as shown in FIG. 35, a first touch data signal TDP1 supplied to the first data line D1 and a second touch data signal TDP2 supplied to the second data line D2 may partially overlap each other.

For example, the first touch data signal TDP1 supplied to the first data line D1 may partially overlap the second touch data signal TDP2 supplied to the second data line D2 by a time Δt11. The second touch data signal TDP2 supplied to the second data line D2 may be separated from a third touch data signal TDP3 supplied to the third data line D3 by a time Δt10. The time Δt11 may be greater than the time Δt10. Further, the third touch data signal TDP3 supplied to the third data line D3 may partially overlap the fourth touch data signal TDP4 supplied to the fourth data line D4 by a time Δt12.

Figure 36:
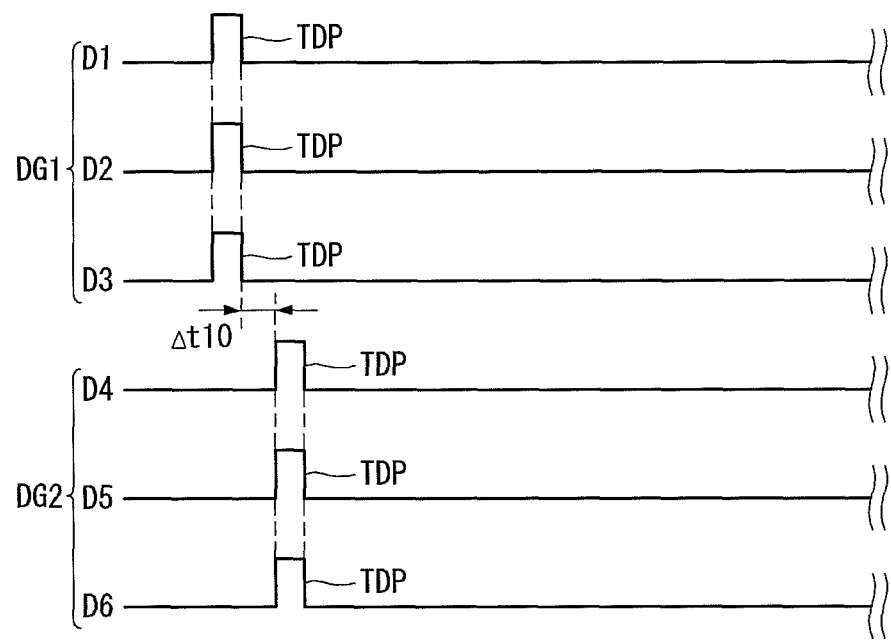

Alternatively, as shown in FIG. 36, the touch data signals TDP supplied to the first, second, and third data lines D1, D2, and D3 may overlap one another.

Alternatively, the touch data signals TDP sequentially supplied to the adjacent data lines may partially overlap one another.

Figure 37:
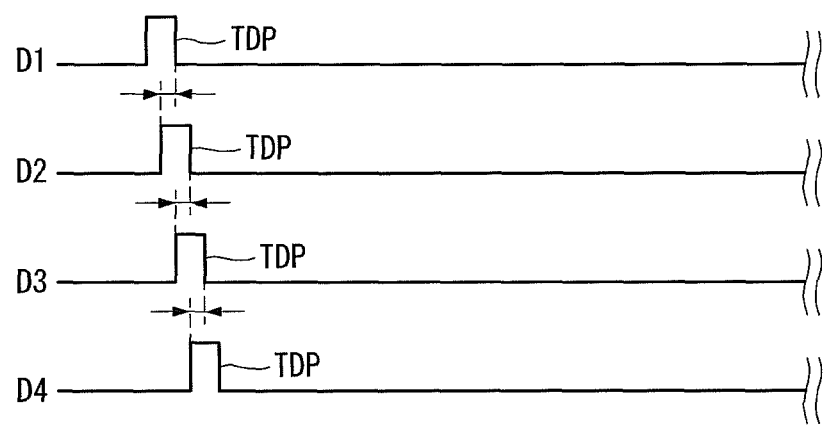

For example, as shown in FIG. 37, the touch data signal TDP supplied to the first data line D1 may partially overlap the touch data signal TDP supplied to the second data line D2, and the touch data signal TDP supplied to the second data line D2 may partially overlap the touch data signal TDP supplied to the third data line D3. Further, the touch data signal TDP supplied to the third data line D3 may partially overlap the touch data signal TDP supplied to the fourth data line D4.

Alternatively, an overlap width of the two touch data signals TDP may be different from an overlap width of other two touch data signals TDP.

Figure 38:
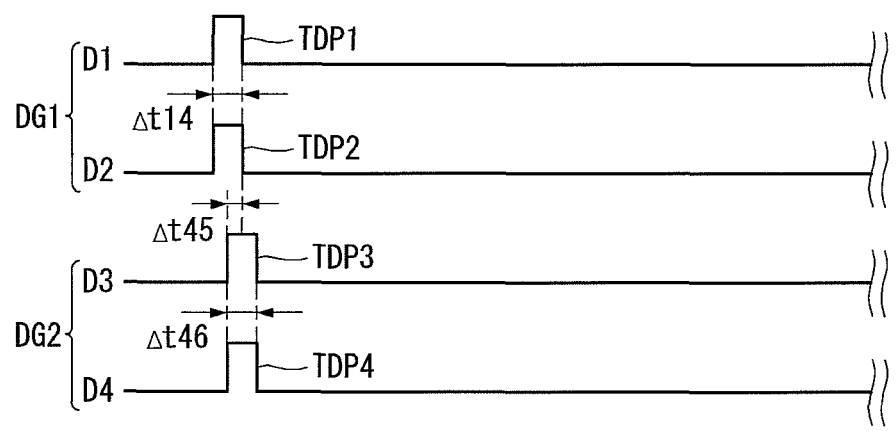

For example, as shown in FIG. 38, the first touch data signal TDP1 supplied to the first data line D1 may entirely overlap the second touch data signal TDP2 supplied to the second data line D2, and the second touch data signal TDP2 supplied to the second data line D2 may partially overlap the third touch data signal TDP3 supplied to the third data line D3.

The first touch data signal TDP1 supplied to the first data line D1 may overlap the second touch data signal TDP2 supplied to the second data line D2 by a time $\Delta t14$. The second touch data signal TDP2 supplied to the second data line D2 may overlap the third touch data signal TDP3 supplied to the third data line D3 by a time $\Delta t15$. The time $\Delta t14$ may be greater than the time $\Delta t15$.

Figure 39:
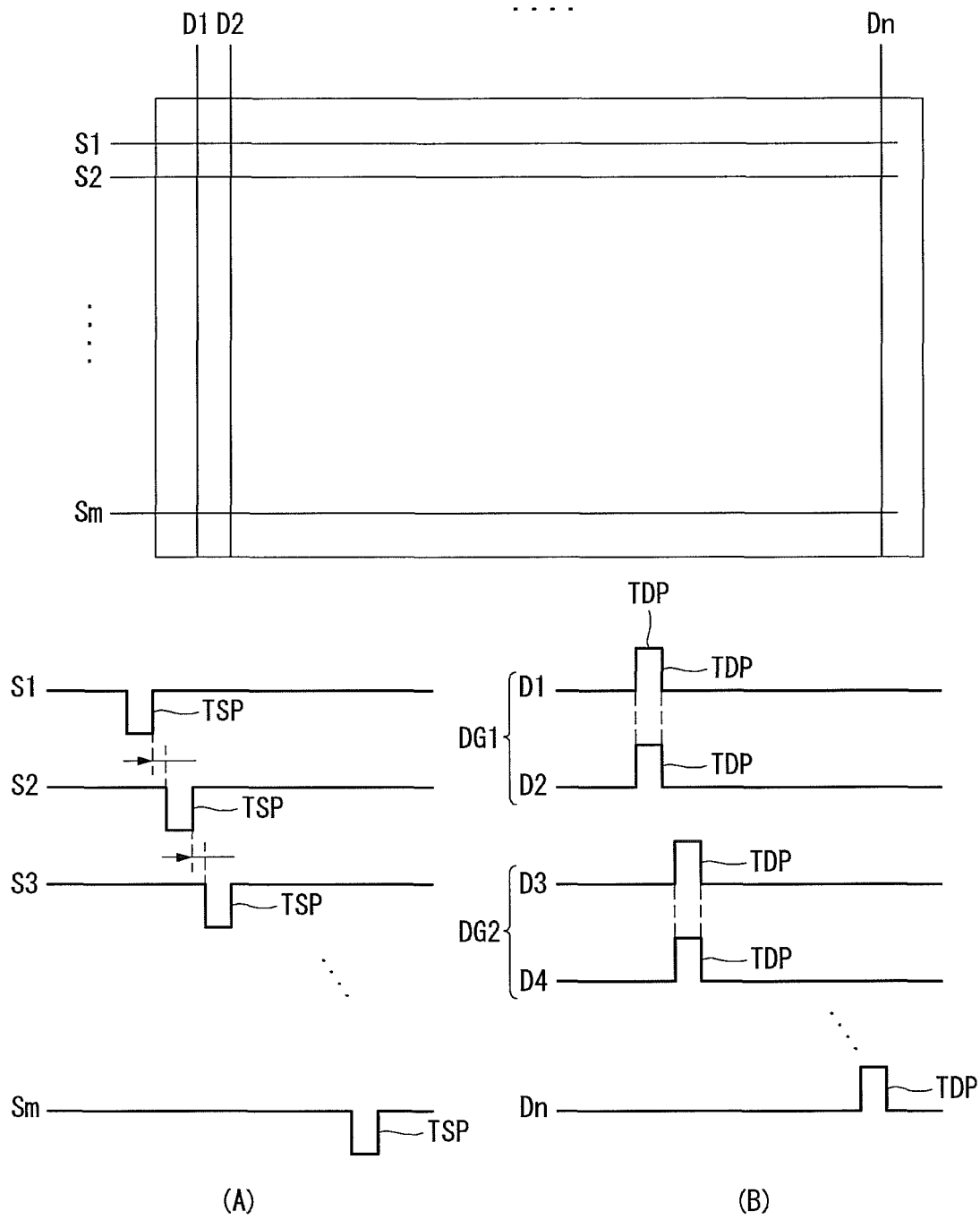
Figure 40:
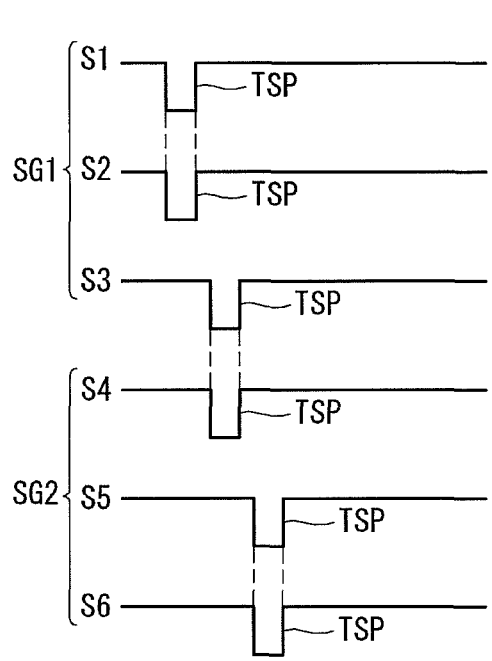
Figure 40:
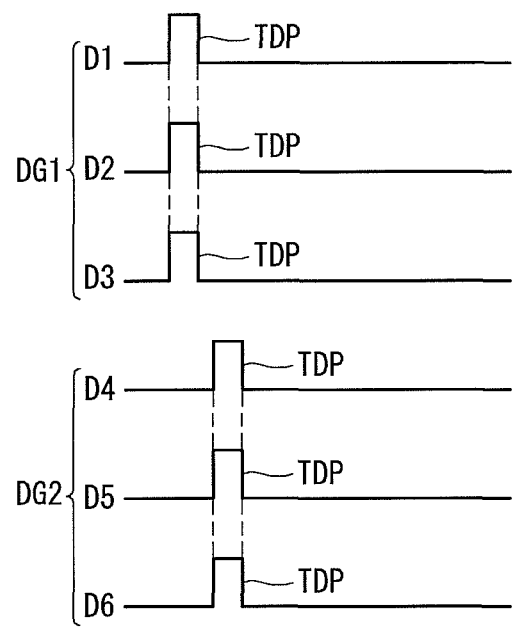

As shown in FIG. 39, in the OLED display panel according to an embodiment, a number of data lines D1 to Dn, which are positioned parallel to one another in a horizontal direction of the OLED display panel, may be greater than a number of scan lines S1 to Sm that are positioned parallel to one another in a vertical direction of the OLED display panel. A length of the horizontal touch address period HSAP may be greater than a length of the vertical touch address period VSAP.

The overlap of at least two touch data signals TDP in the horizontal touch address period HSAP may be more efficient than the overlap of at least two touch scan signals TSP in the vertical touch address period VSAP in a reduction in a length of the scan subfield.

Accordingly, as shown in FIG. 39(B), the touch data signals TDP supplied to the two adjacent data lines may overlap each other. As shown in FIG. 39(A), the touch scan signals TSP supplied to the two adjacent scan lines may not overlap each other.

A number of overlapping touch data signals TDP may be greater than a number of overlapping touch scan signals TSP. For example, as shown in FIG. 40(B), the touch data signals TDP supplied to the first, second, and third data lines D1, D2, and D3 may overlap each other. As shown in FIG. 40(A), the touch scan signals TSP supplied to the first and second scan lines S1 and S2 may overlap each other.

The number of data lines included in one data line group may be greater than the number of scan lines included in one scan line group.

The total number of data line groups may be greater than the total number of scan line groups.

The touch scan signals TSP supplied to at least two scan line groups, which are not positioned adjacent to each other, may overlap each other.

Figure 41:
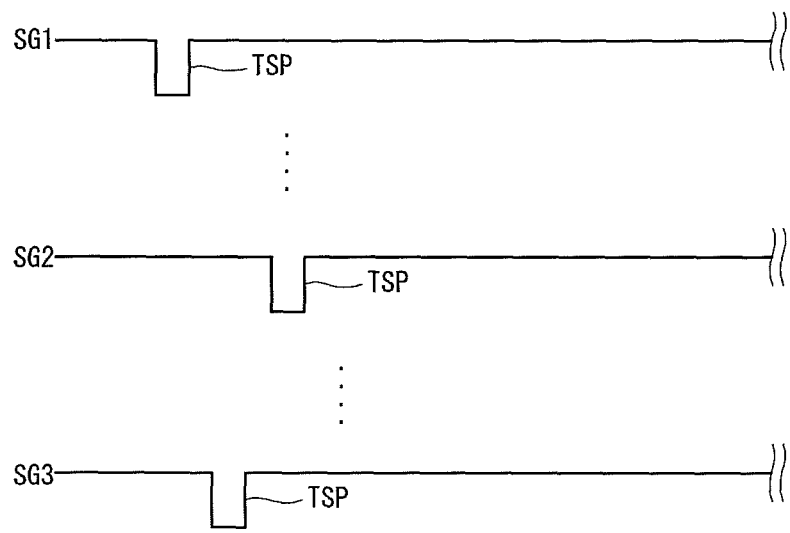

For example, as shown in FIG. 41, in the plurality of scan line groups, the second scan line group SG2 may be positioned between the first scan line group SG1 and the third scan line groups SG3. In this example, the touch scan signal TSP supplied to the first scan line group SG1 may overlap the touch scan signal TSP supplied to the third scan line group SG3. Further, the touch scan signal TSP supplied to the first scan line group SG1 and the touch scan signal TSP supplied to the third scan line group SG3 may not overlap the touch scan signal TSP supplied to the second scan line group SG2.

A scanning method in the vertical touch subfield VSSF and the horizontal touch subfield HSSF may be described in detail below. In the following description, descriptions of the configuration and the structure described above are omitted.

In the vertical touch subfield VSSF and/or the horizontal touch subfield HSSF, a plurality of cell groups including at least one cell may be scanned in an order of An+1, ..., An+B, where A is a natural number equal to or greater than 2, n is an integer from 0 to m, B is a natural number from 2 to A, and B is 2 when A is 2.

For example, the touch scan signal TSP may be supplied to a scan line group that includes at least one scan line in the vertical touch subfield VSSF in an order of An+1, ..., An+B.

In the example embodiment, when A is 2, the plurality of cell groups may be scanned in an order of 2n+1 and 2n+2. This is described with reference to FIG. 42.

Figure 42:
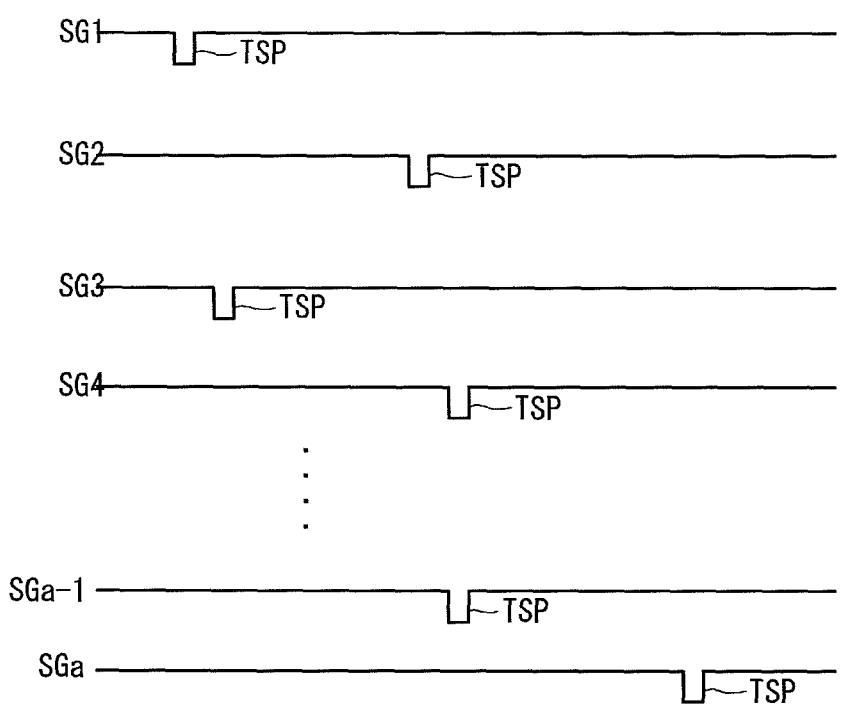

As shown in FIG. 42, in the plurality of scan line groups, the touch scan signal TSP may be supplied to a first scan line group SG1, and then the touch scan signal TSP may be supplied to a third scan line group SG3. Then, the touch scan signal TSP may be supplied to a fifth scan line group SG5. In other words, after the supply of the touch scan signal TSP to odd-numbered scan line groups is completed, the touch scan signal TSP may be supplied to even-numbered scan line groups (for example, second, fourth, and sixth scan line groups SG2, SG4, and SG6). FIG. 42 illustrates that the touch scan signal TSP is supplied to the odd-numbered scan line groups and then the touch scan signal TSP is supplied to the even-numbered scan line groups. However, after the touch scan signal TSP is supplied to the even-numbered scan line groups, the touch scan signal TSP may be supplied to the odd-numbered scan line groups.

FIG. 42 shows that the touch scan signal TSP is supplied to the scan line group that includes at least one scan line in the vertical touch subfield VSSF in an order of An+1, ..., An+B, and A is 2. However, A may be 3, 4, 5, or etc.

For example, when A is 3, the plurality of cell groups may be scanned in an order of 3n+1, 3n+2, and 3n+3. This may be described with reference to FIG. 43. If A is 4, the plurality of cell groups may be scanned in an order of 4n+1, 4n+2, 4n+3, and 4n+4.

Figure 43:
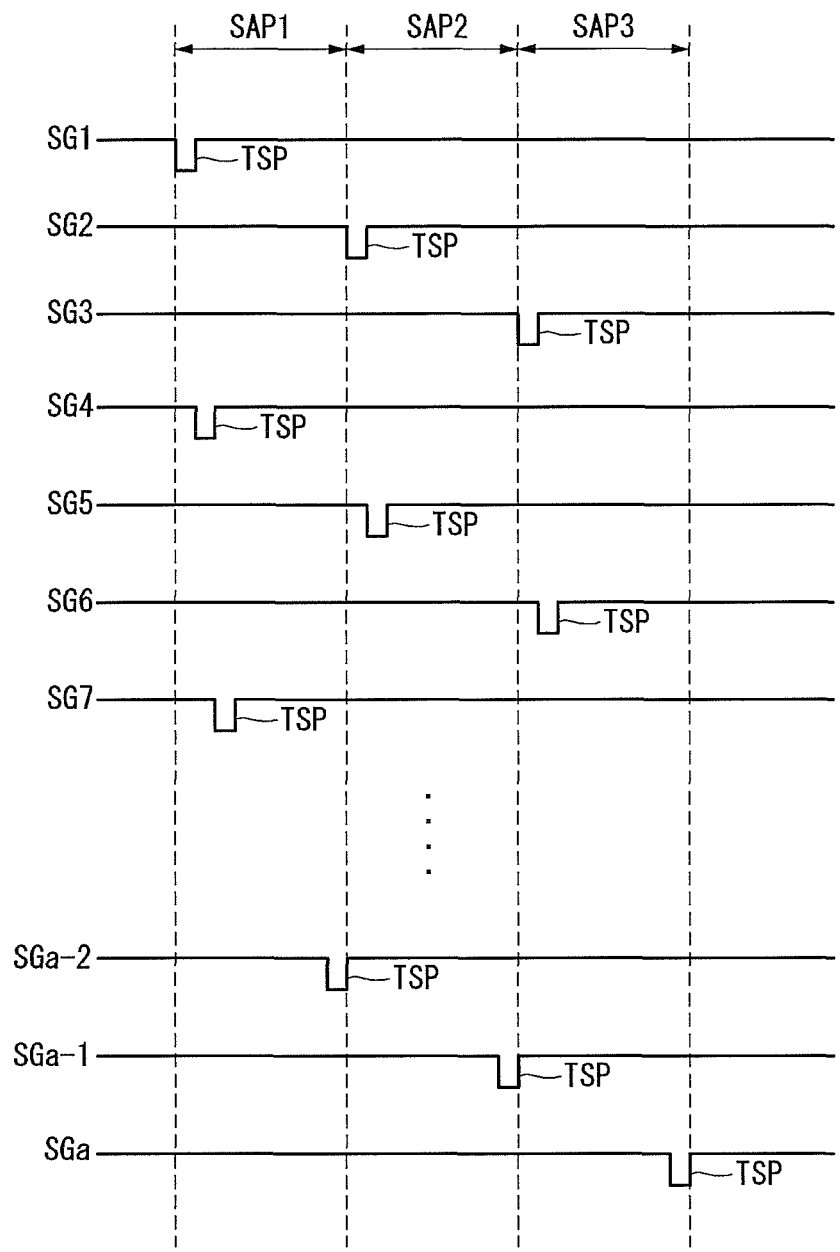

As shown in FIG. 43, in the vertical touch subfield VSSF, the touch scan signal TSP may be supplied to a first scan line group SG1, and then the touch scan signal TSP may be supplied to a fourth scan line group SG4. Then, the touch scan signal TSP may be supplied to a seventh scan line group SG7.

Afterwards, in a second touch address period SAP2 of the vertical touch subfield VSSF, the touch scan signal TSP may be supplied to a second scan line group SG2, and then the touch scan signal TSP may be supplied to a fifth scan line group SG5. Then, the touch scan signal TSP may be supplied to an eighth scan line group SG8.

Afterwards, in a third touch address period SAP3 of the vertical touch subfield VSSF, the touch scan signal TSP may be supplied to a third scan line group SG3, and then the touch scan signal TSP may be supplied to a sixth scan line group SG6. Then, the touch scan signal TSP may be supplied to a ninth scan line group SG9.

In the touch subfield, the scanning process may be performed based on a pixel including the plurality of cells.

Figure 44:
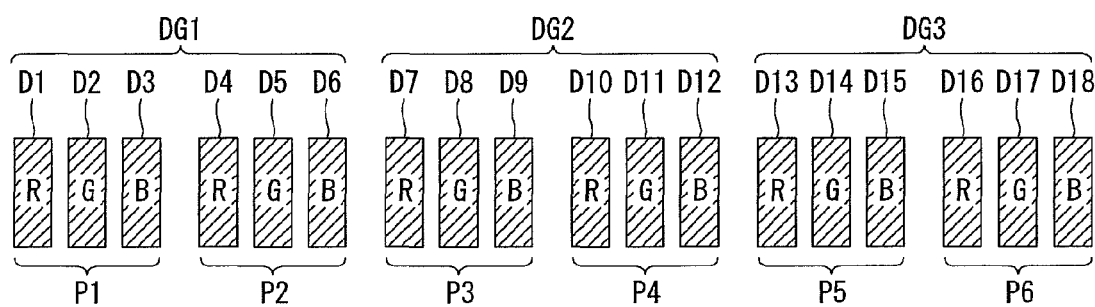

For example, as shown in FIG. 44, in the horizontal touch subfield HSSF, a first pixel P1 (including first, second, and third data lines D1, D2, and D3) and a second pixel P2 (including fourth, fifth, and sixth data lines D4, D5, and D6) may belong to a first data line group DG1. Further, a third pixel P3 (including seventh, eighth, and ninth data lines D7, D8, and D9) and a fourth pixel P4 (including tenth, eleventh, and twelfth data lines D10, D11, and D2) may belong to a second data line group DG2. Other methods for distinguishing data line groups may also be used in the example embodiment.

In the touch subfield, the scanning direction may be adjusted. This may be described below. In the following description, the descriptions of configuration and structure described above may be omitted. In the following description, the touch scan signal may be supplied to scan line groups each including at least one scan line at different time points, and the touch data signal may be supplied to data line groups each including at least one data line at different time points. However, the touch scan signal may be supplied to the scan lines at different time points, and the touch data signal may be supplied to the data lines at different time points.

In at least one touch subfield of the plurality of subfields, a plurality of cell groups (each including at least one cell) may be scanned in a forward direction (or a first direction), and other cell groups may be scanned in a reverse direction (or a second direction). The scanning direction may be indicated by the arrow of FIG. 45.

Figure 45:
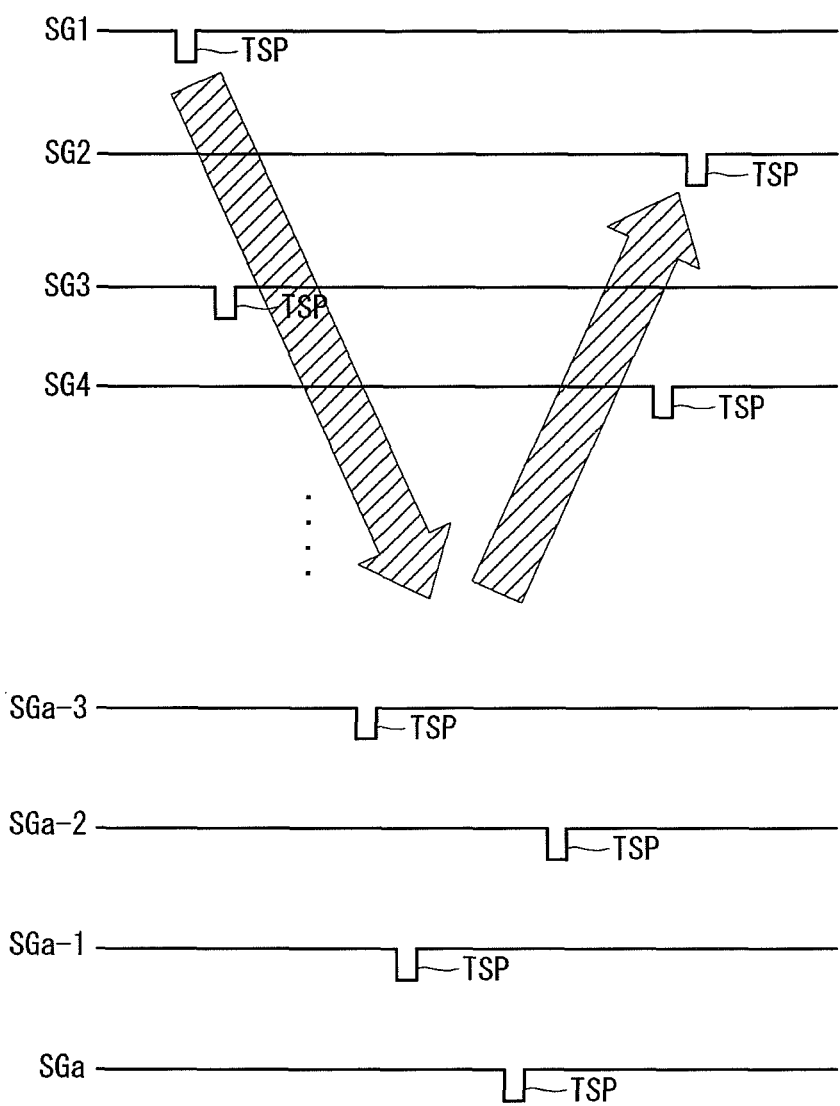

For example, as shown in FIG. 45, in the vertical touch subfield VSSF, the touch scan signal TSP may be supplied to the odd-numbered scan line groups in the forward direction, and the touch scan signal TSP may be supplied to the even-numbered scan line groups in the reverse direction.

More specifically, the touch scan signal TSP may be supplied to the scan line groups SG1, SG3, SGa-3, SGa-1, SGa, SGa-2, SG4, and SG2 in the order named.

FIG. 45 illustrates that the touch scan signal TSP is supplied to the odd-numbered scan line groups in the forward direction, and then the touch scan signal TSP is supplied to the even-numbered scan line groups in the reverse direction in the vertical touch subfield VSSF. However, the touch scan signal TSP may be supplied to the even-numbered scan line groups in the forward direction, and then the touch scan signal TSP may be supplied to the odd-numbered scan line groups in the reverse direction.

In this example, a difference between supply time points of the touch scan signals supplied to the two adjacent scan line groups may decrease as it goes from the first scan line group SG1 to an a-th scan line group SGa.

For example, a difference between supply time points of the touch scan signals supplied to the first and second scan line groups SG1 and SG2 may be greater than a difference between supply time points of the touch scan signals supplied to the third and fourth scan line groups SG3 and SG4.

Alternatively, a difference between supply time points of the touch scan signals supplied to the two adjacent scan line groups may increase as it goes from the first scan line group SG1 to the a-th scan line group SGa.

For example, the touch scan signal TSP may be supplied to the scan line groups SGa-1, SGa-3, SG3, SG1, SG2, SG4, SGa-2, and SGa in the order named.

Figure 46:
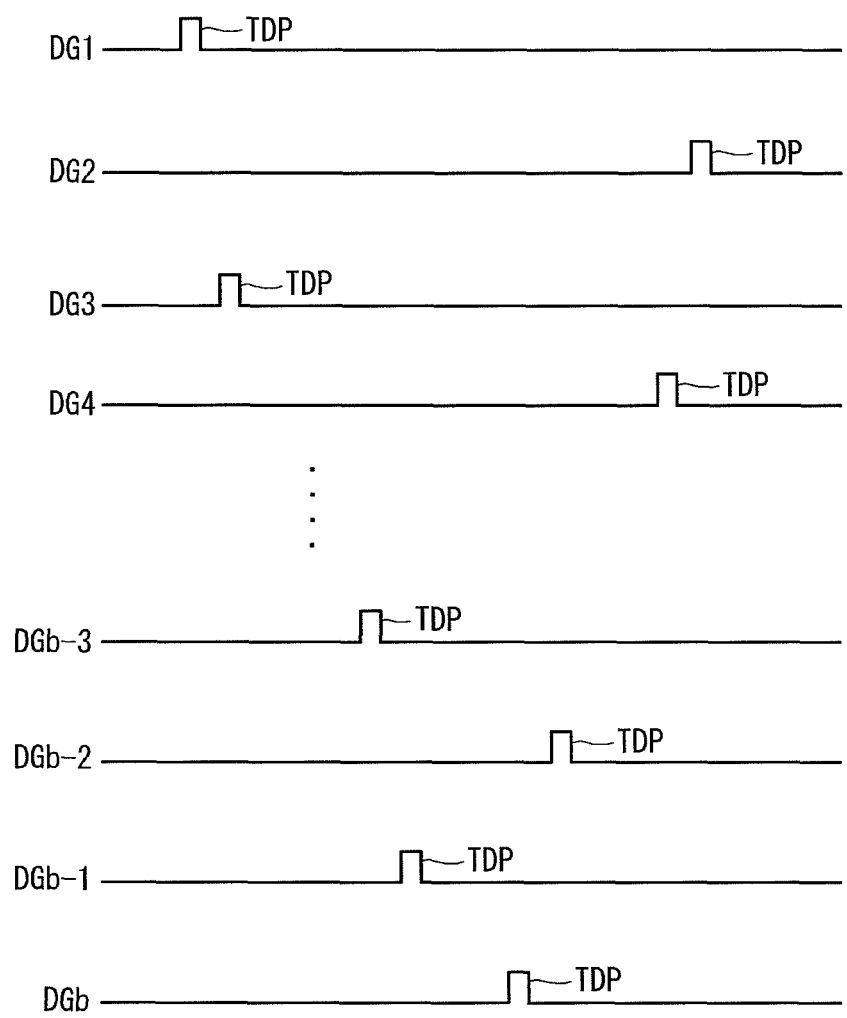
Figure 47:
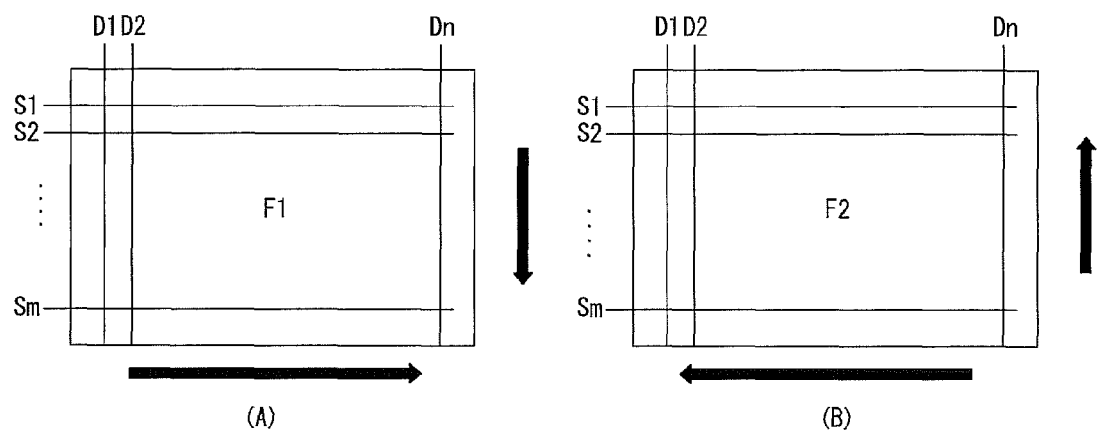

Alternatively, as shown in FIG. 46, in the horizontal touch subfield HSSF, the touch data signal TDP may be supplied to the odd-numbered data line groups in the forward direction, and the touch data signal TDP may be supplied to the even-numbered data line groups in the reverse direction.

More specifically, the touch data signal TDP may be supplied to the data line groups DG1, DG3, DGb-3, DGb-1, DGb, DGb-2, DG4, and DG2 in the order named.

FIG. 46 illustrates that the touch data signal TDP is supplied to the odd-numbered data line groups in the forward direction, and then the touch data signal TDP is supplied to the even-numbered data line groups in the reverse direction in the horizontal touch subfield HSSF. However, the touch data signal TDP may be supplied to the even-numbered data line groups in the forward direction, and then the touch data signal TDP may be supplied to the odd-numbered data line groups in the reverse direction.

In this example, a difference between supply time points of the touch data signals supplied to the two adjacent data line groups may decrease as it goes from the first data line group DG1 to a b-th data line group DGb.

Alternatively, a difference between supply time points of the touch data signals supplied to the two adjacent data line groups may increase as it goes from the first data line group DG1 to the b-th data line group DGb.

For example, the touch data signal TDP may be supplied to the data line groups DGb-1, DGb-3, DG3, DG1, DG2, DG4, DGb-2, and DGb in the order named.

In the vertical touch subfields VSSF of different frames, supply directions and supply orders of the touch scan signals TSP may be different from each other. Further, in the horizontal touch subfields HSSF of different frames, supply directions and supply orders of the touch data signals TDP may be different from each other.

For example, as shown in FIG. 47(A), in a vertical touch subfield VSSF of a first frame F1, the touch scan signal TSP may be supplied to the scan lines S1, S3, S5, . . . , S2, S4, S6, . . . in the order named. As shown in FIG. 47(B), unlike the first frame F1, in a vertical touch subfield VSSF of a second frame F2, the touch scan signal TSP may be supplied to the scan lines Sma, Sma-2, Sma-1, Sma-3 in the order named.

In other words, a supply time point of the touch scan signal TSP supplied to the first scan line S1 may be earlier than a supply time point of the touch scan signal TSP supplied to an mth scan line Sm in the first frame F1. On the other hand, a supply time point of the touch scan signal TSP supplied to the mth scan line Sm may be earlier than a supply time point of the touch scan signal TSP supplied to the first scan line S1 in the second frame F2.

As shown in FIG. 49(A), in a horizontal touch subfields HSSF of a first frame F1, the touch data signal TDP may be supplied to the data lines D1, D3, D5, . . . , D2, D4, D6 . . . in the order named. As shown in FIG. 49(B), unlike the first frame F1, in a horizontal touch subfields HSSF of a second frame F2, the touch data signal TDP may be supplied to the data lines Dna, Dna-2, . . . , Dna-1, Dna-3 . . . in the order named.

In other words, a supply time point of the touch data signal TDP supplied to the first data line D1 may be earlier than a supply time point of the touch data signal TDP supplied to an nth data line Dn in the first frame F1. On the other hand, a supply time point of the touch scan signal TSP supplied to the nth data line Dn may be earlier than a supply time point of the touch data signal TDP supplied to the first data line D1 in the second frame F2.

The supply order of the touch scan signal TSP in the vertical touch subfield VSSF of the first frame F1 may be reverse to the supply order of the touch scan signal TSP in the vertical touch subfield VSSF of the second frame F2. The supply order of the touch data signal TDP in the horizontal touch subfield HSSF of the first frame F1 may be reverse to the supply order of the touch data signal TDP in the horizontal touch subfield HSSF of the second frame F2.

When the supply order of the touch scan signals TSP or the supply order of the touch data signals TDP is not uniform in different frames, light emission characteristic of the OLED cells may be uniform.

Figure 48:
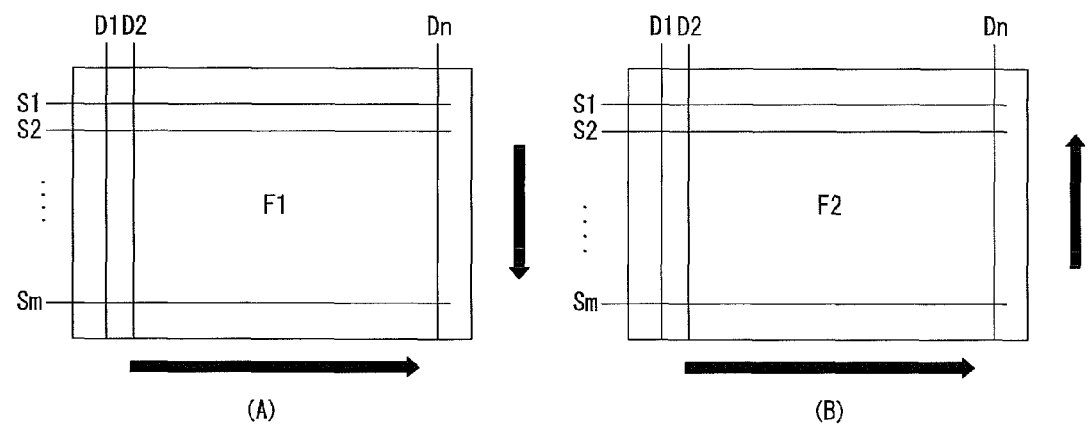

As shown in FIG. 48, the supply order of the touch scan signals TSP may be uniform in the first and second frames F1 and F2. On the other hand, the supply order of the touch data signals TDP may be non-uniform in the first and second frames F1 and F2.

Figure 49:
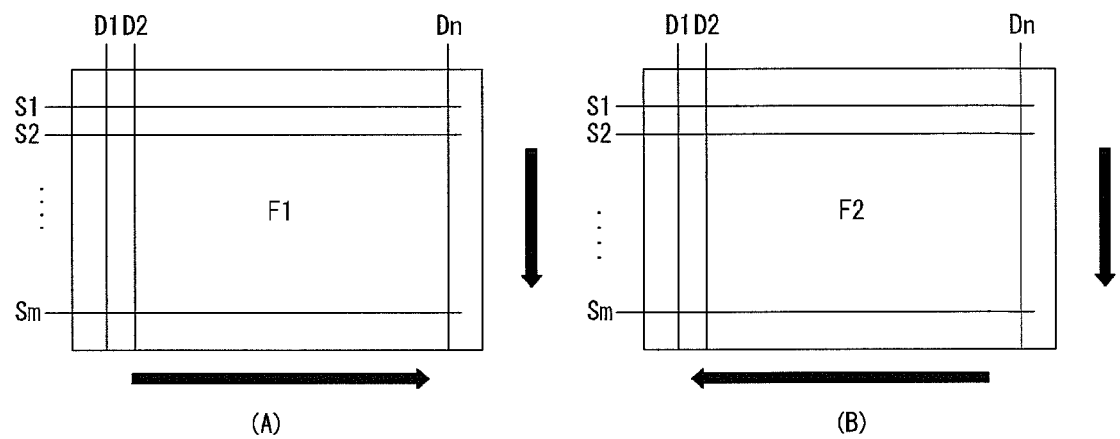

As shown in FIG. 49, the supply order of the touch data signals TDP may be uniform in the first and second frames F1 and F2. On the other hand, the supply order of the touch scan signals TSP may be non-uniform in the first and second frames F1 and F2.

The example where the vertical touch subfield VSSF is arranged earlier than the horizontal touch subfield HSSF in one frame has been described. On the contrary, the horizontal touch subfield HSSF may be arranged earlier than the vertical touch subfield VSSF.

Figure 50:
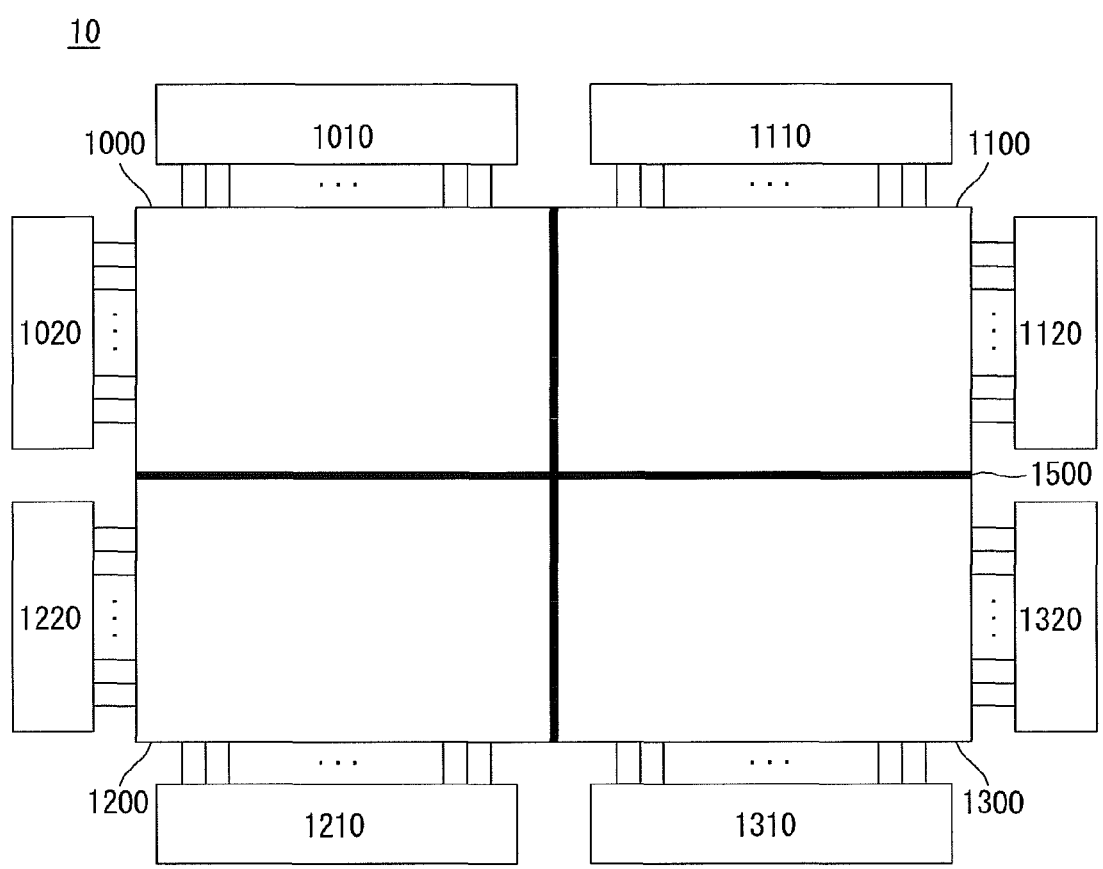
FIGS. 50 to 52 illustrate a multi-touch display device according to an example embodiment.
Figure 51:
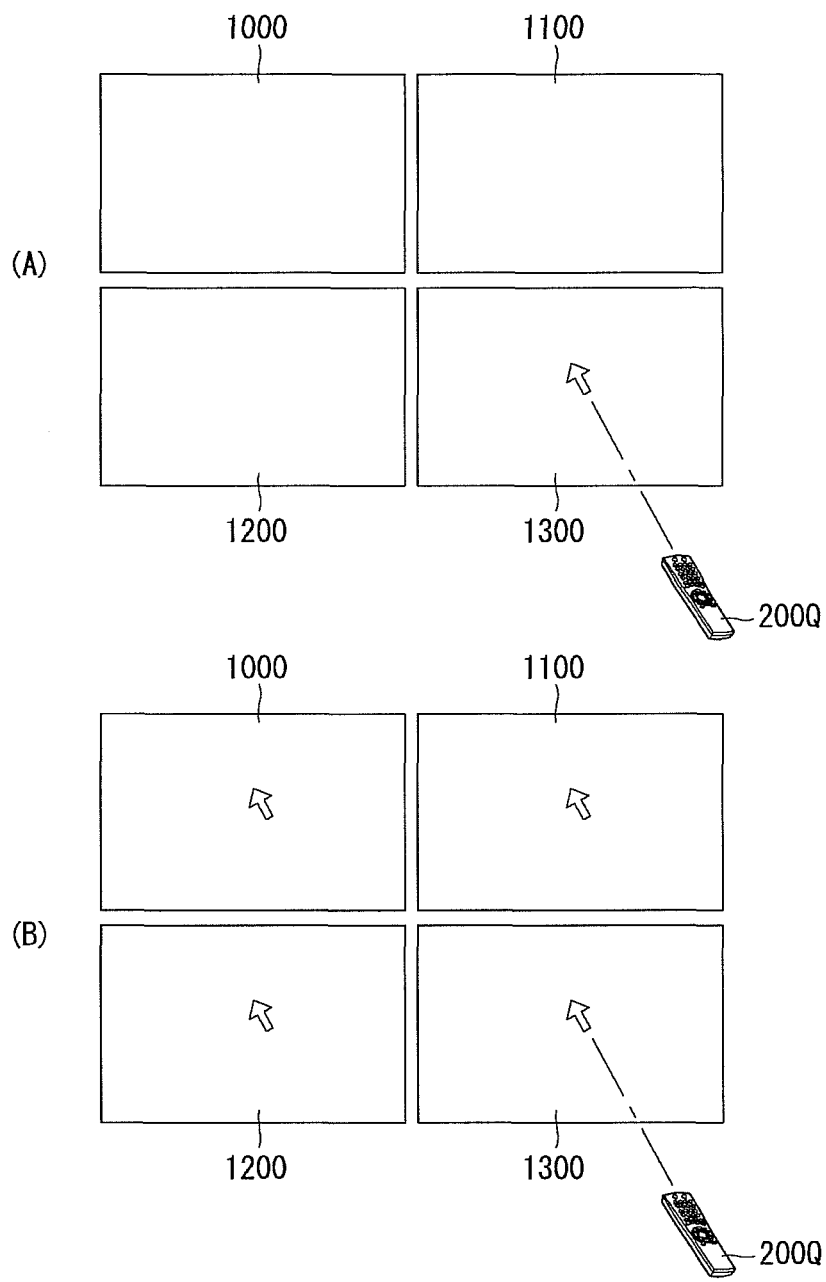
Figure 52:
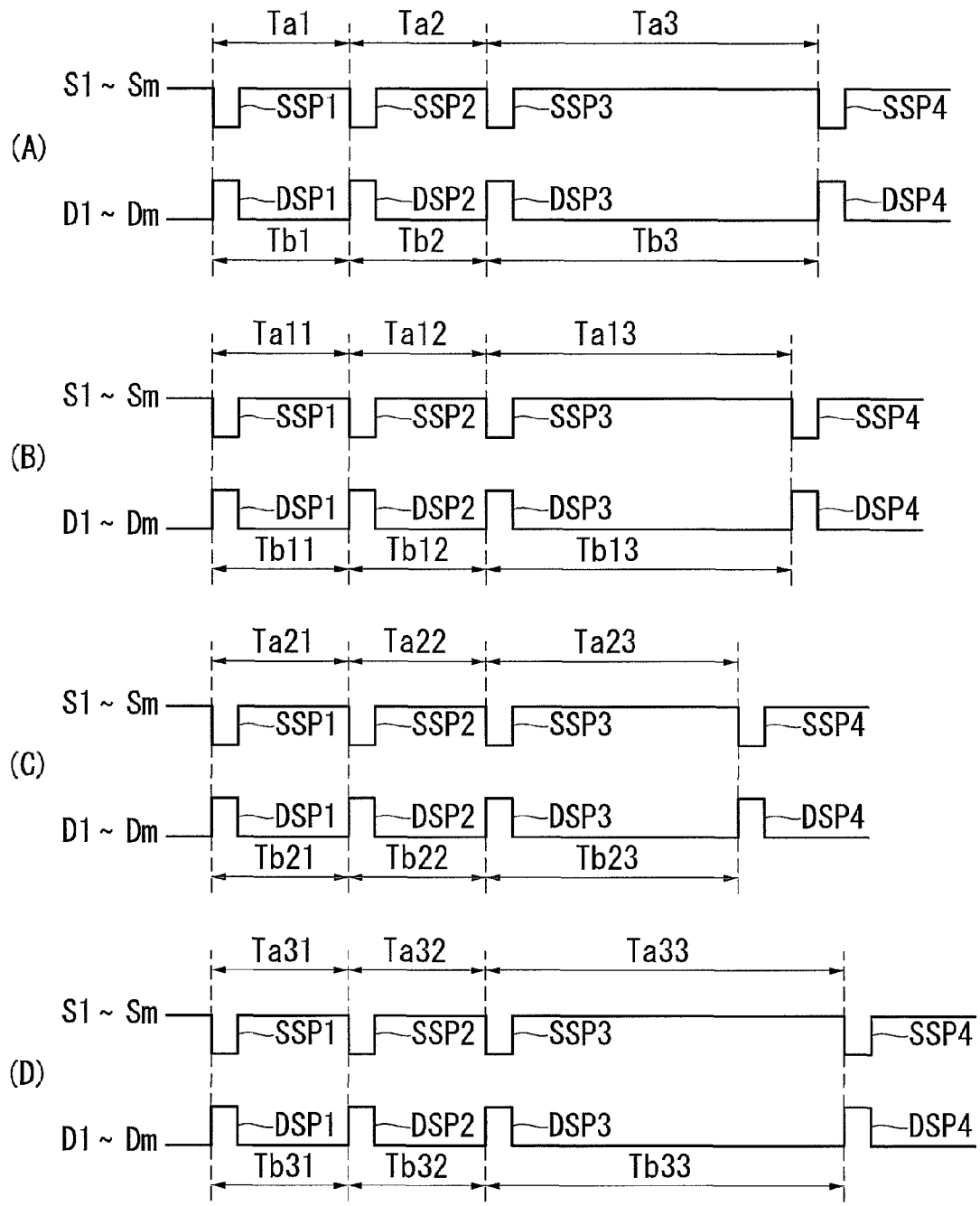

FIGS. 50 to 52 illustrate a multi-touch display device according to an example embodiment. The configuration and the structure of the touch display device described above may be applied to the multi-touch display device. In the following description, the descriptions of configuration and structure described above may be omitted.

FIG. 50 shows that a multi-touch display device 10 according to an example embodiment may include a plurality of OLED display panels 1000, 1100, 1200, and 1300 that are positioned adjacent to one another.

A 1-1 driver 1010 and a 1-2 driver 1020 may supply driving signals to the first OLED display panel 1000 (of the plurality of OLED display panels 1000, 1100, 1200, and 1300). The 1-1 driver 1010 and the 1-2 driver 1020 may be integrated as one integrated driver.

Further, a 2-1 driver 1110 and a 2-2 driver 1120 may supply driving signals to the second OLED display panel 1100.

In other words, the multi-touch display device 10 may be configured such that the OLED display panels 1000, 1100, 1200, and 1300 receive driving signals from different drivers, respectively.

Each of the drivers shown in FIG. 50 may be a driving board.

Because the multi-touch display device 10 includes the plurality of OLED display panels, the multi-touch display device has to determine (or decide) the OLED display panel, in which a touch operation is generated, from among the plurality of OLED display panels when the touch operation is generated.

For example, as shown in FIG. 51(A), when the multi-touch display device 10 includes first to fourth panels 1000 to 1300 and a touch operation is generated in the fourth panel 1300, the remote controller 200Q may sense light generated in the fourth panel 1300. The broadcasting signal receiver according to the example embodiment may confirm (or determine) that the light sensed by the remote controller 200Q is light generated in the fourth panel 1300.

As shown in FIG. 51(B), if the broadcasting signal receiver does not confirm (or determine) that the light sensed by the remote controller 200Q is light generated in the fourth panel 1300, the broadcasting signal receiver may confirm (or determine) that the touch operation is generated in each of the first to fourth panels 1000 to 1300.

To prevent the touch position from being wrongly recognized, identification information for distinguishing the OLED display panels (included in the multi-touch display device 10) may be provided in a frame.

A sync signal may be used as identification information for distinguishing the OLED display panels included in the multi-touch display device.

A number or an arrangement pattern of sync signals corresponding to each of the OLED display panels (included in the multi-touch display device 10) may be different from one another.

For example, as shown in FIG. 52, first to fourth scan sync signals SSP1 to SSP4 may be supplied to the scan lines S1 to Sm and first to fourth data sync signals DSP1 to DSP4 may be supplied to the data lines D1 to Dn in a sync period SYP.

As shown in FIG. 52(A), in the plurality of OLED display panels included in the multi-touch display device 10, the first panel 1000 may be configured such that a difference between supply time points of the first and second scan sync signals SSP1 and SSP2 is set to Ta1, a difference between supply time points of the second and third scan sync signals SSP2 and SSP3 is set to Ta2, a difference between supply time points of the third and fourth scan sync signals SSP3 and SSP4 is set to Ta3, a difference between supply time points of the first and second data sync signals DSP1 and DSP2 is set to Tb1, a difference between supply time points of the second and third data sync signals DSP2 and DSP3 is set to Tb2, and a difference between supply time points of the third and fourth data sync signals DSP3 and DSP4 is set to Tb3.

On the other hand, as shown in FIG. 52(B), in the plurality of OLED display panels (included in the multi-touch display device), the second panel 1100 may be configured such that a difference between supply time points of the first and second scan sync signals SSP1 and SSP2 is set to Ta11, a difference between supply time points of the second and third scan sync signals SSP2 and SSP3 is set to Ta12, a difference between supply time points of the third and fourth scan sync signals SSP3 and SSP4 is set to Ta13, a difference between supply time points of the first and second data sync signals DSP1 and DSP2 is set to Tb11, a difference between supply time points of the second and third data sync signals DSP2 and DSP3 is set to Tb12, and a difference between supply time points of the third and fourth data sync signals DSP3 and DSP4 is set to Tb13.

Further, as shown in FIG. 52(C), in the plurality of OLED display panels (included in the multi-touch display device), the third panel 1200 may be configured such that a difference between supply time points of the first and second scan sync signals SSP1 and SSP2 is set to Ta21, a difference between supply time points of the second and third scan sync signals SSP2 and SSP3 is set to Ta22, a difference between supply time points of the third and fourth scan sync signals SSP3 and SSP4 is set to Ta23, a difference between supply time points of the first and second data sync signals DSP1 and DSP2 is set to Tb21, a difference between supply time points of the second and third data sync signals DSP2 and DSP3 is set to Tb22, and a difference between supply time points of the third and fourth data sync signals DSP3 and DSP4 is set to Tb23.

Further, as shown in FIG. 52(D), in the plurality of OLED display panels (included in the multi-touch display device), the fourth panel 1300 may be configured such that a difference between supply time points of the first and second scan sync signals SSP1 and SSP2 is set to Ta31, a difference between supply time points of the second and third scan sync signals SSP2 and SSP3 is set to Ta32, a difference between supply time points of the third and fourth scan sync signals SSP3 and SSP4 is set to Ta33, a difference between supply time points of the first and second data sync signals DSP1 and DSP2 is set to Tb31, a difference between supply time points of the second and third data sync signals DSP2 and DSP3 is set to Tb32, and a difference between supply time points of the third and fourth data sync signals DSP33 and DSP4 is set to Tb3.

In the example embodiment, the differences Ta3, Ta13, Ta23, and Ta33 may be different from one another. In this example, the differences Tb3, Tb13, Tb23, and Tb33 may be changed based on the differences Ta3, Ta13, Ta23, and Ta33.

The remote controller 200Q may recognize (or determine) the difference between the supply time points of the third and fourth scan sync signals SSP3 and SSP4. This may help the panel that the remote controller 200Q touches.

Accordingly, the broadcasting signal receiver according to the example embodiment may display the cursor on the screen of the corresponding panel based on information about light sensed by the remote controller 200Q.

The differences Ta1, Ta11, Ta21, and Ta31 may be different from one another, or the differences Ta2, Ta12, Ta22, and Ta32 may be different from one another.

Alternatively, the plurality of OLED display panels included in the multi-touch display device may be configured such that the number of scan sync signals in the first panel 1000 is set to four, the number of scan sync signals in the second panel 1200 is set to five, the number of scan sync signals in the third panel 1200 is set to six, and the number of scan sync signals in the fourth panel 1300 is set to seven. The broadcasting signal receiver may recognize the panel that the remote controller 200Q touches by differently setting the number of sync signals corresponding to each panel.

FIGS. 53 to 61 illustrate another touch display device according to an example embodiment. In the following description, the descriptions of the configuration and the structure described above may be omitted. The configuration and the structure described below may be applied to the configuration and the structure described above, except the erase line and the description thereof.

Figure 10:
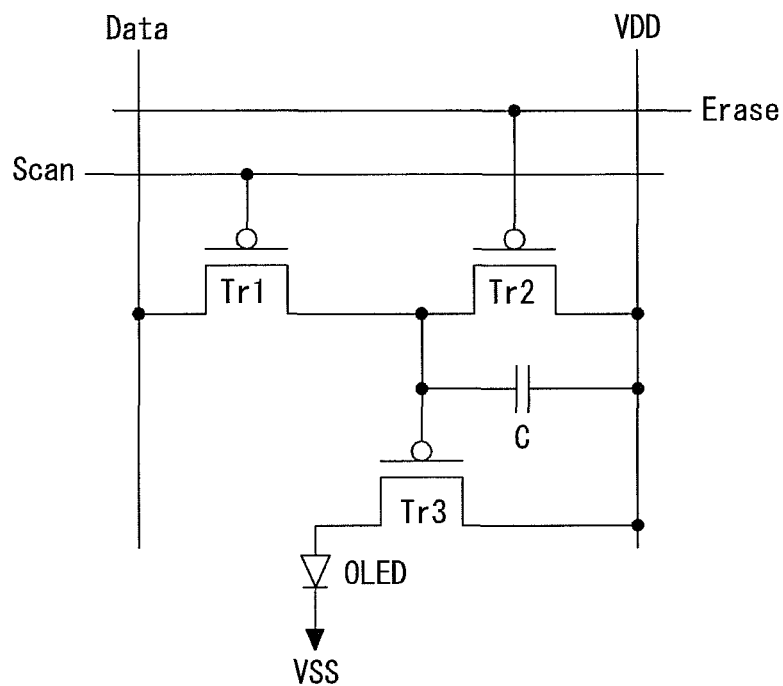
Figure 53:
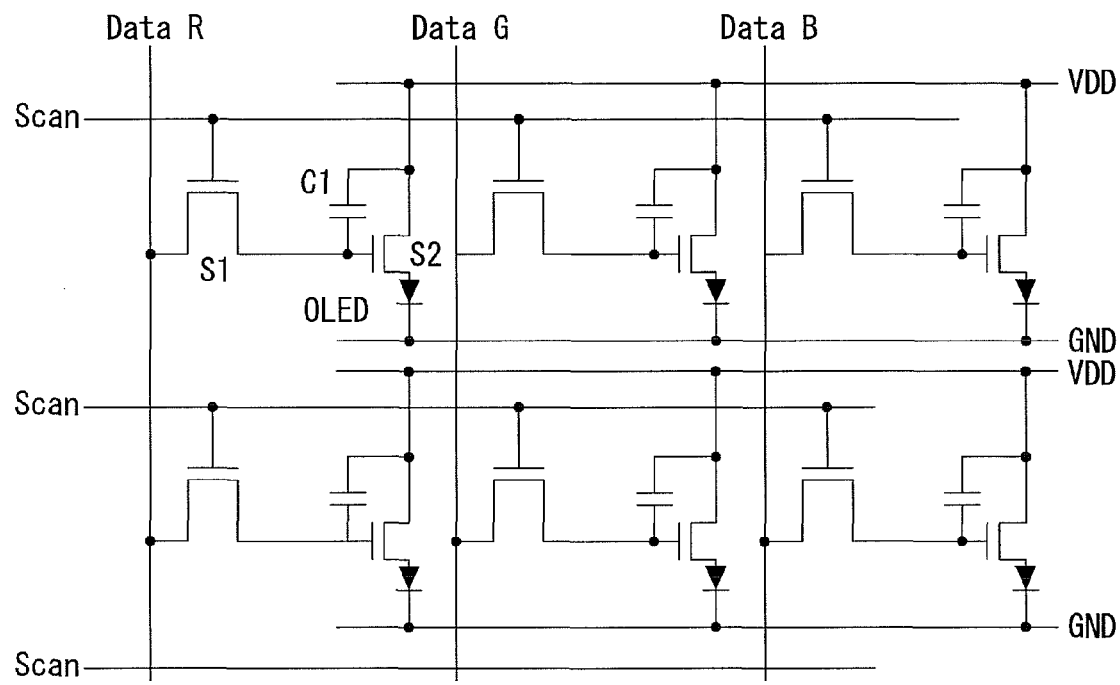
FIGS. 53 to 61 illustrate a touch display device according to an example embodiment.

FIG. 53 illustrates a subpixel having the structure different from FIG. 10.

As shown in FIG. 53, the subpixel may further include an OLED cell, a first switch S1, a second switch S2, and a capacitor C1.

When the scan signal is supplied to the scan line Scan, the first switch S1 is turned on. In this example, the data signal is supplied to the data line Data, and the second switch S2 is turned on. Hence, the OLED cell may emit light.

The touch display device having the above-described structure may use the analog driving method. In this example, one frame may include at least one touch subfield (i.e., a touch period).

Figure 54:
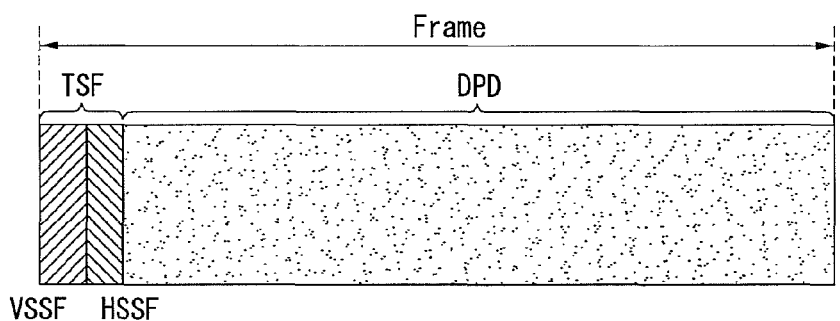

For example, as shown in FIG. 54, one frame may include a vertical touch subfield VSSF and a horizontal touch subfield HSSF. In FIG. 54, 'DPD' may denote a display period in which a gray scale of a predetermined image is represented based on input video data.

Figure 55:
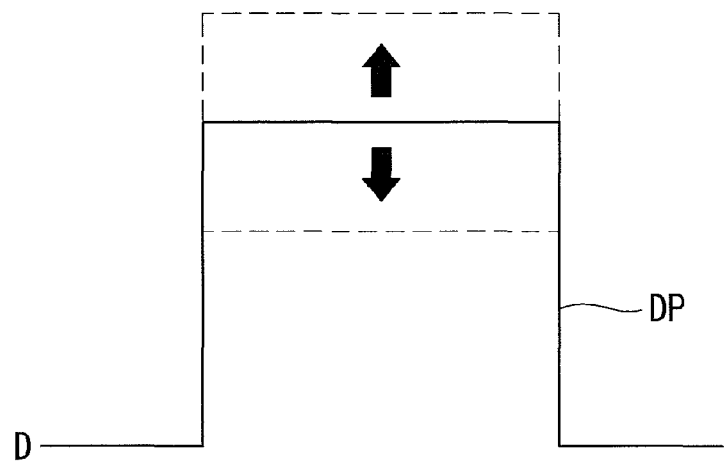
Figure 56:
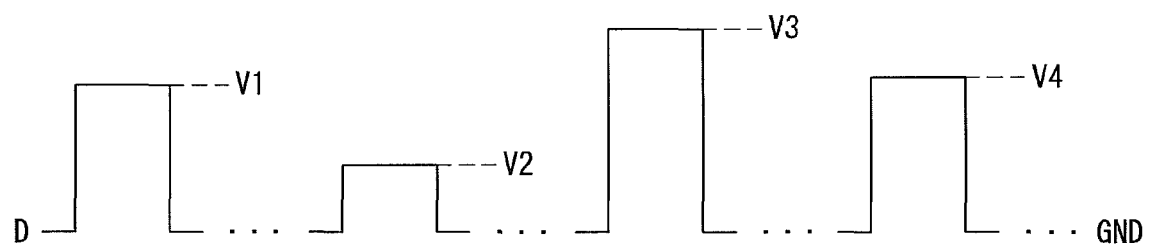

As shown in FIGS. 55 and 56, the data signal having voltages of various magnitudes may be supplied to the data line in the display period DPD.

For example, as shown in FIG. 56, an amount of light generated in the OLED cell when the data signal of a voltage V1 is supplied to the data line may be more than an amount of light generated in the OLED cell when the data signal of a voltage V2 less than the voltage V1 is supplied to the data line. In other words, the gray scale of the image may be represented by controlling the magnitude of the voltage of the data signal supplied to the data line.

As described above, when the gray scale of the image is represented by controlling the magnitude of the voltage of the data signal supplied to the data line, the magnitude of the voltage of the data signal may depend on changes in the input video data. Alternatively, a magnitude of a voltage of a data signal supplied to at least one OLED cell may be different from a magnitude of a voltage of a data signal supplied to other OLED cells based on the input video data.

Figure 57:
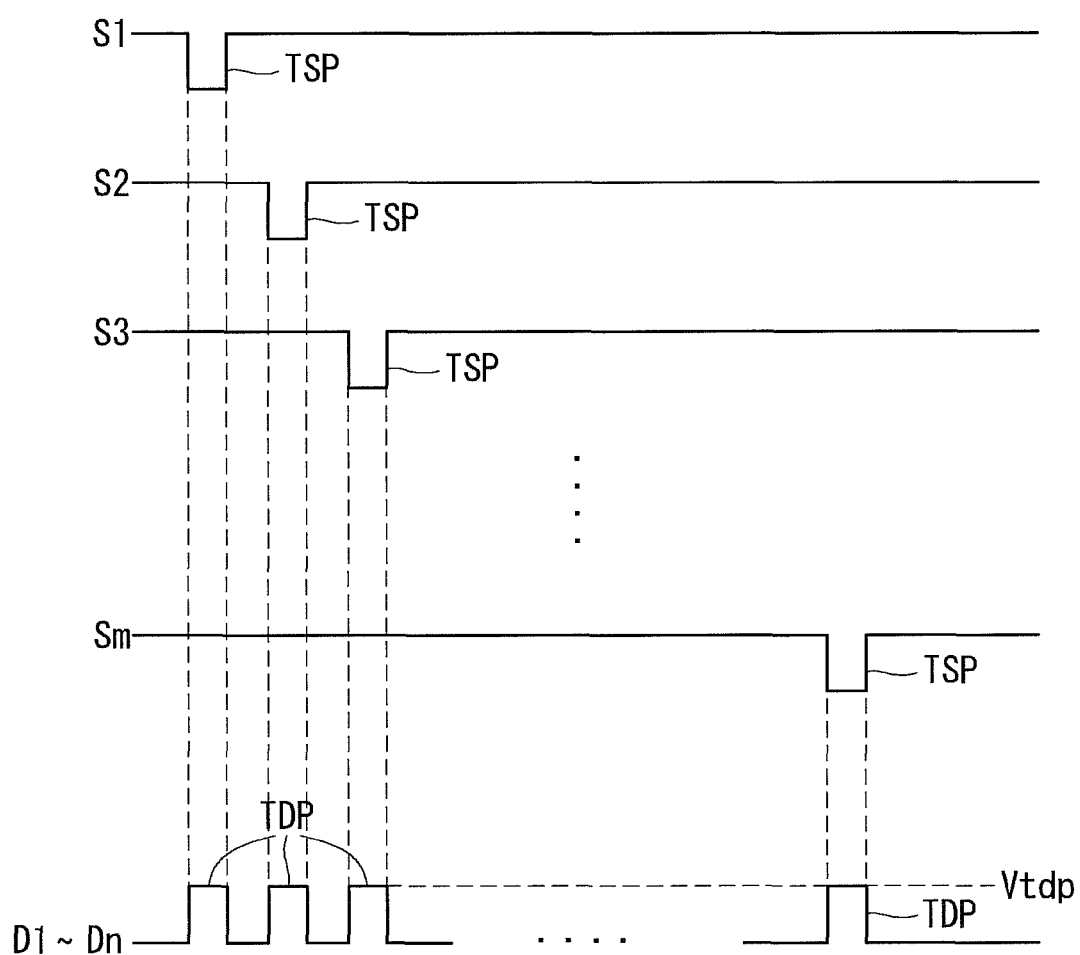
Figure 58:
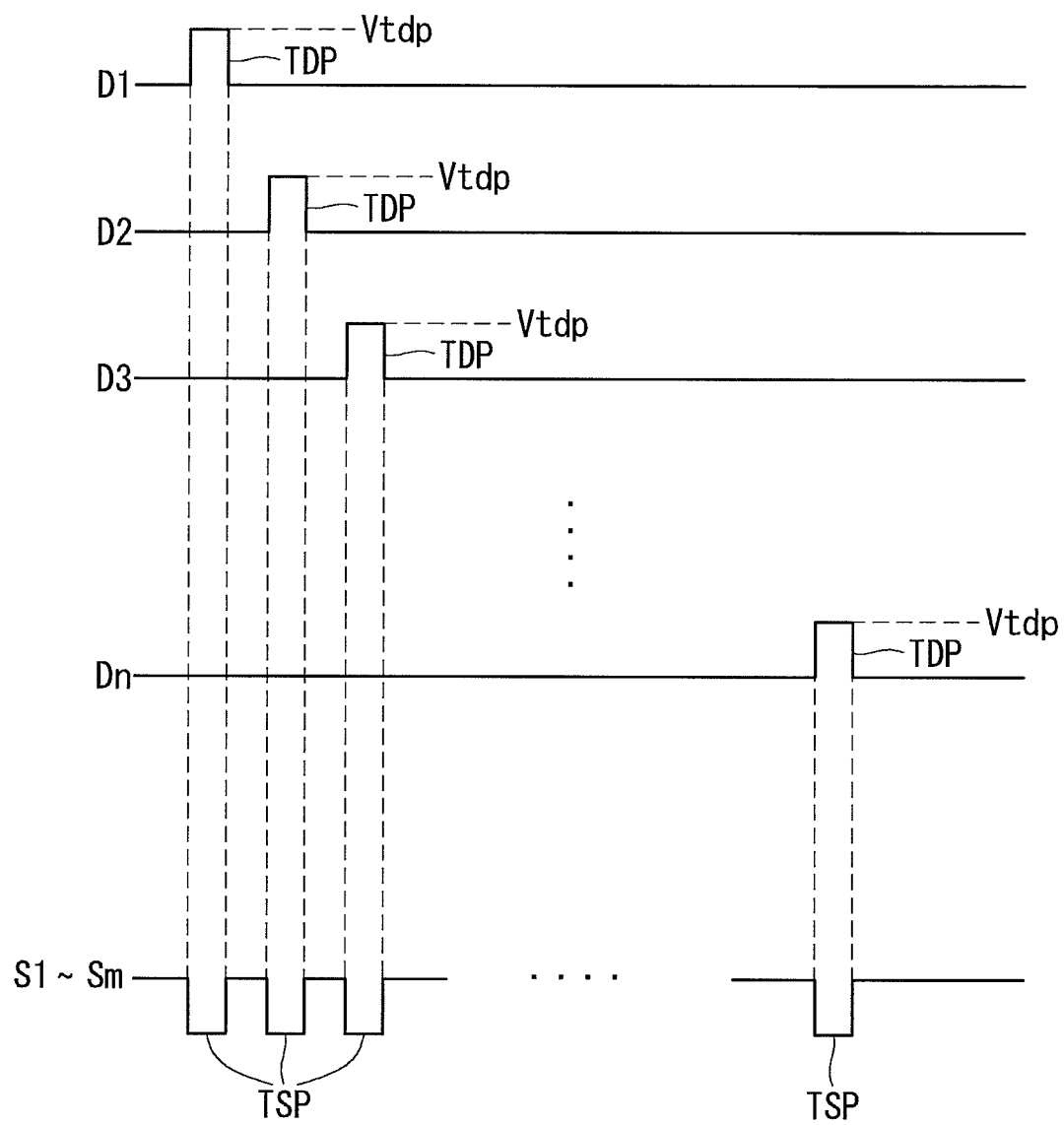

On the other hand, as shown in FIGS. 57 and 58, in the touch subfield, voltages of the touch data signals TDP supplied to all the data lines and/or all the OLED cells may substantially have the same magnitude Vtdp. Similarly to this, in FIGS. 17 and 18, the voltages of the touch data signals TDP supplied to all the data lines and/or all the OLED cells may substantially have the same magnitude in the touch subfield.

When comparing the FIG. 53 configuration with the FIG. 10 configuration, the erase line may be omitted in the FIG. 53 configuration.

Because the erase line is omitted as described above, the analog driving method may be applied to the FIG. 53 configuration.

The erase operation may be performed in the configuration of FIG. 53.

Figure 59:
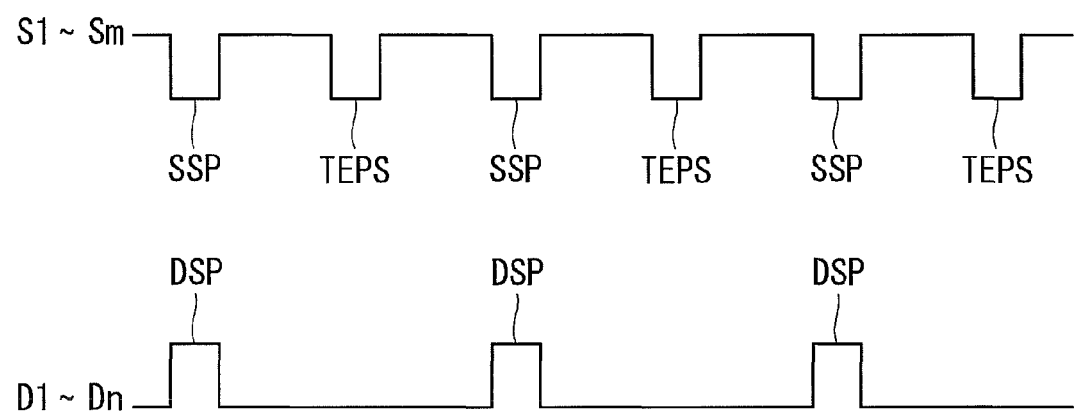

For example, as shown in FIG. 59, the scan sync signal SSP is supplied to the scan lines S1 to Sm, and the data sync signal DSP is supplied to the data lines D1 to Dn. After a predetermined period of time has passed, a scan erase sync signal TEPS may be supplied to the scan lines S1 to Sm. While the scan erase sync signal TEPS is supplied to the scan lines S1 to Sm, the data lines D1 to Dn may be substantially held at a ground level voltage or a previously determined reference voltage.

As described above, when the scan erase sync signal TEPS is supplied to the scan lines S1 to Sm and no signal is supplied to the data lines D1 to Dn, the first switch S1 of FIG. 53 may be short-circuited. Accordingly, the OLED cell may stop emitting light.

Although the erase line is not included in the example embodiment, the erase operation may be performed because the scan erase sync signal TEPS is supplied to the scan lines in a state where no signal is supplied to the data lines. In the example embodiment, the scan erase sync signal TEPS may be substantially the same as the scan sync signal SSP. That is, the scan sync signal SSP and the scan erase sync signal TEPS may have a same form and a same voltage magnitude.

The FIG. 59 configuration may be sufficiently understood from the FIG. 23 configuration FIG. 23 except the description of the erase line.

In an embodiment, because a predetermined signal is supplied to the scan lines in a state where no signal is supplied to the data lines, a method for performing the erase operation may be applied in the touch subfield.

Figure 60:
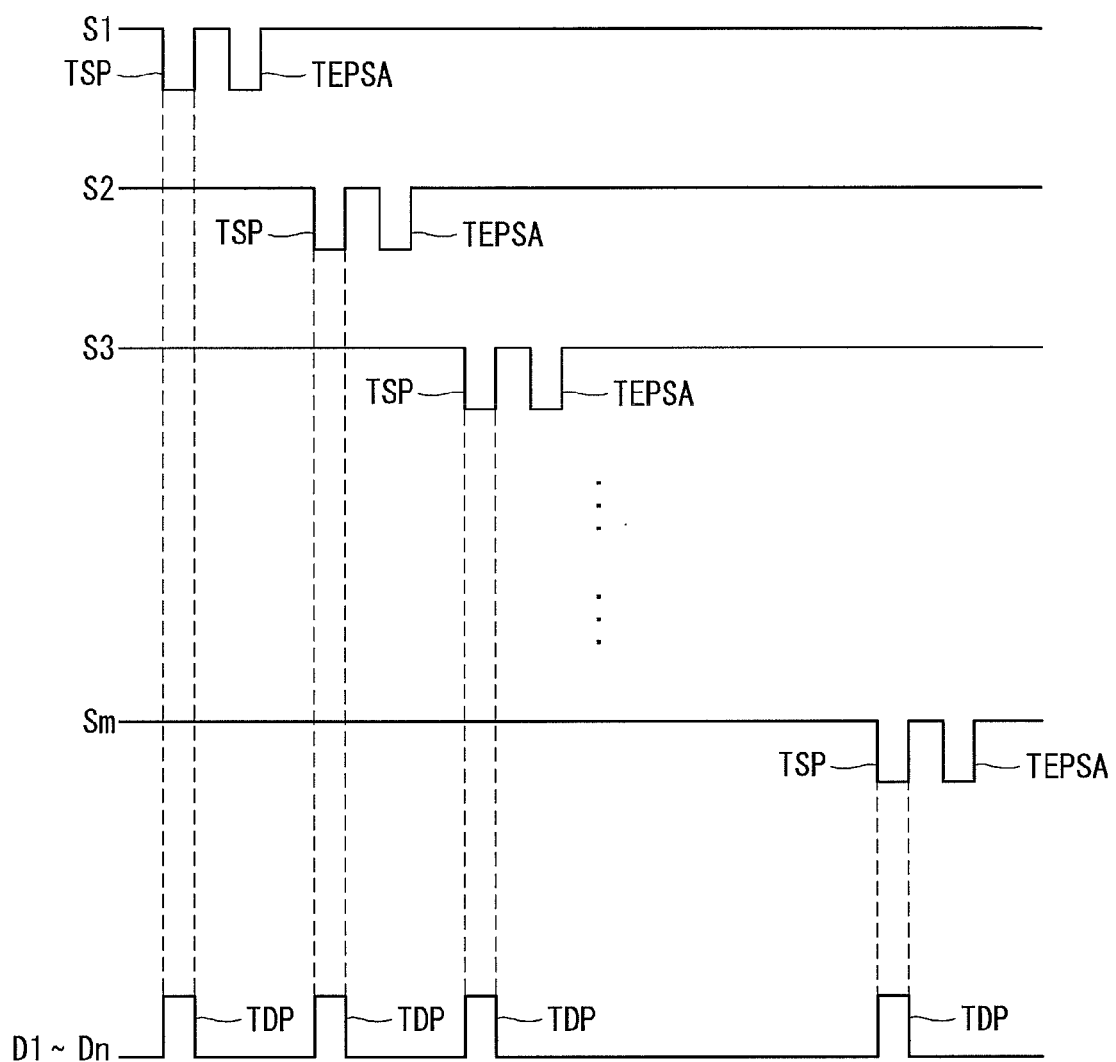

For example, as shown in FIG. 60, the touch scan signal TSP may be sequentially supplied to the plurality of scan lines in the vertical touch subfield, and the touch data signal TDP corresponding to the touch scan signal TSP may be supplied to the plurality of data lines.

Light may be sequentially generated in the vertical direction of the panel.

Further, after the supply of the touch scan signal TSP, an erase signal TEPSA may be supplied to the scan lines, so as to more accurately sense the touch position.

In this example, before light is generated by the touch scan signal TSP and the touch data signal TDP in the plurality of OLED cells corresponding to the second scan line S2, the light emission in the plurality of OLED cells corresponding to the first scan line S1 may end. The light generated in the plurality of OLED cells corresponding to the first scan line S1 may be prevented from being mixed with the light generated in the plurality of OLED cells corresponding to the second scan line S2.

Figure 61:
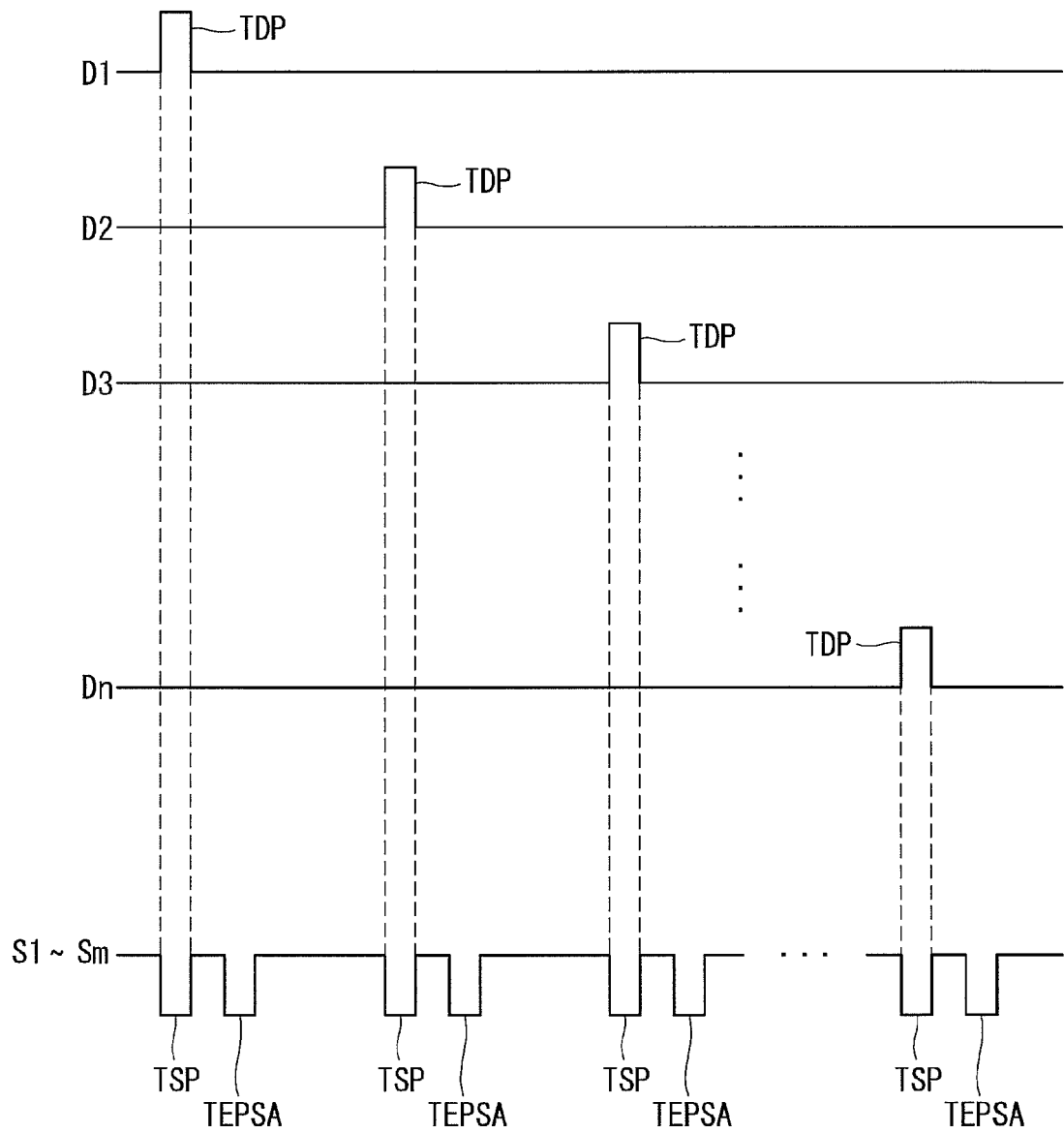

As shown in FIG. 61, the touch data signal TDP may be sequentially supplied to the plurality of data lines in the horizontal touch subfield, and the touch scan signal TSP corresponding to the touch data signal TDP may be supplied to the plurality of scan lines.

Light may be sequentially generated in the horizontal direction of the panel.

Even in this example, after the supply of the touch scan signal TSP, the erase signal TEPSA may be supplied to the scan lines, so as to more accurately sense the touch position.

In an example embodiment, the erase signal TEPSA may be substantially the same as the touch scan signal TSP.

As described above, when the erase signal TEPSA is supplied to the scan lines in the touch subfield, two signals (i.e., the touch scan signal TSP and the erase signal TEPSA) may correspond to one touch data signal TDP. For example, supposing that N touch data signals TDP are supplied in the touch subfield, where N is a natural number, a sum of the number of touch scan signals TSP and the number of erase signals TEPSA may be 2N. If the erase signal TEPSA is substantially the same as the touch scan signal TSP, the total number of touch scan signals TSP supplied to the scan lines in the touch subfield may be twice the total number of touch data signals TDP.

A touch display device may include an organic light emitting diode (OLED) display panel including scan lines, data lines, and OLED cells, and a driver configured to display a touch position on a screen of the OLED display panel in a frame that includes a touch subfield. The driver may supply at least one scan sync signal to the scan lines and may supply at least one data sync signal to the data lines during one frame.

The touch subfield may include a vertical touch subfield for detecting a vertical position of the touch position and a horizontal touch subfield for detecting a horizontal position of the touch position.

The vertical touch subfield and the horizontal touch subfield may be successively arranged. The scan sync signal and the data sync signal may be supplied between the vertical touch subfield and the horizontal touch subfield.

A touch scan signal may be supplied to a plurality of scan line groups (each including at least one scan line) in a predetermined order in the vertical touch subfield, wherein a touch data signal corresponding to the touch scan signal is supplied to the data lines.

A touch data signal is supplied to a plurality of data line groups (each including at least one data line) in a predetermined order in the horizontal touch subfield, wherein a touch scan signal corresponding to the touch data signal is supplied to the scan lines.

The scan sync signal may be supplied to all the scan lines, and the data sync signal may be supplied to all the data lines.

The data sync signal may correspond to the scan sync signal.

The scan sync signal may include first, second, and third scan sync signals, wherein the data sync signal includes a first data sync signal corresponding to the first scan sync signal, a second data sync signal corresponding to the second scan sync signal, and a third data sync signal corresponding to the third scan sync signal. A difference between supply time points of the first data sync signal and the second data sync signal is different from a difference between supply time points of the second data sync signal and the third data sync signal, wherein a difference between supply time points of the first scan sync signal and the second scan sync signal is different from a difference between supply time points of the second scan sync signal and the third scan sync signal.

A number of scan sync signals and a number of data sync signals may be plural. A difference between supply time points of two adjacent scan sync signals may be different from a difference between supply time points of two successive scan signals, which are supplied to the scan lines in remaining subfields excluding the touch subfield from the frame. A difference between supply time points of two adjacent data sync signals may be different from a difference between supply time points of two successive data signals, which are supplied to the data lines in remaining subfields excluding the touch subfield from the frame.

The touch display device may further include a touch means (or touch device) configured to sense light generated in the OLED display panel in the touch subfield and transmit timing information regarding the second light to the driver.

After the scan sync signal is supplied to the scan lines and the data sync signal corresponding to the scan sync signal may be supplied to the data lines, a scan erase signal is supplied to the scan lines in a state where the data sync signal is not supplied to the data lines.

As the scan erase signal is supplied to the scan lines, the OLED cells may stop emitting light.

The scan sync signal and the scan erase signal may have a same form and a same voltage magnitude.

The touch scan signal and the scan sync signal may have a same form and a same voltage magnitude.

The touch data signal and the data sync signal may have a same form and a same voltage magnitude.

A touch display device may include an organic light emitting diode (OLED) display panel including scan lines, data lines, and OLED cells, and a driver configured to display a touch position on a screen of the OLED display panel in a frame including a touch subfield. The driver may scan a plurality of cell groups (each including at least one OLED cell) in a forward direction and may scan other cell groups in a reverse direction in the touch subfield.

The touch subfield may include a vertical touch subfield for detecting a vertical position of the touch position and a horizontal touch subfield for detecting a horizontal position of the touch position.

A touch data signal may be supplied to a plurality of data line groups (each including the plurality of data lines) in the forward direction in the horizontal touch subfield, wherein the touch data signal is supplied to other data line groups in the reverse direction in the horizontal touch subfield.

The data line groups scanned in the forward direction may include odd-numbered data line groups of the plurality of data line groups, wherein the data line groups scanned in the reverse direction may include even-numbered data line groups of the plurality of data line groups.

A touch scan signal is supplied to a plurality of scan line groups (each including the plurality of scan lines) in the forward direction in the vertical touch subfield, wherein the touch scan signal is supplied to other scan line groups in the reverse direction in the vertical touch subfield.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch display device comprising:
a display panel to display an image on a screen, the display panel including scan lines and data lines; and
a driver configured to provide a display, on the screen, of a touch position based on a frame that includes a touch subfield,
wherein the driver to provide at least one scan synchronization signal to the scan lines during the frame that includes the touch subfield, and the driver to provide at least one data synchronization signal to the data lines during the frame that includes the touch subfield,
wherein the scan synchronization signal includes a first scan synchronization signal, a second scan synchronization signal, and a third scan synchronization signal,
wherein the data synchronization signal includes a first data synchronization signal corresponding to the first scan synchronization signal, a second data synchronization signal corresponding to the second scan synchronization signal, and a third data synchronization signal corresponding to the third scan synchronization signal,
wherein a first difference between a supply time point of the first data synchronization signal and a supply time point of the second data synchronization signal is different from a second difference between the supply time point of the second data synchronization signal and a supply time point of the third data synchronization signal,
wherein a third difference between a supply time point of the first scan synchronization signal and a supply time point of the second scan synchronization signal is different from a fourth difference between the supply time point of the second scan synchronization signal and a supply time point of the third scan synchronization signal.

2. The touch display device of claim 1, wherein the touch subfield includes a vertical touch subfield to detect a vertical position of the touch position, and a horizontal touch subfield to detect a horizontal position of the touch position.

3. The touch display device of claim 2, wherein the vertical touch subfield and the horizontal touch subfield are successively arranged,
wherein the driver provides the scan synchronization signal and the data synchronization signal between the vertical touch subfield and the horizontal touch subfield.

4. The touch display device of claim 2, wherein the driver to provide a touch scan signal, in the vertical touch subfield, to a plurality of scan line groups in a predetermined order, each scan line group including at least one scan line, and
wherein the driver to provide a touch data signal to the data lines, the touch data signal corresponding to the touch scan signal.

5. The touch display device of claim 4, wherein the touch scan signal has a same form as the scan synchronization signal, and the touch scan signal has a same voltage magnitude as the scan synchronization signal.

6. The touch display device of claim 4, wherein the touch data signal has a same form as the data synchronization signal, and the touch data signal has a same voltage magnitude as a data synchronization signal.

7. The touch display device of claim 2, wherein the driver to provide a touch data signal, in the horizontal touch subfield, to a plurality of data line groups in a predetermined order, each data line group including at least one data line, and
wherein the driver to provide a touch scan signal to the scan lines, the touch scan signals corresponding to the touch data signal.

8. The touch display device of claim 1, wherein the driver provides the scan synchronization signal to all of the scan lines, and wherein the driver provides the data synchronization signal to all of the data lines.

9. The touch display device of claim 1, wherein the data sync signal corresponds to the scan synchronization signal.

10. The touch display device of claim 1, wherein the at least one scan synchronization signal includes a plurality of scan synchronization signals and the at least one data synchronization signal includes a plurality of data scan synchronization signals,
wherein a first difference between supply time points of two adjacent scan synchronization signals is different from a second difference between supply time points of two successive scan signals that are supplied to the scan lines in remaining subfields of the frame excluding the touch subfield from the frame,
wherein a third difference between supply time points of two adjacent data synchronization signals is different from a fourth difference between supply time points of two successive data signals that are supplied to the data lines in remaining subfields of the frame excluding the touch subfield from the frame.

11. The touch display device of claim 1, further comprising a touch device to sense light generated in the display panel in the touch subfield and to provide timing information regarding the sensed light to the driver.

12. The touch display device of claim 1, wherein the display panel is an organic light emitting diode (OLED) display panel, and the OLED display panel further includes OLED cells.

13. The touch display device of claim 12, wherein after the driver provides the scan synchronization signal to the scan lines and the driver provides the data synchronization signal corresponding to the scan synchronization signal, the driver provides a scan erase signal to the scan lines in a state where the data synchronization signal is not provided to the data lines.

14. The touch display device of claim 13, wherein when the driver provides the scan erase signal to the scan lines, the OLED cells stop emitting light.

15. The touch display device of claim 13, wherein the scan sync signal has a same form as the scan erase signal, and the scan sync signal has a same voltage magnitude as the scan erase signal.

16. The touch display device of claim 12, wherein the driver scans, in the touch subfield, a first plurality of cell groups each including at least one OLED cell in a forward direction, and the driver scans, in the touch subfield, a second plurality of cell groups in a reverse direction.

* * * * *